(12) United States Patent
Maruyama et al.

(10) Patent No.: US 10,465,816 B2
(45) Date of Patent: Nov. 5, 2019

(54) FLUID SERVO VALVE AND FLUID SERVO APPARATUS

(71) Applicant: TOKKYOKIKI CORPORATION, Amagasaki-shi, Hyogo (JP)

(72) Inventors: Teruo Maruyama, Hirakata (JP); Kozo Okamoto, Kawanishi (JP); Takumi Okada, Ikoma (JP); Satoki Yamaguchi, Osaka (JP); Masataka Nakashima, Hirakata (JP)

(73) Assignee: TOKKYOKIKI CORPORATION, Amagasaki-Shi, Hyogo (JP)

( * ) Notice: Subject to any disclaimer, the term of this patent is extended or adjusted under 35 U.S.C. 154(b) by 12 days.

(21) Appl. No.: 15/019,898

(22) Filed: Feb. 9, 2016

(65) Prior Publication Data

US 2016/0228889 A1 Aug. 11, 2016

(30) Foreign Application Priority Data

Feb. 10, 2015 (JP) ................................. 2015-024794

(51) Int. Cl.
*F16K 31/42* (2006.01)
*F15B 13/04* (2006.01)
(Continued)

(52) U.S. Cl.
CPC ............ *F16K 31/128* (2013.01); *F15B 5/003* (2013.01); *F16K 31/0606* (2013.01);
(Continued)

(58) Field of Classification Search
CPC ........ F15B 13/0438; F15C 3/14; F16K 31/42; F16K 31/0606; F16K 31/0641;
(Continued)

(56) References Cited

U.S. PATENT DOCUMENTS 3,062,235 A * 11/1962 Lucien ................ F15B 13/0438
 137/625.65
3,422,850 A * 1/1969 Caldwell ............. F16K 31/0606
 137/625.65
(Continued)

FOREIGN PATENT DOCUMENTS

CN 102242743 A 11/2011
CN 102878139 A 1/2013
(Continued)

OTHER PUBLICATIONS

State Intellectual Property Office of the People's Republic of China, Office Action and Search Report Issued in Application No. 201610082091.7, dated Sep. 29, 2018, 20 pages.
(Continued)

*Primary Examiner* — Seth W. MacKay-Smith
(74) *Attorney, Agent, or Firm* — Alleman Hall Creasman & Tuttle LLP

(57) ABSTRACT

The present invention controls the pressure and flow rate of fluid, in order to obtain uniform performance, configure a closed loop magnetic circuit so as to include an electromagnet, a flapper, and a yoke material, and elastically deform the flapper itself by Maxwell attractive force generated between a magnetic pole of the electromagnet and the flapper to make the separation distance between the nozzle and the flapper variable. As opposed to a rigid flapper structure that swingably moves around a supporting point, like a conventional servo valve, the electromagnet, the magnetic pole, the nozzle, the flapper, and the like are arranged such that a change in magnetic gap directly leads to a change in air gap.

13 Claims, 49 Drawing Sheets

(51) Int. Cl.
  *F16K 31/06* (2006.01)
  *F15C 3/14* (2006.01)
  *F16K 31/128* (2006.01)
  *F15B 5/00* (2006.01)

(52) U.S. Cl.
  CPC ...... *F16K 31/0641* (2013.01); *F16K 31/0651* (2013.01); *F16K 31/0672* (2013.01)

(58) Field of Classification Search
  CPC ................ F16K 31/0672; H01F 7/13; Y10T 137/86598; Y10T 137/87812
  USPC ...................................................... 335/227
  See application file for complete search history.

(56) References Cited

U.S. PATENT DOCUMENTS

| | | | | |
|---|---|---|---|---|
| 3,496,561 A * | 2/1970 | Seidel | ................ | F15B 13/0438 341/149 |
| 3,571,769 A * | 3/1971 | Pegram | ..................... | H01F 7/14 137/82 |
| 3,713,059 A * | 1/1973 | Tada | ......................... | H01F 7/13 335/259 |
| 3,817,488 A * | 6/1974 | Mack | ..................... | F16K 31/06 137/625.64 |
| 3,921,670 A * | 11/1975 | Clippard, Jr. | ........ | F16K 31/0606 137/625.27 |
| 3,937,242 A * | 2/1976 | Eckert | .................... | F02M 69/54 137/102 |
| 4,166,991 A * | 9/1979 | Haner | ....................... | H01F 7/13 335/255 |
| 4,173,984 A * | 11/1979 | Solomon | ............ | F15B 13/0438 137/119.1 |
| 4,196,751 A * | 4/1980 | Fischer | ............... | F16K 31/0606 137/625.65 |
| 4,390,856 A * | 6/1983 | Schechter | ................. | H01F 7/13 335/256 |
| 4,852,854 A * | 8/1989 | Peng | .......................... | B41J 2/01 251/129.15 |
| 5,593,134 A * | 1/1997 | Steber | .................. | F02M 59/466 137/82 |
| 5,628,491 A * | 5/1997 | Krone | ....................... | A01J 5/14 251/129.21 |
| 6,079,435 A * | 6/2000 | Franz | .................. | G05D 16/2013 137/82 |
| 6,631,883 B1 * | 10/2003 | Van Den Brink | ...... | F16K 31/06 251/129.07 |
| 9,856,986 B2 * | 1/2018 | Futamata | ............. | F16K 11/0525 |
| 2001/0050347 A1 * | 12/2001 | Otsuka | .................... | B60T 8/363 251/129.15 |
| 2002/0101314 A1 * | 8/2002 | Oishi | .................. | F16K 31/0613 335/256 |
| 2003/0117027 A1 * | 6/2003 | Rybnicek | ............... | G02B 26/02 310/28 |
| 2005/0092945 A1 * | 5/2005 | Heller | ....................... | F16K 7/12 251/30.01 |
| 2007/0194873 A1 * | 8/2007 | Gibson | ..................... | H01F 7/13 335/255 |
| 2009/0032751 A1 | 2/2009 | Chinda | | |
| 2011/0012041 A1 * | 1/2011 | De Santis | .......... | F16K 31/0675 251/129.15 |

FOREIGN PATENT DOCUMENTS

| | | | | |
|---|---|---|---|---|
| EP | 1035363 A1 * | 9/2000 | ......... | F16K 31/0606 |
| JP | 52151428 U1 | 11/1977 | | |
| JP | 53001589 U1 | 1/1978 | | |
| JP | 54023221 A | 2/1979 | | |
| JP | 55070602 U1 | 5/1980 | | |
| JP | 57001879 A | 1/1982 | | |
| JP | 57012872 U1 | 1/1982 | | |
| JP | 63154879 U1 | 10/1988 | | |
| JP | H11294621 A | 10/1999 | | |
| JP | 2003021109 A | 1/2003 | | |
| JP | 2003314729 A | 11/2003 | | |
| JP | 2006057719 A | 3/2006 | | |
| JP | 2006283966 A | 10/2006 | | |
| JP | 2007155038 A | 6/2007 | | |
| JP | 4636830 B2 | 2/2011 | | |

OTHER PUBLICATIONS

Japanese Patent Office, Office Action Issued in Application No. 2015024794, dated Dec. 4, 2018, 22 pages.

* cited by examiner

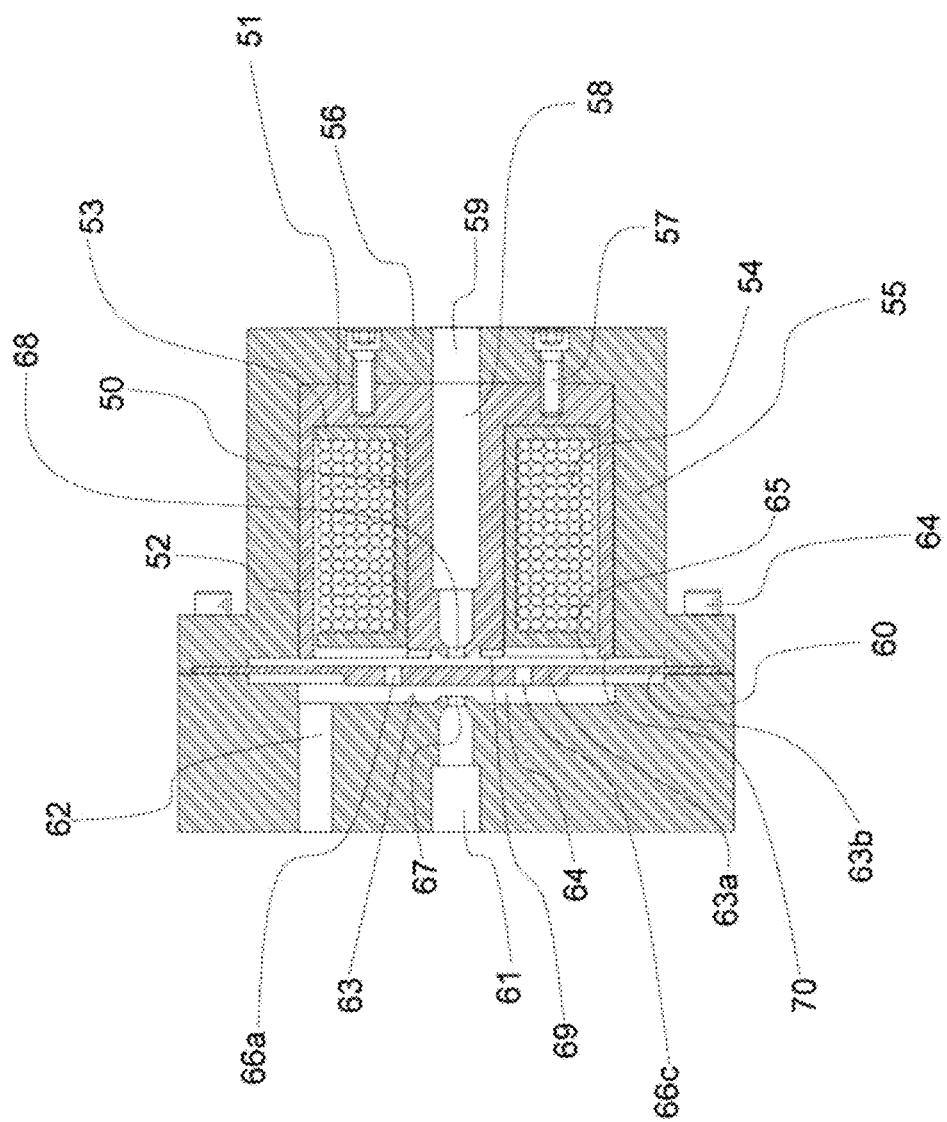

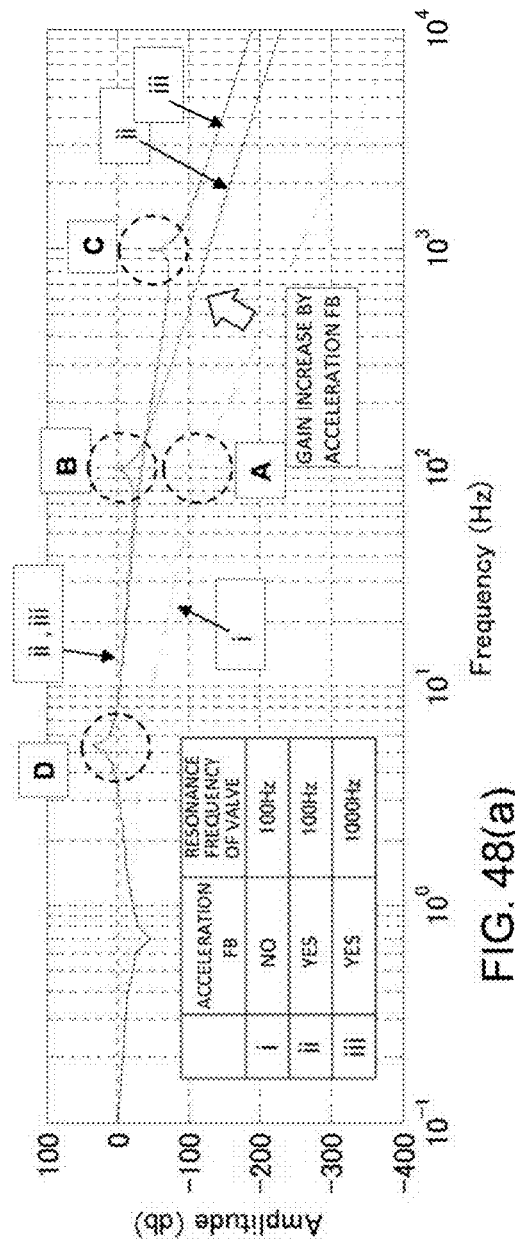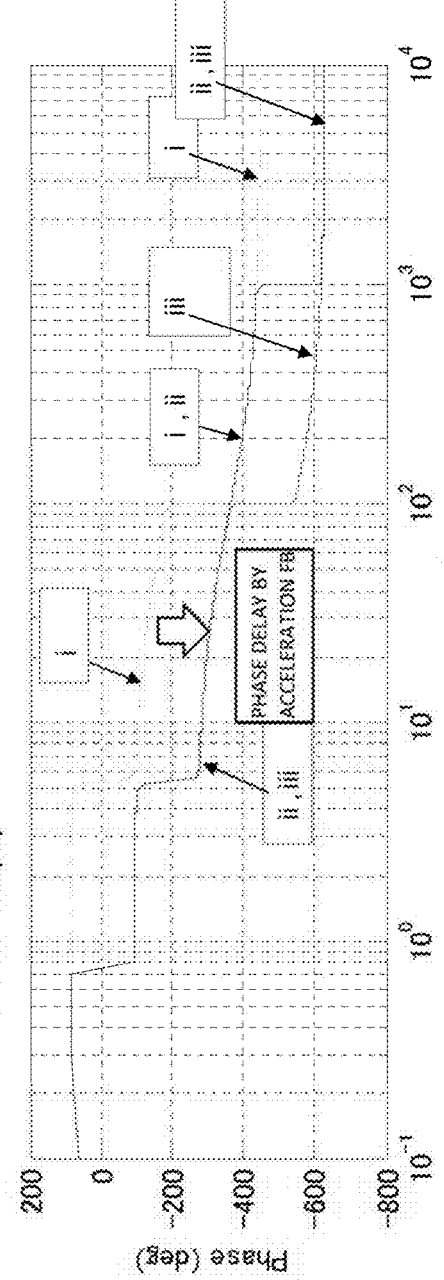
FIG. 48(a)
FIG. 48(b)

FLUID SERVO VALVE AND FLUID SERVO APPARATUS

TECHNICAL FIELD

The present invention relates to fluid control equipment for controlling the pressure/flow rate of fluid. More specifically, the present invention relates to a fluid servo valve adapted to control the pressure/flow rate of fluid by moving a flapper relatively to a nozzle using an axial driving mechanism, and also to a fluid servo apparatus equipped with the fluid servo valve.

BACKGROUND ART

In various fields such as a semiconductor manufacturing process, liquid crystal manufacturing process, and precision machining, vibration control for blocking or suppressing disturbance micro vibration is widely used. For each of microfabrication and inspection apparatuses used in such processes, such as scanning electron microscopes and semiconductor exposure apparatuses (steppers), strict conditions of acceptable vibration for ensuring the performance of that apparatus are required. Also, an active-type precision vibration isolation table that uses actuators to support an apparatus susceptible to disturbance vibration as well as controlling the actuators so as to diminish the vibration has been used.

In an active vibration isolation table, which is a pneumatic servo apparatus using pneumatic actuators, in order to control the pressure and flow rate of gas in each of the actuators, a nozzle flapper valve has been used. FIG. 49 is a structural diagram modelling a working principle common to conventional servo valves. The structure of a servo valve can be roughly divided into an actuator part A-1 and a fluid control part B-1. In the actuator part A-1, reference character 551 denotes a magnet (permanent magnet), 552 a coil, 553 a body containing the coil, 554 a flapper, 555a and 555b a pair of yokes attached with fore ends thereof facing toward each other, 556 a flapper fore end part on the actuator side, 557 a leaf spring also serving as a seal member, and 558 a support center part for the leaf spring.

In the fluid control part B-1, reference character 560 denotes a forward nozzle, 561 a reverse nozzle, 562 a flapper fore end part on the fluid control part side, 563 a supply port, 564 an exhaust port, 565 a load port (control port), and 566 a control chamber.

A gas having a supply pressure $P_s$ is supplied to the control chamber 566 via the forward nozzle 560. At the same time, the gas inside the control chamber 566 is flowed out into the air via the reverse nozzles 561. The difference between an inflow amount from the forward nozzle and an outflow amount from the reverse nozzle determines a control pressure $P_a$ inside the control chamber 566 and an outflow amount from the load port 565. Note that the structure of a servo valve actually used is a three-dimensional structure in which a magnetic circuit based on a permanent magnet and a magnetic circuit based on an electromagnet are orthogonally arranged. The above-described basic structure of the pneumatic servo valve has been created secondarily as a result of applying a long-established hydraulic servo valve technology, and is used as that of a primary control valve (pilot valve) of an electrohydraulic control valve.

CITATION LIST

Patent Literature

Patent Literature 1: JPA-2006-283966
Patent Literature 2: JPA-2007-155038
Patent Literature 3: JPA-H11-294627
Patent Literature 4: Japanese Patent No. 4636830

SUMMARY OF INVENTION

Technical Problem

1. Conditions Required for Pneumatic Servo Valve

Conditions required for a pneumatic servo valve serving as an important key component constituting an active vibration isolation table are as follows:

(1) High-speed responsiveness,
(2) A primary resonance point of the pneumatic servo valve is sufficiently high, and several hundred Hz or more, and
(3) Linearity: A flow rate and a generated pressure have linear proportional relationships with a valve driving current, respectively.

The reason for the above (1) is as follows. For example, when a stage mounted on the vibration isolation table moves or stops, a driving reaction force due to mass transfer is, as linear disturbance, inputted to a surface plate corresponding to a stage mounting surface. In this case, by using a stage acceleration signal (e.g., from a sensor) to perform stage feedforward control on the vibration isolation apparatus, the vibration of the surface plate at the time of acceleration/deceleration can be reduced. In order to quickly converge the surface plate vibration, the pneumatic valve for driving a pneumatic actuator requires high responsiveness.

The reason for the above (2) is as follows. The reason why, even though the responsiveness of a pneumatic active vibration isolation system is of the order of several to dozens of Hz, the fact that a high resonance frequency of several hundred Hz is required for the servo valve is based on the needs specific to the pneumatic active vibration isolation system.

In order to reduce a resonance point peak determined by a pneumatic spring of an actuator and the mass of a mounted object, it is essential to apply acceleration feedback control to the active vibration isolation table. However, in the case of applying the acceleration feedback control, the open loop characteristics of the active vibration isolation system are characterized by an increased gain in a wide frequency range and a delayed phase. As a result, at the resonance point of the pneumatic servo valve, a gain margin, and a phase margin are reduced. In the case where the resonance point of the servo valve is low, an active control system cannot sufficiently fulfill its performance. (See Complement 2 in this specification for details.)

The reason for (3) above is as follows.

Since the servo valve is one component constituting the control system of the fluid servo apparatus (active vibration isolation table), the ratio of a change in flow rate to a change in current is incorporated in an open-loop gain as a flow rate gain. In the case where the flow rate characteristics of the servo valve are nonlinear, the open-loop gain for taking into account the stability margin of the whole of the active vibration isolation table must be determined by the maximum value of the flow rate gain. However, in many cases, the operating point of a servo valve is near the intermediate position ($I \approx I_{max}/2$) in a driving current range. For this reason, as the degree of nonlinearity of the flow rate characteristics with respect to current increases, a higher-than-necessary gain margin is set at the operating point. In this case, the active vibration isolation table cannot sufficiently fulfill its intrinsic performance.

2. Problems of Conventional Pneumatic Servo Valve

As an example of configuring an active vibration isolation table, four-point active control is assumed. In this case, pneumatic actuators are arranged at the four corners. In addition, in terms of a unit installation direction, two points are diagonally arranged in a horizontal X direction and also two points are diagonally arranged in a Y direction. Further, each of the actuators also incorporates an actuator adapted to support a load in a Z direction. That is, eight pneumatic actuators are arranged in total, and eight pneumatic servo valves for controlling the respective actuators are required in total.

A conventional pneumatic servo valve requiring the above (1) to (3) as necessary conditions is configured to have a three-dimensional component arrangement in which magnetic circuits respectively based on a permanent magnet and an electromagnet are orthogonally arranged.

For this reason, there is a problem that an accumulated error in a nozzle-flapper part requiring high accuracy is large, and therefore it is difficult to obtain uniform performance. Also, in the case of mounting the above valves in an active vibration isolation table of a multiaxis control type, there is a problem that a cost ratio of the valves to the vibration isolation table is high because the required number of the valves is large.

As compared with a hydraulic servo having a wide range of applications, a pneumatic servo was initially a minor device. However, it is considered that when the need for a pneumatic servo arose along with the appearance of an active vibration isolation table according to the needs of the times, employing the basic structure of a conventional servo valve (FIG. 49) grown on the basis of the hydraulic servo technology was a historically inevitable choice.

The above-described example of a servo valve utilizes a magnetic attraction action based on the combination of a permanent magnet and an electromagnet, whereas Patent Literature 4 proposes a servo valve that regulates a flapper valve using the Lorentz force acting on a conductive coil placed in a magnetic field (the principle of a linear motor). However, in the case of a linear motor using the Lorentz force, the total mass m of a movable part including the mass of a conductive coil is large. Also, the electromechanical conversion efficiency of generated force F with respect to current I is small, and therefore a large generated force cannot be obtained. Accordingly, spring stiffness K must be reduced. Since a resonance frequency is proportional to $(m/K)^{(1/2)}$, the resonance point of a pneumatic valve cannot be sufficiently increased and therefore the above necessary condition (2) required for an active vibration isolation table cannot be satisfied.

Solution to Problem

Specifically, a fluid servo valve according to the present invention includes: a nozzle of which a flow path is connected to a fluid supply source; a flapper that is provided so as to face toward a tip part of the nozzle; a flapper supporting member that fixes a part of the flapper; and an electromagnet that is provided so as to generate an attractive force on the flapper, and is configured to deform the flapper by the attractive force of the electromagnet to change a separation distance between the tip part of the nozzle and the flapper.

That is, as opposed to a rigid flapper structure that swingably moves around a supporting point, like a conventional servo valve, the present invention controls the pressure and flow rate of fluid by elastically deforming the flapper itself by the attractive force of the electromagnet to make the separation distance between the nozzle and the flapper variable.

Advantageous Effects of Invention

The distinctive features of the fluid servo valve according to the present invention are as follows:
(1) A resonance frequency can be set high;
(2) The valve can be driven by low power;
(3) High-speed responsiveness can be obtained; and
(4) The structure is simple, and the number of components is small, facilitating easy component machining, assembling, and adjustment.

It is expected that the valve according to the present invention, which sufficiently eliminates the disadvantages of a conventional valve, will accelerate the proliferation of a pneumatic servo system in the future. The effect of it will be noticeable.

BRIEF DESCRIPTION OF DRAWINGS

FIGS. 3(a)-3(b) are enlarged views of the vicinity of the flapper and electromagnet in the first embodiment, in which FIG. 3(a) is a top view of FIG. 3(b), and FIG. 3(b) is a front cross-sectional view;

FIG. 23 is a front cross-sectional view of a fluid servo valve according to a fourth embodiment of the present invention;

FIGS. 24(a)-24(c) are partial enlarged views of the vicinity of exhaust nozzle and intake nozzle in the fourth embodiment, in which FIG. 24(a) is an AA arrow view of FIG. 24(b), FIG. 24(b) is a BB arrow view of FIG. 24(c), and FIG. 24(c) is a diagram illustrating a state where current is applied to a coil;

FIGS. 31(a)-31(c) are diagrams illustrating a fluid servo valve according to a seventh embodiment of the present invention, in which FIG. 31(a) is an AA arrow view of FIG. 31(c) and illustrates a spiral disc spring; FIG. 31(b) is a partial enlarged view of FIG. 31(a), and FIG. 31(c) is a front cross-sectional view;

FIGS. 36(a)-36(c) are partial enlarged views of nozzles and a flapper in the ninth embodiment, in which FIGS. 36(a), 36(b), and 36(c) are diagrams respectively illustrating the fitting states between the set of nozzles and the flapper;

FIGS. 37(a)-37(b) are diagrams illustrating the principle of the fluid servo valve according to the ninth embodiment, in which FIG. 37(a) is a diagram illustrating the fitting states between a nozzle and the flapper, and FIG. 37(b) is a graph illustrating a valve flow rate with respect to the gap between the nozzle and the flapper;

FIGS. 38(a)-38(b) are diagrams illustrating the principle of a low consumption flow rate of the fluid servo valve according to the ninth embodiment, in which FIG. 38(a) is a graph illustrating valve flow rates with respect to the gap between a nozzle and a flapper of a conventional valve, and FIG. 38(b) is a graph illustrating valve flow rates with respect to the gap between the nozzle and the flapper in the present invention;

FIGS. 40(a)-40(c) are diagrams illustrating the case where in the fluid servo valve according to the ninth embodiment, the flapper side convex parts are tapered, in which FIGS. 40(a), 40(b), and 40(c) are diagrams illustrating the fitting states between the set of nozzles and the flapper;

FIGS. 48(a)-48(b) are diagrams illustrating an example of an analysis result of the open loop transfer characteristics of the active vibration isolation table, in which FIG. 48(a) is a diagram illustrating gain characteristics with respect to frequency, and FIG. 48(b) is a diagram illustrating phase characteristics with respect to the frequency.

LIST OF REFERENCE CHARACTERS

Figure 1:
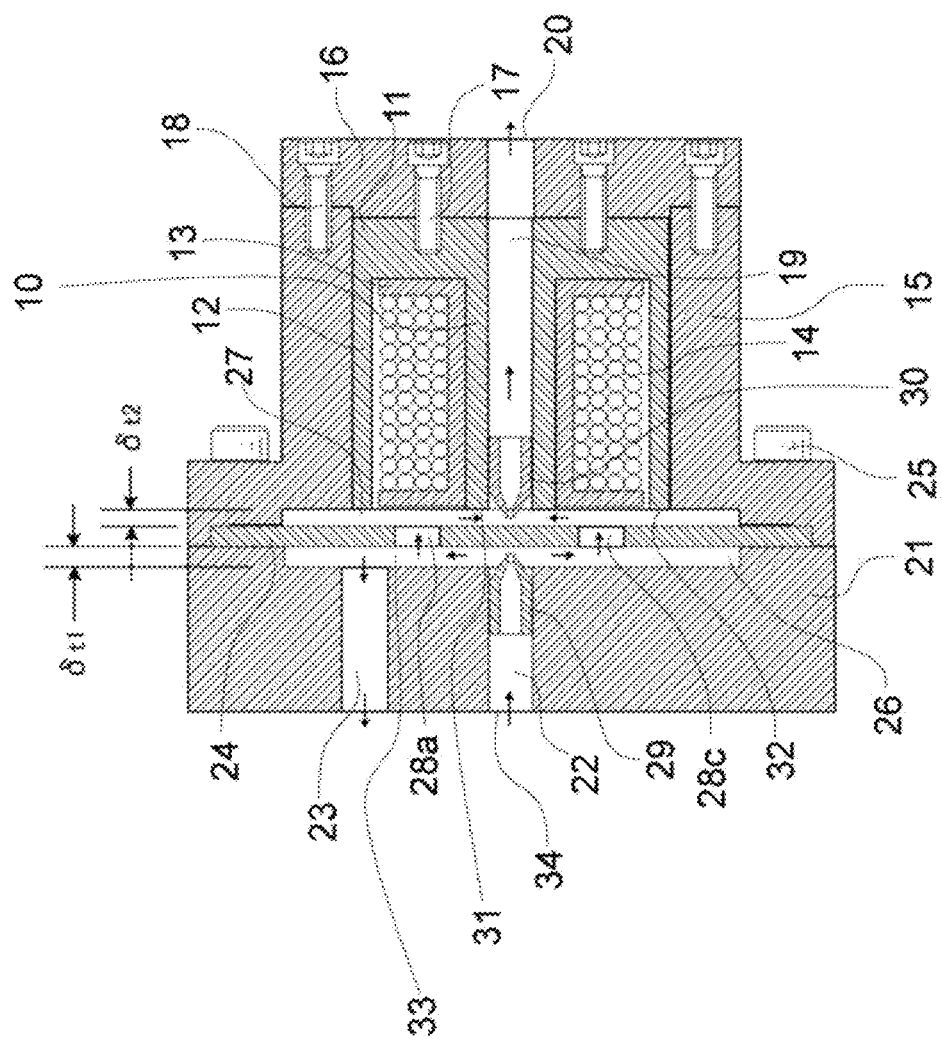
FIG. 1 is a front cross-sectional view of a fluid servo valve according to a first embodiment of the present invention.

10: Central shaft
11: Bottom part of central axis
12: Outer frame part
13: Coil bobbin
14: Coil
15: Housing
16: Exhaust side bottom plate
19: Exhaust side circulation path
20: Ejection port
21: Supply side bottom plate
22: Supply side flow path
23: Control side flow path 24: Flapper
26: Supply side gap part
27: Exhaust side gap part
28a, 28b, 28c, 28d: Circulation hole
29: Forward nozzle
30: Reverse nozzle
31: First magnetic pole
32: Second magnetic pole
33: Control chamber
34: Intake port

DESCRIPTION OF EMBODIMENTS

First Embodiment

FIG. 1 is a front cross-sectional view of a pneumatic servo valve according to a first embodiment of the present invention. Reference character 10 denotes a tubular-shaped central shaft (supporting shaft) made of a magnetic material, 11 the bottom part of the central shaft, 12 an outer frame part formed concentrically with the central shaft, 13 a coil bobbin attached to the central shaft and made of a nonmagnetic material, and 14 a coil wound on the coil bobbin. The central shaft 10, outer frame part 12, coil bobbin 13, and coil 14 constitute an electromagnetic actuator (electromagnet) adapted to attract a face plate part of a flapper (described later) to control the displacement of the flapper. Reference character 15 denotes a tubular-shaped housing that contains the outer frame part 12, 16 an exhaust side bottom plate fastened to a side surface of the housing, 17 a bolt for fastening the bottom part 11 and the exhaust side bottom plate 16, 18 a bolt for fastening the housing 15 and the exhaust side bottom plate 16, 19 an exhaust side circulation path for gas (working fluid) formed in the central shaft 10, and 20 an ejection port formed in the exhaust side bottom plate 16. Reference character 21 denotes a supply side bottom plate, 22 a supply side flow path for the gas formed in the central part of the supply side bottom plate, and 23 a control side flow path for the gas connecting to a pneumatic actuator (not illustrated). Reference character 24 denotes the flapper of a disc shape, which is attached between the housing 15 and the supply side bottom plate 21 using bolts 25. That is, the bolts, the housing, and the supply side bottom plate are flapper supporting members, and adapted to fix the outer edge part of the flapper 24, sandwiching it to prevent the outer edge part from moving. Reference character 26 denotes a supply side gap part formed between the flapper 24 and a wall surface of the supply side bottom plate 21, and 27 an exhaust side gap part formed between the flapper 24 and a supply side wall surface (coil bobbin 13, housing 15, and the like).

Figure 2:
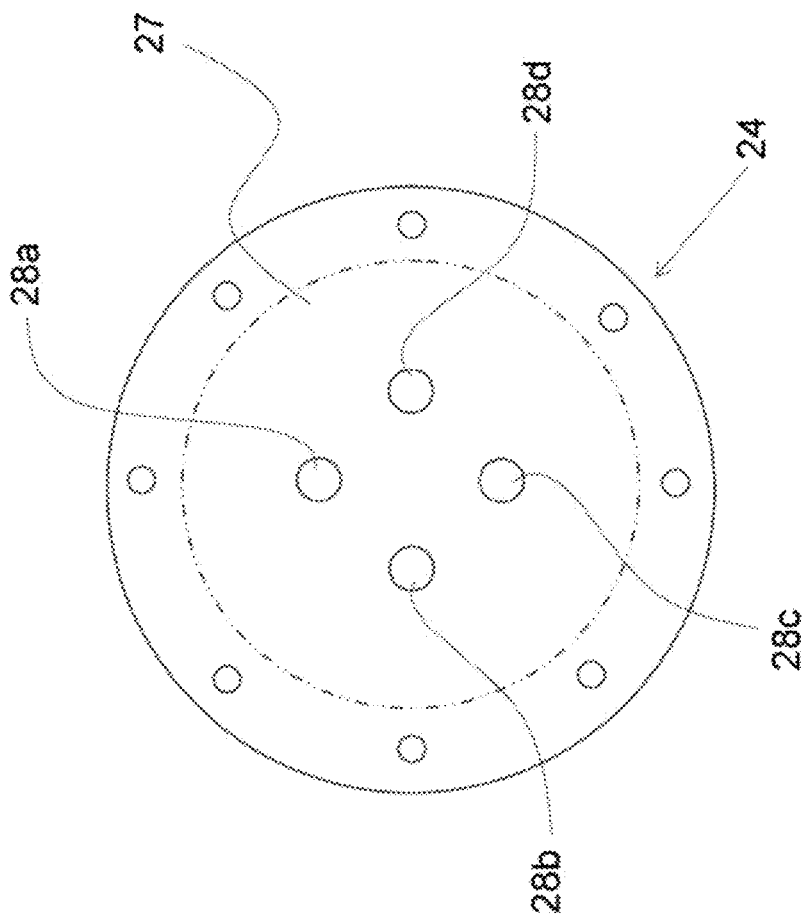
FIG. 2 is a diagram illustrating the shape of a flapper, which is a disc shape, in the first embodiment.
Figure 49:
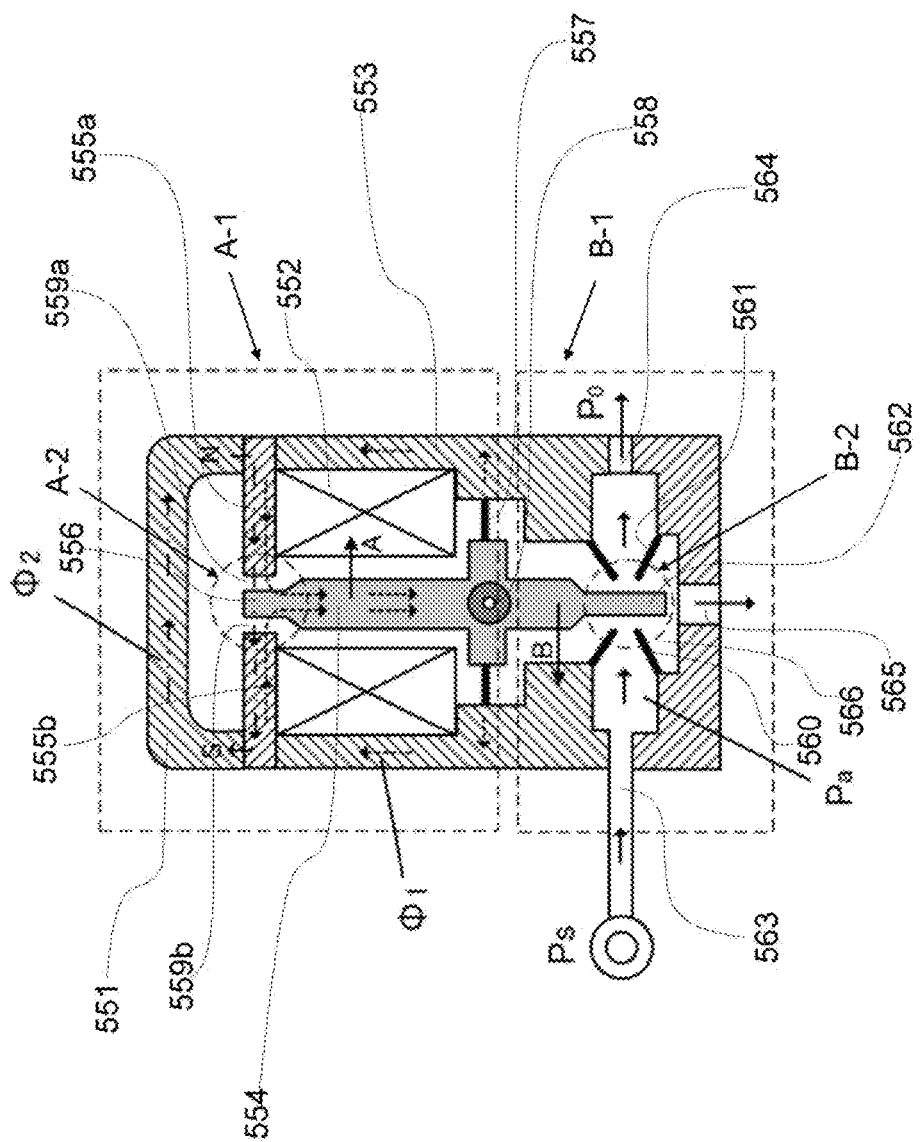
FIG. 49 is a diagram modeling a conventional fluid servo valve.

In the disc-shaped flapper 24 illustrated in FIG. 2, reference characters 28a, 28b, 28c, and 28d denote circulation holes that connect between the supply side gap part 26 and the exhaust side gap part 27 and are formed in the flapper (28b and 28d are not illustrated in FIG. 1). Reference characters 29 and 30 denote a supply side nozzle (forward nozzle) and an exhaust side nozzle (reverse nozzle), respectively. Reference characters 31 and 32 denote the flapper side end surface of the central shaft 10 (a central shaft end surface and a first magnetic pole) and the flapper side end surface of the outer frame part (an outer frame part end surface and a second magnetic pole), respectively. A space formed by the supply side gap part 26, exhaust side gap part 27, and control side flow path 23 is a control chamber 33 of this valve, and reference character 34 denotes an intake port. Incidentally, as illustrated in the model diagram of a conventional valve in FIG. 49, the name "flapper" is typically imaged as a flat plate that swingably moves. In the present invention including this embodiment, a member that is arranged on a virtual surface facing toward the nozzles and adapted to adjust the flow path area of the fluid with respect to each of the nozzles is called a flapper regardless of the shape of the member.

Likewise in the below-described embodiments, in the present embodiment, the exhaust side nozzle is arranged on the centerline of the magnetic poles (first and second magnetic poles) and on the magnetic pole side, whereas on the side opposite to the magnetic poles, the supply side nozzle is arranged interposing the flapper.

Figure 3A:
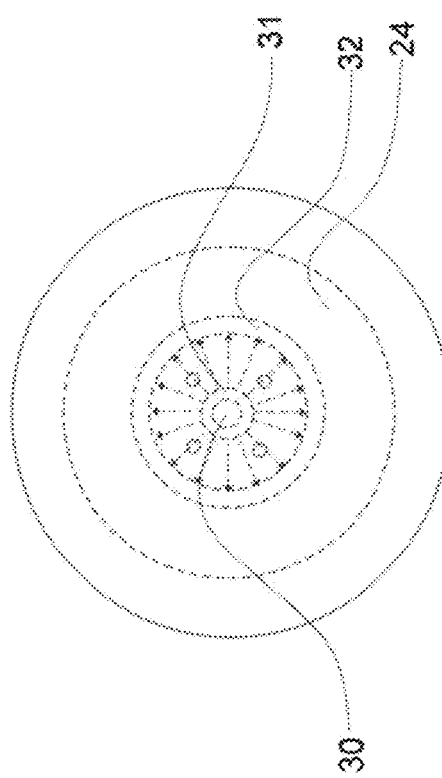
Figure 3B:
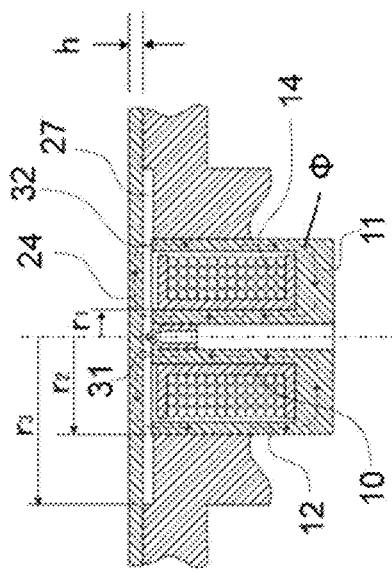

FIGS. 3A and 3B are enlarged diagrams illustrating the vicinity of the electromagnetic actuator, and respectively a top view and a front cross-sectional view. Dashed lines having arrows in the diagrams represent magnetic flux generated by applying current to the coil 14, and the magnetic flux forms a closed loop magnetic circuit of "first magnetic pole 31→gap part 27→flapper 24→gap part 27→second magnetic pole 32→outer frame part 12→bottom part 11→central shaft 10." Note that in the case where the direction of the current applied to the coil 14 is opposite, the direction of the magnetic flux is also opposite. Given here that the magnetic flux flowing through the magnetic circuit is Φ, the ring-shaped area of the central shaft end surface 31 (first magnetic pole) $S_1$, the ring-shaped area of the outer frame part end surface 32 (second magnetic pole) $S_2$, and the permeability of air $\mu_0$, an attractive force F acting on the face plate part of the flapper 24 due to Maxwell stress is given by the following expression.

$$F = \phi^2 \frac{1}{2\mu_0} \left( \frac{1}{S_1} + \frac{1}{S_2} \right) \quad \text{[Expression 1]}$$

The flapper is displaced by the attractive force F to balance the reaction force of a disc spring acting on the flapper and the attractive force F. The magnetic flux Φ is proportional to the value of the current applied to the coil 14, and therefore by varying the current, the flapper displacement, i.e., the gap (separation distance) between each of the nozzles and the surface facing toward the nozzle can be adjusted.

Figure 4A:
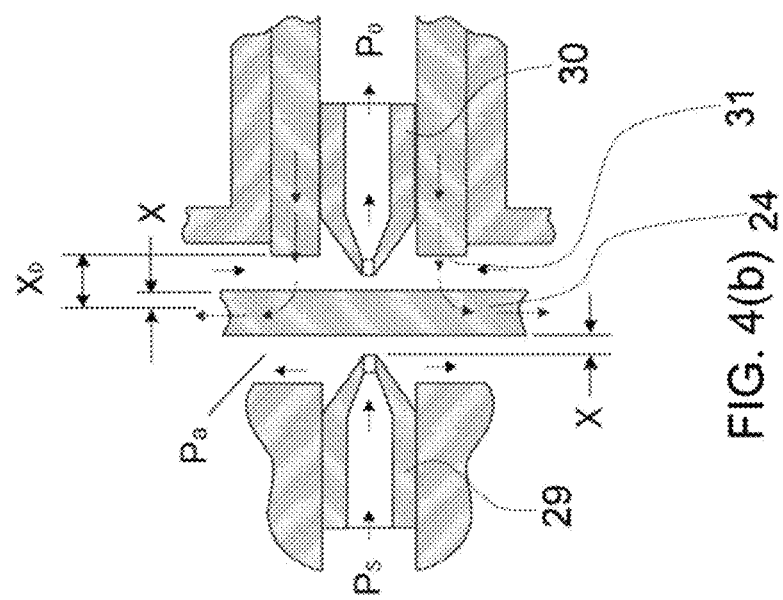
FIGS. 4(a)-4(b) are partial enlarged views illustrating the positional relationship among the flapper, supply side nozzle, and exhaust side nozzle in the first embodiment, in which FIGS. 4(a) and 4(b) respectively illustrate a state where the value of current applied to a coil is I=0, and a state where current is applied to the coil.
Figure 4B:
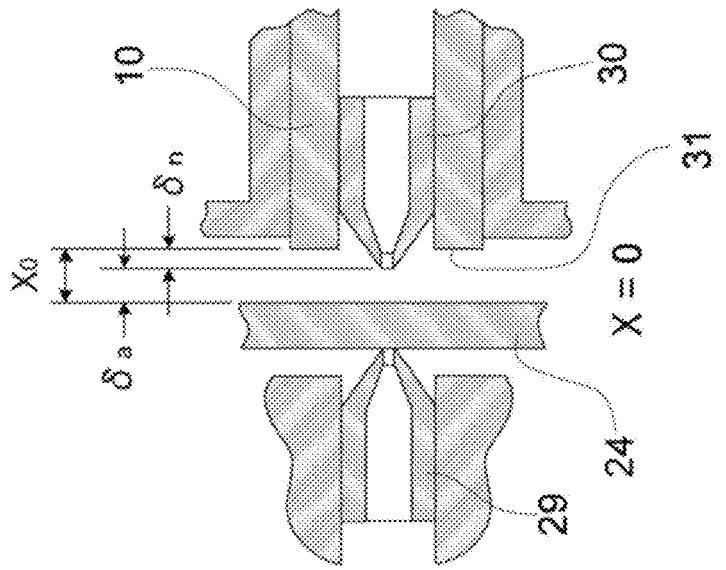

FIG. 4 is a partial enlarged view illustrating the positional relationship between the flapper 24 and a set of the supply side nozzle 29 and the exhaust side nozzle 30, in which FIG. 4A illustrates a state where the value of the current applied to the coil is I=0, and the flapper 24 blocks the tip of the supply side nozzle 29, and FIG. 4B illustrates a state where the current is applied to the coil, and the flapper 24 is at the midpoint between the supply side nozzle 29 and the exhaust side nozzle 30. In FIG. 4A, $X_0$ denotes the gap (initial gap) between the flapper 24 and the first magnetic pole 31, $\delta_n$ the protrusion amount of the exhaust side nozzle 30 tip part with respect to the first magnetic pole 31 end surface, and $\delta_a$ the gap (flow path length) between the exhaust side nozzle 30 tip part and the flapper 24, which corresponds to the maximum stroke of the flapper 24. In the present embodiment, the positional relationship among the respective members are set such that when the value of the current applied to the coil 14 is I=0, as illustrated in FIG. 4A, the flapper 24 blocks the supply side nozzle 29 tip. When the current is applied to the coil 14, as illustrated in FIG. 4B, the flapper 24 separates from the supply side nozzle 29 tip. Note that the displacement X corresponds to the movement amount of the flapper 24 from the initial gap $X_0$ position to the exhaust nozzle 30 side. In the following embodiments as well, it is defined that "a displacement X is a movement amount from an initial gap $X_0$ position."

Figure 5:
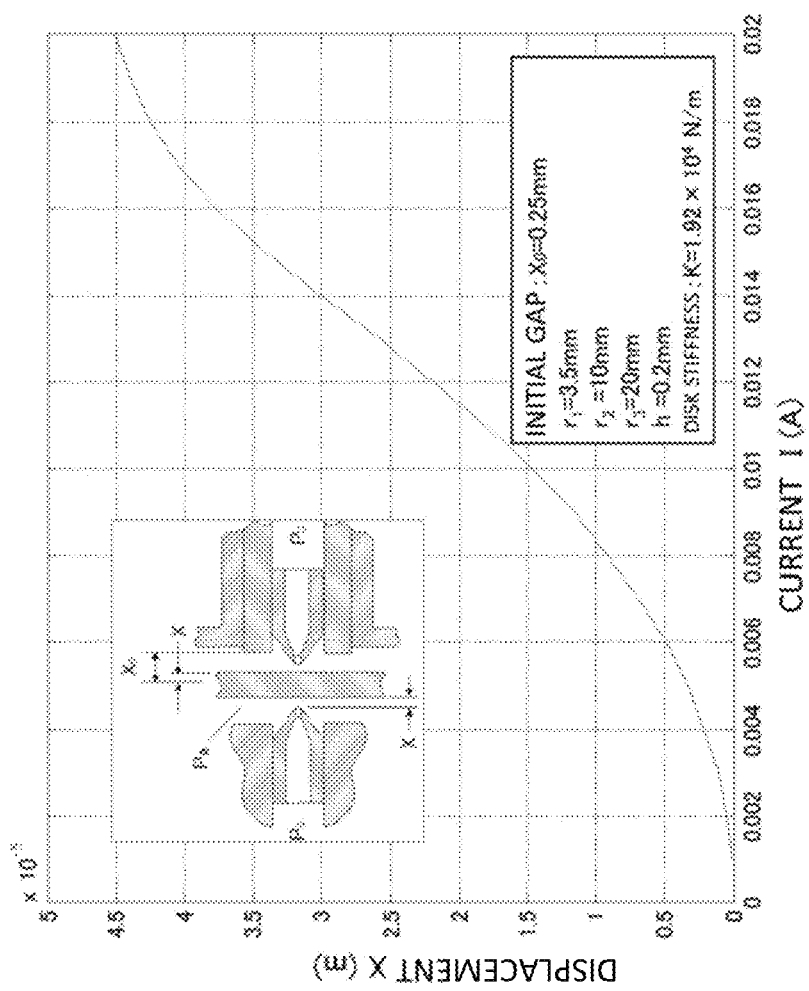
FIG. 5 is a graph illustrating an analysis result of flapper displacement characteristics with respect to the current.

FIG. 5 is a diagram illustrating the flapper displacement X with respect to the current value I under the conditions described in the diagram.

Figure 11:
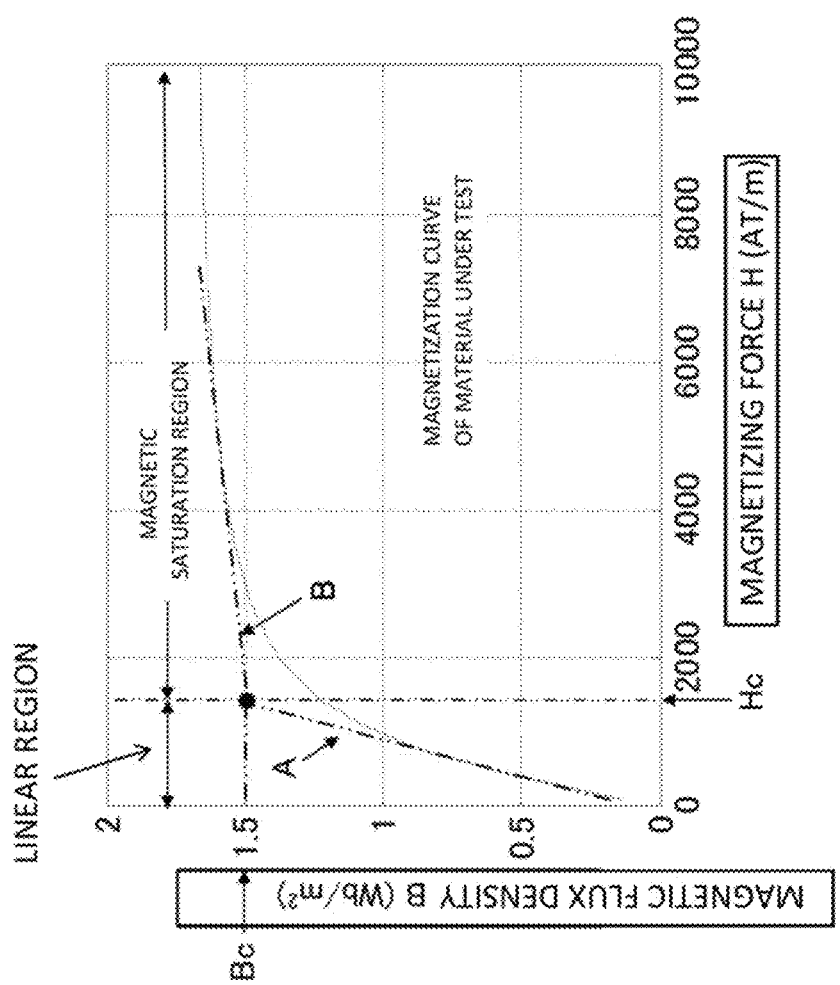
FIG. 11 is a graph illustrating magnetic flux density characteristics with respect to magnetizing force, which is an example of the magnetic characteristic curve of a material under testing in the present embodiment.
Figure 12:
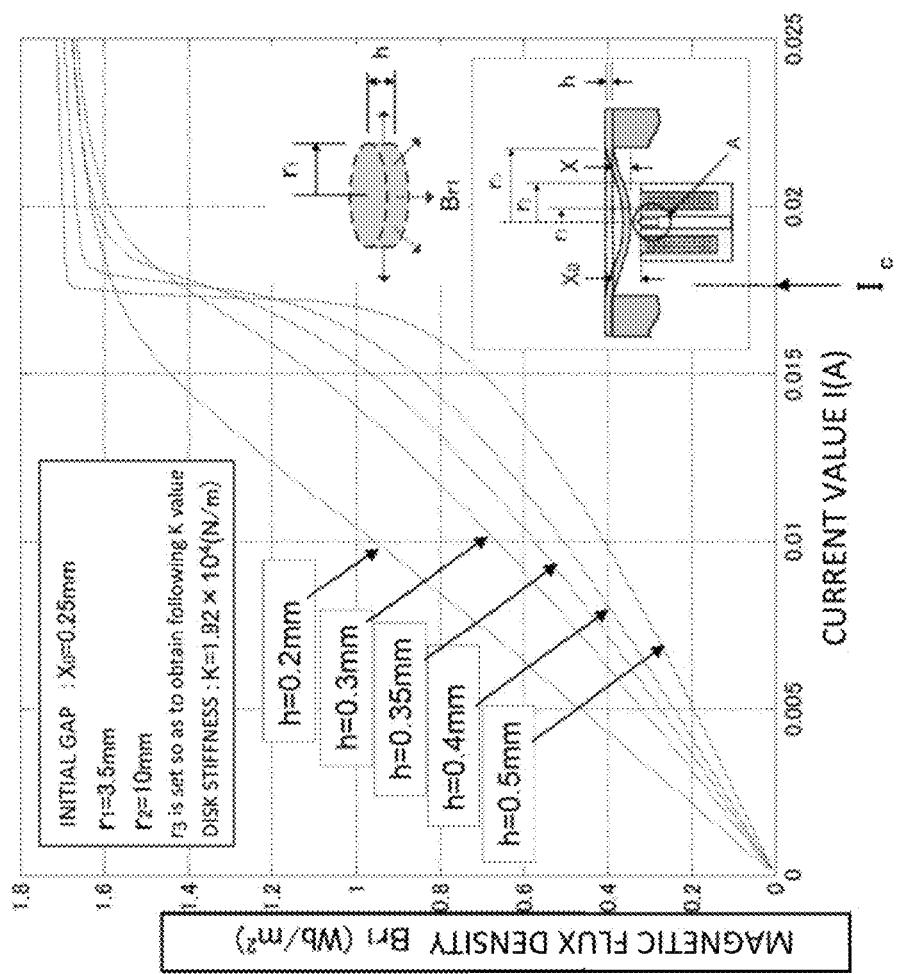
FIG. 12 is a graph illustrating an analysis result of magnetic flux density characteristics with respect to the current.

An analytical method includes:

(i) Giving the gap ($X_0$-X) between the magnetic poles and the flapper to obtain the attractive force F by magnetic force analysis;

(ii) Obtaining the flapper displacement X from the attractive force F and flapper support stiffness K; and (iii) Performing a convergence calculation treating (i) and (ii) as a coupled problem while taking into consideration the relationship between magnetizing force H and magnetic flux density B on a magnetic flux control surface (FIG. 11).

The calculation is performed through the above steps (i) to (iii). Note that the above step (iii) will be described later in detail. From the graph of FIG. 5, at I=0.02 A, X=0.045 mm That is, in the case where the flapper 24 is configured to block the exhaust nozzle 30 at I=0.02 A, the maximum stroke of the flapper is $X_{max}=\delta_a=0.045$ mm. Accordingly, it is only necessary to set the nozzle protrusion amount as $\delta_n=X_0-\delta_a=0.250-0.045=0.205$ mm.

The pressure/flow rate characteristics of the servo valve according to the present embodiment at the time of giving the gap between each of the nozzles and the flapper will hereinafter be obtained. For the mass flow rate of the gas passing through each of the nozzles of the servo valve, Expressions 2 or 3 for a nozzle in the isentropic flow of compressible fluid are used. The opening area between the nozzle and the flapper corresponds to an annular flow path area formed between the nozzle tip and the flapper, and given that the inside diameter of the nozzle is denoted by d, supply side and exhaust side opening areas are denoted by $a_m=d\pi X$ and $a_{out}=d\pi(\delta_a-X)$, respectively. The mass flow rate $G_{in}$ of the gas flowing from the supply source side into the air chamber is given by the following expressions. In the expressions, $P_s$ denotes a supply source pressure, $P_a$ the control chamber pressure of the servo valve, $\rho_s$ supply source gas density, and κ a specific heat ratio.

$$G_{in} = a_{in}\sqrt{2\rho_s P_s \frac{\kappa}{\kappa-1}\left[\left(\frac{P_a}{P_s}\right)^{\frac{2}{\kappa}} - \left(\frac{P_a}{P_s}\right)^{\frac{\kappa+1}{\kappa}}\right]} \quad \text{[Expression 2]}$$

Note that in the case of $P_a/P_s<\{2/(\kappa+1)\}2/(\kappa-1)$, $G_{in}$ is given by the following expression.

$$G_{in} = a_{in}\sqrt{2\rho_s P_s \frac{\kappa}{\kappa-1}\left(\frac{2}{\kappa+1}\right)^{2/(\kappa-1)}} \quad \text{[Expression 3]}$$

For the mass flow rate $G_{out}$ of the gas flowing from the control chamber to the air side, it is only necessary to replace $P_s \to P_a$, $P_a \to P_0$, $\rho_s \to \rho_a$, and $a_{in} \to a_{out}=d\pi(\delta_a-X)$ in Expression 2 or 3. $V_c$ denotes the volume of the control chamber 33, and R the gas constant. The pressure $P_a$ of the control chamber 33 can be obtained in accordance with the following expression using the mass flow rates $G_{to}$ and $G_{out}$.

$$\frac{dP_a}{dt} = \frac{\kappa R T_s}{V_c}(G_{in} - G_{out}) \quad \text{[Expression 4]}$$

Figure 6:
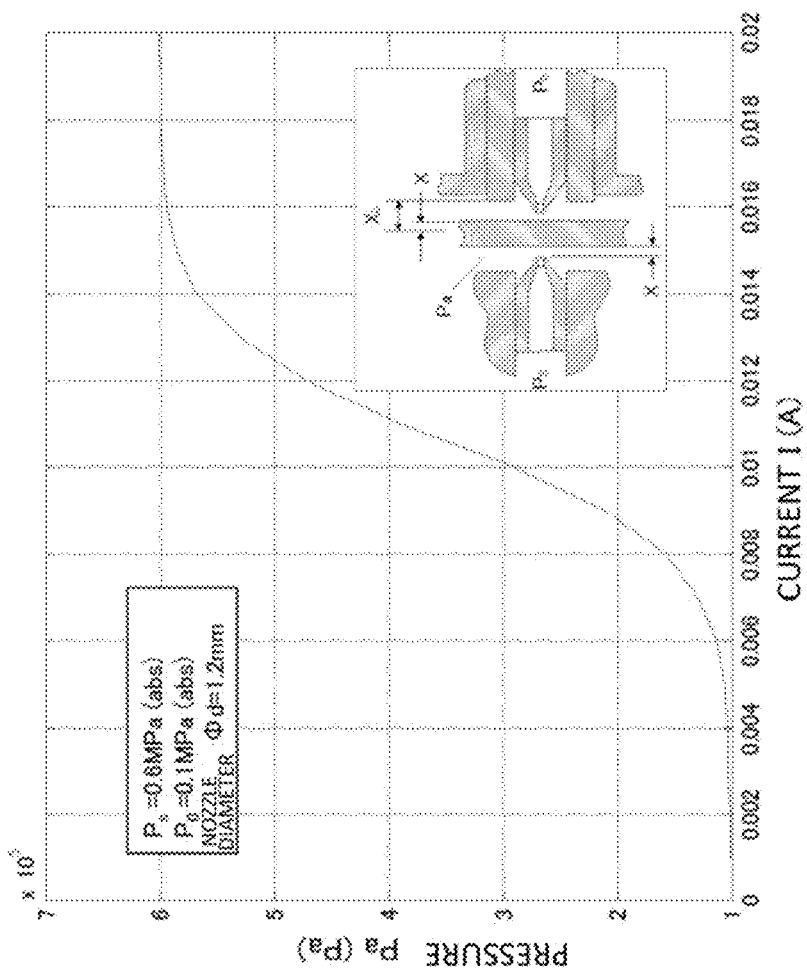
FIG. 6 is a graph illustrating an analysis result of control pressure characteristics with respect to the current.

FIG. 6 is a diagram illustrating a result of analyzing the control pressure with respect to the current value in a steady state in the pneumatic valve according to the first embodiment. The control pressure refers to the pressure $P_a$ of the control chamber 33 formed by the supply side gap part 26 connecting to the control side flow path 23 and the exhaust side gap part 27. The conditions for the analysis are: the supply pressure $P_s$=0.6 MPa (abs), atmospheric pressure $P_0$=0.1 MPa (abs), and the inside diameters of the supply side nozzle 29 and the exhaust side nozzle 30 are both Φ1.2 mm.

Figure 7:
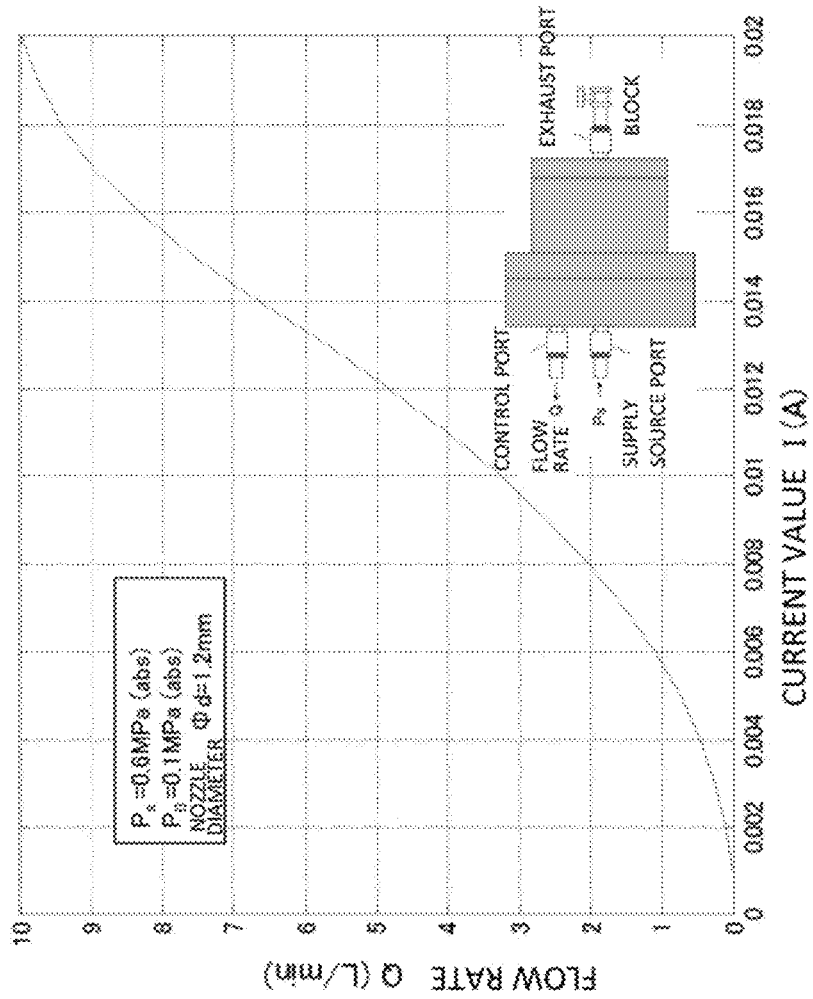
FIG. 7 is a graph illustrating an analysis result of control flow rate characteristics with respect to the current in a state where an exhaust port is blocked.

FIG. 7 is a diagram illustrating control flow rate characteristics with respect to the current in a state where an exhaust port is blocked. The curve profile of the control flow rate characteristics with respect to the current value almost coincides with that of the flapper displacement characteristics with respect to the current value in FIG. 5.

Figure 8:
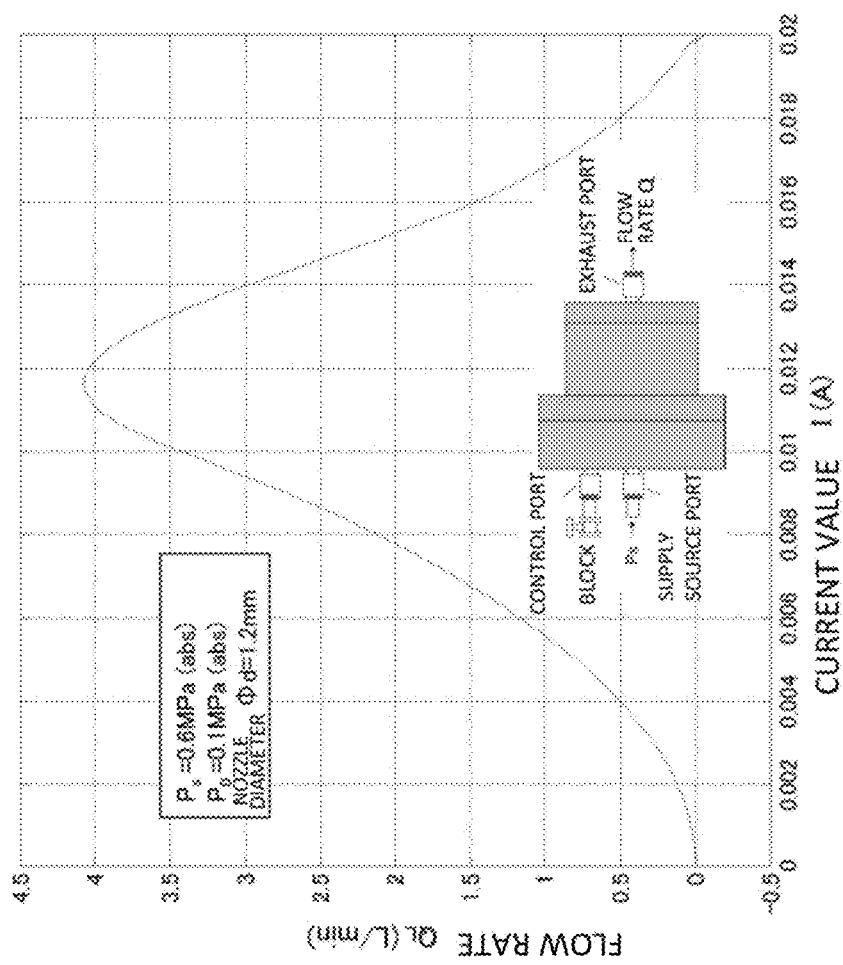
FIG. 8 is a graph illustrating an analysis result of internal leak flow rate characteristics with respect to the current.

FIG. 8 is a diagram illustrating an internal leak flow rate with respect to the current value in the pneumatic servo valve. The internal leak flow rate is defined as a flow rate $Q_L$ from the exhaust side flow path 19 in a state where the control side flow path 23 of the valve is blocked.

In the graph of FIG. 5 illustrating the flapper displacement with respect to the current value, at the current value I=0.0118 A, the displacement is X=0.02 mm, i.e., the flapper 24 is at substantially the midpoint between the supply side nozzle 29 and the exhaust side nozzle 30. It turns out that in this state, the internal leak flow rate $Q_L$ illustrated in FIG. 8 indicates the maximum value.

The distinctive features of the valve according to the present embodiment can be listed as follows.

(1) The resonance frequency can be set high.

(2) The valve can be driven by low power.

(3) High-speed responsiveness can be obtained.

(4) The structure is simple and the number of components is small, facilitating component machining, assembling, and adjustment.

The reason for (1) above is as follows. Given that the movable mass of the flapper is denoted by m, and the constant of the spring supporting the flapper is denoted by K, the resonance frequency $f_0$ is given by the following expression.

$$f_0 = \frac{1}{2\pi}\sqrt{\frac{K}{m}} \quad \text{[Expression 5]}$$

As described above, in the conventional servo valve (FIG. 49), the flapper 554 as a rigid body swingably moves, and therefore the mass m of the flapper must be large. For this reason, by setting the stiffness K of the spring supporting the flapper high, the resonance frequency $f_0$ (Expression 5) is set high. In the case where the stiffness K of the spring 557 for supporting the flapper is high, a large force is required for driving the flapper 554. In the case of the conventional servo valve (FIG. 49), a magnetic flux $\Phi_1$ generated by the electromagnetic coil is amplified by a magnetic flux $\Phi_2$ generated by the permanent magnet, and thereby a large flapper driving force (F∝$\Phi_1$×$\Phi_2$) is obtained.

However, in the present embodiment, only the magnetic flux $\Phi_1$ generated by the electromagnetic coil acts as a force for driving the flapper valve. Nevertheless, the high resonance frequency is obtained. The reason for this is as follows.

This study has focused on the point that when forming the member corresponding to the flapper of the valve in a thin disc shape, the effective mass m of the movable part serving as an inertial load only corresponds to that of an elastic deformation part near the nozzle tips. That is, in the conventional servo valve, the flapper 554 as a rigid body having the mass m is supported by the spring 557, whereas in the servo valve of the present invention, the flapper itself is an elastic body (spring). Table 1 compares the effective mass of a movable part, the stiffness of a spring supporting a flapper, and a resonance frequency between the valve in the present embodiment and the conventional flapper valve (example). The effective mass m of the movable part in the present embodiment is obtained from the actual measured values of the spring stiffness K and the resonance frequency $f_0$ using Expression 5. In addition, since the flapper 554 as the movable part of the conventional servo valve swingably moves, the effective mass serving as an inertial load is assumed to be half an actual measured value (5 g).

TABLE 1

|  | Effective mass of movable part | Spring stiffness | Resonance frequency |
|---|---|---|---|
| Embodiment of the present invention | 0.338 g | $1.92 \times 10^4$ N/m | 1200 Hz |
| Conventional flapper valve (example) | 2.5 g | $7.98 \times 10^4$ N/m | 900 Hz |

From Table 1, it turns out that even though the valve according to the embodiment of the present invention has the resonance frequency equal to or more than that of the conventional servo valve, the effective mass of the movable part is approximately 1/7, and the spring stiffness is approximately 1/4. Since the stiffness of the spring part supporting the flapper can be sufficiently reduced, the valve according to the present embodiment can drive the flapper only using the electromagnet despite having the high resonance frequency.

The reason for the above (2) is as follows. The reason why the servo valve of the present invention can be driven by low power (weak current) lies in the point that Maxwell stress acting on the conductor surface is used as a driving source. Typically, as an actuator adapted to linearly move an object within a range of small displacement of the order of 0.1 to several mm, a voice coil motor (linear motor) is used. In the above-described Patent Literature 4 as well, the servo valve using a voice coil motor is devised. However, a voice coil motor utilizes the Lorentz force, and therefore a large thrust constant (electromechanical conversion efficiency) cannot be obtained. The present embodiment utilizes the point that for a determinate object, i.e., the pneumatic servo valve, the Maxwell stress having a thrust constant far higher than that of the Lorentz force can be used. Table 2 shows an example of comparing the thrust constant in the present embodiment with that of a commercially available voice coil motor.

TABLE 2

|  | Outside diameter of actuator part | Thrust constant (N/A) |
|---|---|---|
| Embodiment of the present invention | 20 mm | 43.2 |
| Voice coil motor (example) | 20 mm | 1.90 |

From Table 2, it turns out that the thrust constant of the actuator of the valve according to the present embodiment is at least 20 times higher than that of the voice coil motor. For this reason, it is enough that the capacity of a power supply for driving the servo valve according to the present embodiment is sufficiently small and the required current is weak. Incidentally, the thrust constant in the present embodiment is obtained by dividing the reaction force (F=$1.92 \times 10^4 \times 4.5 \times 10^{-5}$) of the spring part at the maximum displacement by the maximum current ($I_{max}$=0.02 A) using the graph of FIG. 5 illustrating the displacement characteristics with respect to the current.

The reason for the above (3) is inevitably derived from the distinctive features (1) and (2) of the valve according to the present embodiment. That is, since the inertial load m and the spring stiffness K are small, and the electromechanical conversion efficiency is high, the number of turns of the coil is also small and the inductance of the electric circuit is also small. Accordingly, the transfer characteristics of the flapper displacement (flow rate) with respect to the input current exhibit sufficiently high responsiveness.

The reason for the above (4) is as follows. The conventional pneumatic servo valve (see FIG. 49) secondarily produced from the hydraulic servo technology is structured to separate the actuator part and the fluid control part from each other, whereas the present embodiment is structured to integrate the actuator part and the fluid control part with each other. Likewise in embodiments described later, the actuator part in the present embodiment is configured to include the electromagnetic actuator part (electromagnet), the flapper, and the flapper supporting member (the tubular-shaped housing and the supply side bottom plate 21). Also, the fluid control part is configured to include the flapper, the nozzles, the supply side flow path 22 including the intake port, the exhaust side flow path 19 including the ejection port, and the supporting member. In FIGS. 4A and 4B illustrating the enlarged diagrams of the nozzle part, as described above, FIG. 4A illustrates the state where the value of the current applied to the coil is I=0, and FIG. 4B illustrates the valve driving state. The reason why the actuator part and the fluid control part can be structurally integrated in the present invention is because the present invention has focused on the fact that the magnetic gap maximum value $X_0$ between the magnetic poles of which the magnetic attraction action can be effectively utilized and the flapper, and the maximum value of the air gap $\delta_a$ (flow path length) between the nozzle and the flapper, which can be effectively utilized as a pneumatic servo valve, are of the same order, i.e., 0.05 to 0.20 mm. The characteristics of the magnetic attractive force with respect to the air gap are nonlinear, and when exceeding the maximum value above, the magnetic attractive force is usually significantly reduced. In the case of the nozzle flapper valve as well, the air gap $\delta_a$ making it possible to linearly change a flow rate is normally restricted within the above range. Further, in the present embodiment, the central shaft 10 of the electromagnetic actuator is formed in the tubular shape to form the exhaust side circulation path 19 for air. This configuration makes it possible to significantly simplify the nozzle flapper valve based on a bidirectional flapper. Incidentally, in the present embodiment, FIG. 4A illustrates the state where the positional relationship between the supply side nozzle 29 and the flapper 24 is set so as to make the flapper 24 block the supply side nozzle 29 at the coil current value I=0. This is a safety function (fail safe function) that, when the active control is disabled at the time of a power failure, blocks the high-pressure air from flowing into the pneumatic actuator (not illustrated).

Further, the valve according to the present embodiment entirely consists of axisymmetric components. For this reason, all the components can be prepared only by lathe machining, and the number of components can be reduced to simplify adjustment after assembling. The reason why the valve according to the present embodiment can be axisymmetrically configured is because as described above, the exhaust side nozzle is arranged on the centerline of the magnetic poles (first and second magnetic poles) and on the magnetic pole side, whereas on the side opposite to the magnetic poles, the supply side nozzle is arranged interposing the flapper. Note that the exhaust side nozzle and the supply side nozzle may be opposite in position.

Further, as described above, the sum of the volumes of the supply side gap part 26, the exhaust side gap part 27, and the control side flow path 23 corresponds to the total volume $V_c$ of the control chamber 33 connecting to the pneumatic actuator. The size of the volume $V_c$ significantly affects control performance (responsiveness) in terms of performing the active control (fluid servo), and therefore the volume $V_c$ is preferably as small as possible. Since the valve according to the present embodiment consists of the axisymmetric components, the gaps $\delta_{r1}$ and $\delta_{r2}$ can be formed narrowly, and as compared with a valve (described later) configured as a three-dimensional structure, the total volume $V_c$ of the control chamber 33 can be sufficiently reduced because any space for containing the coil is not required.

Second Embodiment

Assumed here is a device adapted to apply current to an electromagnet to utilize the magnetic attraction action of a movable part caused by the full Maxwell stress T. In the case of the graph A in FIG. 9, the displacement characteristic of the movable part with respect to current is nonlinear, in which the displacement steeply rises as the current value increases, and therefore such a moveable part is often used for a device (such as a relay) requiring an ON/OFF function. However, in the process of this study, it has turned out that when using an appropriate magnetic material and a thin disc for a movable part corresponding to a flapper, as the displacement characteristics of the flapper with respect to current, characteristics superior in linearity as indicated by the graph B in FIG. 9 can be obtained. This is an effect found on the basis of an accidental discovery. In order to theoretically investigate the phenomenon found by this study to evaluate applicability to a nozzle flapper valve, the following theoretical analysis has been made.

1. Theoretical Analysis

Figure 10A:
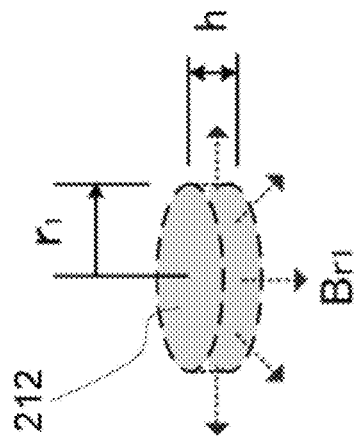
FIG. 10(a) is a model diagram for analytically obtaining magnetic resistance against magnetic flux flowing through a disc, FIG. 10(b) a front cross-sectional view illustrating the disc as a flapper and an electromagnet, and FIG. 10(c) a diagram illustrating a magnetic flux control surface serving as an outflow source of the magnetic flux radially flowing through the disc.
Figure 10B:
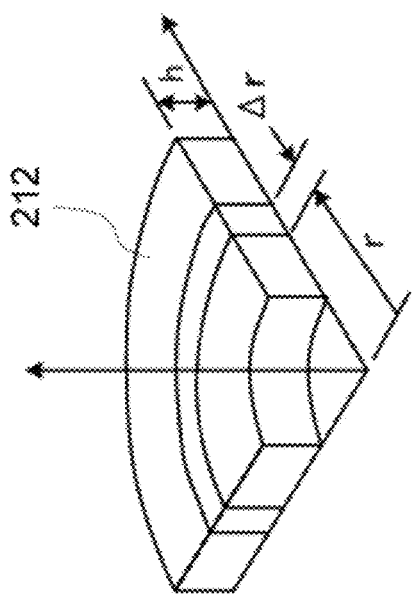
Figure 10C:
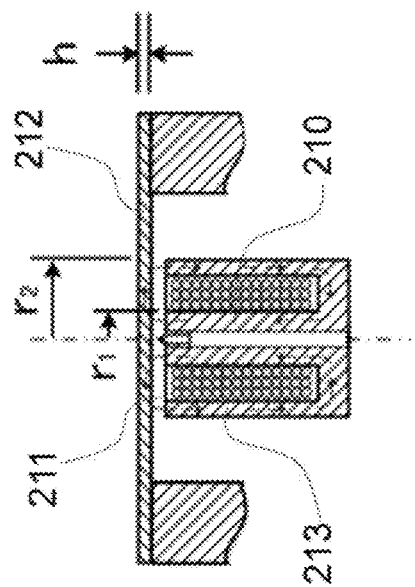

FIG. 10 is a diagram modelling the structure of the pneumatic servo valve (FIG. 1) in the first embodiment, in which FIG. 10A is a partial cross-sectional view of the disc (flapper), FIG. 10B a front cross-sectional view modelling the pneumatic servo valve, and FIG. 10C a diagram illustrating the below-described maximum magnetic flux control surface. In FIG. 10B, reference character 210 denotes the central shaft, 211 the gap part, 212 the flapper, and 213 the outer frame part. In the above model diagram FIG. 10B, as described above, the magnetic flux Φ generated by applying the current to the coil draws a closed loop via the path "central shaft 210→gap part 211→flapper 212→gap part 211→outer frame part 213." Now, the magnetic resistance of the magnetic circuit formed by the magnetic flux radially flowing through the disc will be obtained. In FIGS. 10A and 10B, the magnetic resistance $\Delta R_c$ of a radial part $\Delta r$ is given by the following expression.

$$\Delta R_c = \frac{\Delta r}{2\pi r h \mu_0 \mu_s} \qquad \text{[Expression 6]}$$

In Expression 6, h denotes the thickness of the disc (flapper), $\mu_0$ the permeability of air, and $\mu_s$ the relative permeability of a disc material. When obtaining the total resistance $R_e$ from a radius $r=r_1$ to $r=r_2$, $R_e$ is given by the following expression.

$$R_e = \frac{1}{2\pi h \mu_0 \mu_s} \int_{r_1}^{r_2} \frac{1}{r} dr = \frac{1}{2\pi h \mu_0 \mu_s} \log \frac{r_2}{r_1} \qquad \text{[Expression 7]}$$

Given that magnetic resistance other than the magnetic resistance $R_e$ of the disc is denoted by $R_b$, the magnetic flux Φ is given by the following expression.

$$\Phi = NI(R_e + R_b) \qquad \text{[Expression 8]}$$

In Expression 8, N denotes the number of turns of the coil, and I is the value of the current applied to the coil. Also, $R_b$ denotes the sum of the respective magnetic resistances of the two gap parts 211 between the flapper and the magnetic poles, central shaft 210, outer frame part 213, and bottom part. FIG. 11 is a diagram illustrating magnetic flux density B characteristics with respect to magnetizing force (magnetic field strength) H, which is an example of the magnetic characteristic curve of the material under test in the present embodiment. The range of $0<H<H_c$ where the magnetic flux density B increases in proportion to the magnetizing force H is defined as a linear region, whereas the range of $H>H_c$ where the gradient of the magnetic flux density B significantly reduces with respect to the magnetizing force H is defined as a magnetic saturation region. Incidentally, $H_c$ is obtained from the intersection point between an envelope curve A of the BH characteristic curve in the range of $0<H<H_c$ and an envelope curve B of the BH characteristic curve in the range of $H>H_c$. $H_c$ is defined as a magnetizing force boundary value between the linear region and the magnetic saturation region, and the magnetic density at $H=H_c$ is defined as a magnetic flux density boundary value $B_c$. In the case of the characteristic curve of the magnetic material in FIG. 11, $H_c=1500$ AT/m, and $B_c=1.5$ Wb/m².

If the closed loop magnetic circuit through which the magnetic flux Φ flows has a site where a magnetic path area $S_c$ is extremely small, the magnetic flux density at this site ($B=\Phi/S_c$) is the highest. That is, when the magnetizing force H exceeds a predetermined value at this site, the magnetic flux density B is magnetically saturated. Given that the magnetic flux density B magnetically saturated is denoted by $B=B_{max}$, the magnitude of the magnetic flux is suppressed within the range of $\Phi < S \cdot B_{max}$.

FIG. 10C focuses on a ring-shaped side surface having a radius of $r=r_1$ and a thickness of h (magnetic path area $S_c=2\pi r_1 h$). This surface is a site functioning as an outflow source (or an inflow source) of the magnetic flux radially flowing through the disc, and also a site adjusting a magnetic saturation phenomenon (hereinafter referred to as the maximum magnetic flux control surface). The magnetic flux density at the site is given by the following expression.

$$B_{r1} = \frac{\Phi}{2\pi r_1 h}. \qquad \text{[Expression 9]}$$

It turns out from the above expression that when the magnetizing force H exceeds the predetermined value, i.e., $H>H_c$ in the case where the magnetic path area $S_c$ ($=2\pi r_1 h$) of the maximum magnetic flux control surface is extremely small, the magnetic flux density and magnetic flux are magnetically saturated along the curve in the graph (FIG. 11), and the attractive force F (Expression 1) acting on the face plate part of the flapper (212 in FIG. 10B) is also suppressed.

FIGS. 12 to 15 are diagrams respectively illustrating analysis results of obtaining the magnetic flux density $B_{r1}$, the attractive force F of the electromagnet, the flapper displacement X, and the flow rate Q from the control port with respect to the current value in accordance with the above-described analysis method while variously changing the thickness h of the disc. As analysis conditions are described in the graph of FIG. 12, the value of the radius $r_3$ of the flapper supporting part is set so as to make the flapper support stiffness constant. In this case, the magnetic flux density $B_{r1}$ and the attractive force F are a function of the current value and a distance between the electromagnet and the disc. In other words, when the current value becomes bigger or the distance between the electromagnet and the disc becomes smaller, the magnetic flux density $B_{r1}$ and the attractive force F become greater. When focusing on the characteristics of the magnetic flux density $B_{r1}$ with respect to the current value in FIG. 12, it turns out that:

a. In the case where the disc thickness is large, h=0.5 mm, as the current value increases, the magnetic flux density $B_{r1}$ steeply increases from near I=$I_c$ (0.017 A), exhibiting nonlinear characteristics, and in the range of I>$I_c$ the magnetic flux density $B_{r1}$ is saturated and converged to a constant value of $B_{r1}$=1.7 Wb/m² (see FIG. 11).

Figure 9:
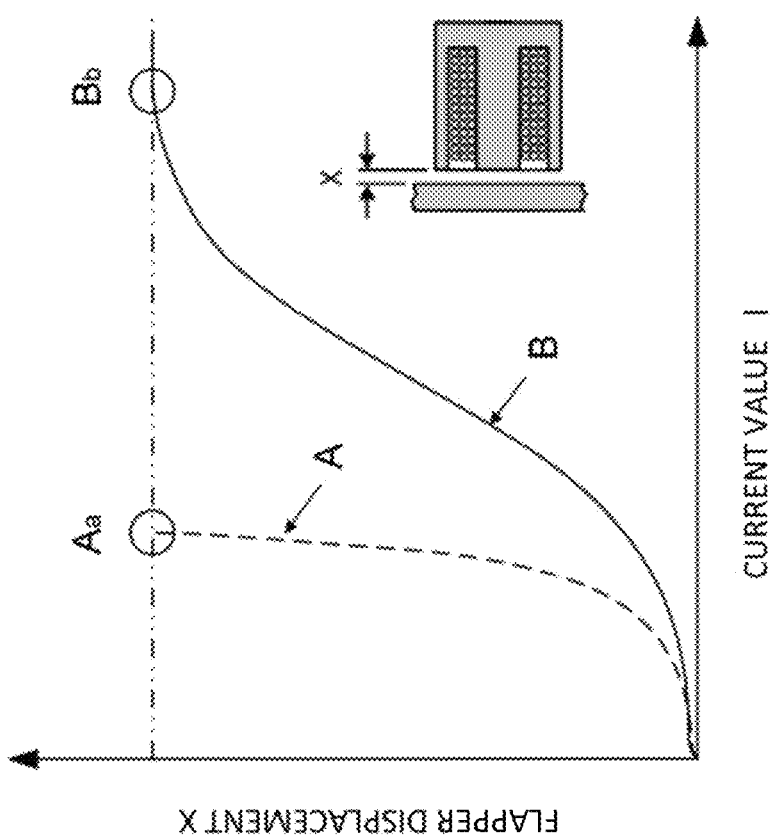
FIG. 9 is a graph illustrating flapper displacement characteristics with respect to current for explaining the outline of a second embodiment of the present invention.

This is because the magnetic flux density $B_{r1}$ becomes drastically greater not only by the increase of the current value and but also by the decrease of the distance between the electromagnet and the disc (this is corresponding to X of FIG. 9). This corresponds to the characteristic of graph A of FIG. 9 and like a function like ON/OFF that a normal electromagnet has.

b. In the case where the disc thickness is small, h=0.2 mm, the magnetic flux density $B_{r1}$ with respect to the current value is linear over the entire range, exhibiting linear characteristics.

In the case of the above b, in the range of 0<I<$I_c$, the magnetic flux density $B_{r1}$ is large as compared with the case of the above a. After the magnetic flux density increases in the area of I>$I_c$, it is smoothly suppressed. This is because when the current value reaches $I_c$, the magnetic flux density $B_{r1}$ has already increased to a value of the same level as a magnetic saturation level, and from this state, enters the magnetic saturation region. This result corresponds to the characteristic of graph B disclosed in FIG. 9 that the present inventor found. Thus, in the above described case a, the magnetic flux density $B_{r1}$ enters the magnetic saturation region after the flapper displacement reaches the max value by the increase of the current value. On the contrary, in the above described case b, the magnetic flux density has already entered the magnetic saturation region before the flapper displacement reaches the max value by the increase of the current value. Accordingly, if (1) the magnetic path area (disc thickness) is decreased to increase the magnetic flux density while the current value is small, and (2) the magnetic saturation is activated at near the current value $I_c$ at which the magnetic flux density starts to steeply increase, the magnetic flux density $B_{r1}$ characteristics with respect to the current value are made extremely superior in linearity, in which the linear region smoothly transitions to the magnetic saturation region. The magnetic flux density characteristics superior in linearity are reflected also in the linearities of various types of characteristics such as the displacement characteristics and the flow rate characteristics.

Figure 13:
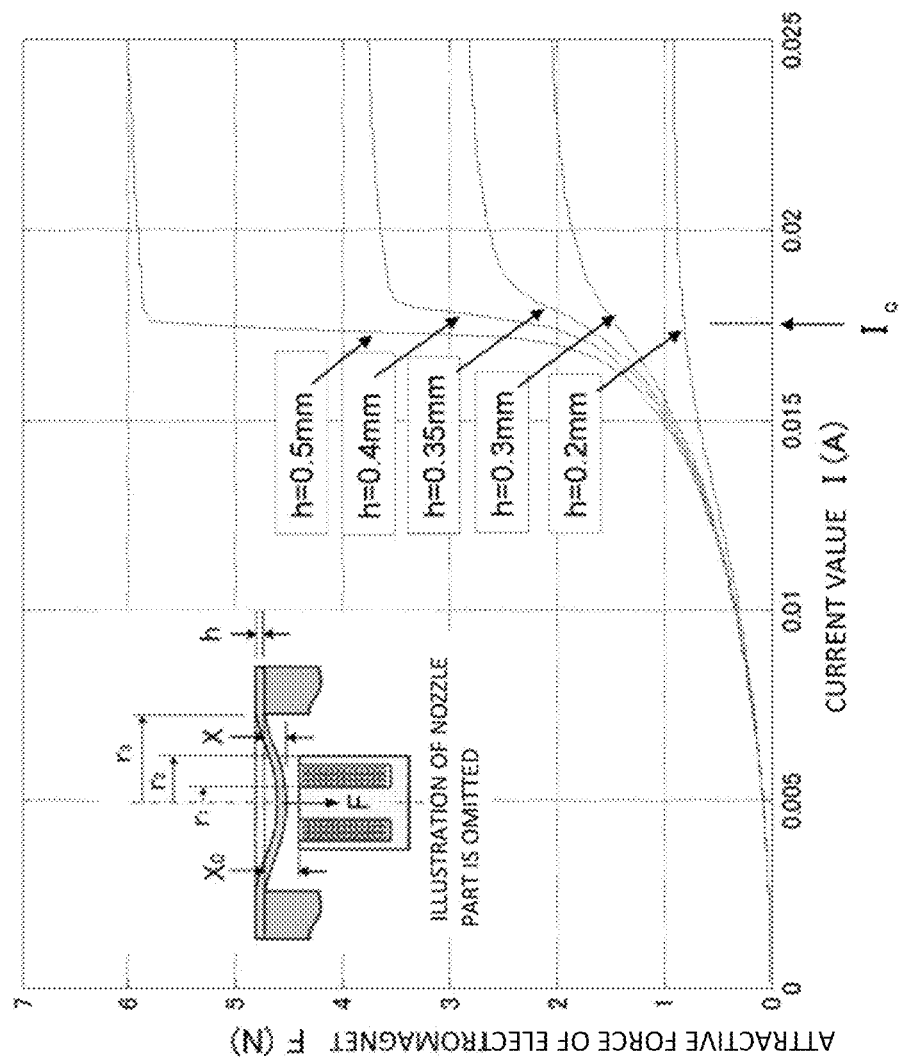
FIG. 13 is a graph illustrating an analysis result of electromagnet attractive force characteristics with respect to the current.
Figure 14:
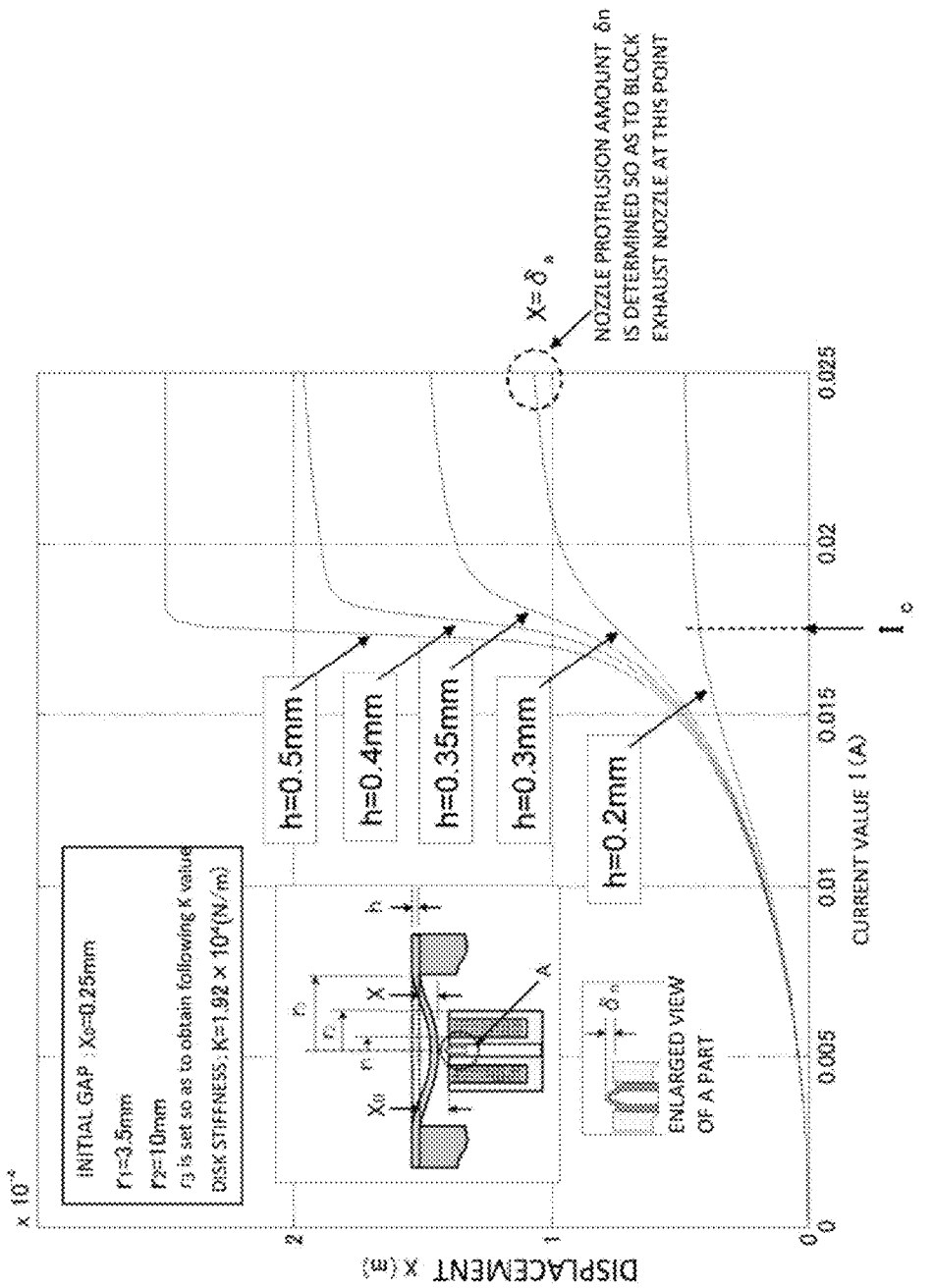
FIG. 14 is a graph illustrating an analysis result of flapper displacement characteristics with respect to the current.

The features of the electromagnet attractive force, flapper displacement, and flow rate characteristics with respect to the current value in FIGS. 13 to 15 will be described using the above knowledge obtained in this study. FIG. 13 illustrates the result of obtaining the electromagnet attractive force (the restoring force of the disc spring) with respect to the current value while variously changing the thickness h of the disc. The curve profiles of the electromagnet attractive force characteristics with respect to the current value are almost coincident with corresponding ones of the curve profiles of the below-described flapper displacement characteristics with respect to the current value (FIG. 14). The reason why in the case of h=0.5 mm, the flapper displacement keeps a constant value X=0.25 mm at I>$I_c$ in the flapper displacement characteristics with respect to the current value illustrated in FIG. 14 is because the maximum gap (initial gap) between the flapper and the first magnetic pole is set to $X_0$=0.25 mm (see FIG. 4). In the case of h=0.2 to 0.3 mm, the flapper-valve displacement characteristics (and the flow rate characteristics) with respect to the current value exhibit linear displacement, which are ideal characteristics in terms of controllability. As described above, this corresponds to the third condition required for a pneumatic servo valve applied to an active vibration isolation table, i.e., (3) "Linearity: . . . a generated pressure has a linear proportional relationship with a valve driving current". In the case of h>0.35, as the current value increases, the flapper displacement steeply increases from near I=$I_c$ (=0.017 A), exhibiting nonlinear characteristics.

Figure 15:
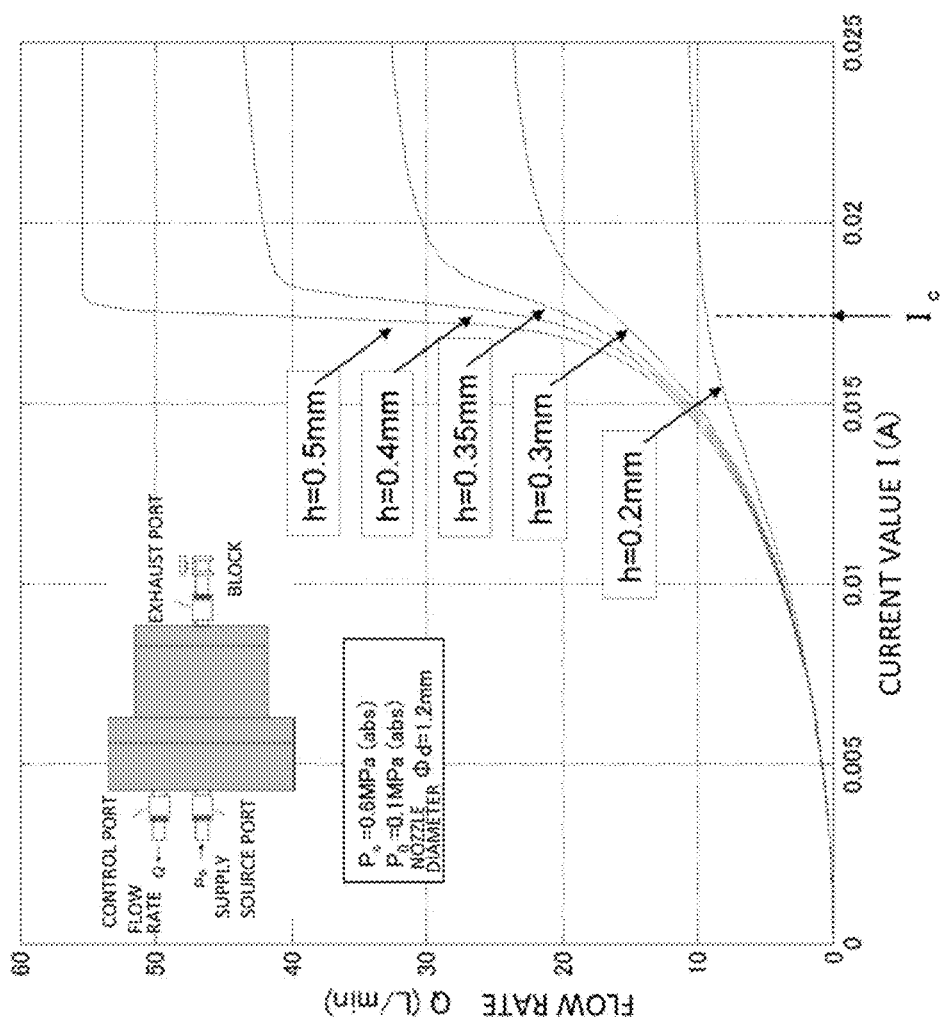
FIG. 15 is a graph illustrating an analysis result of control flow rate characteristics with respect to the current in a state where an exhaust port is blocked.

FIG. 15 illustrates the result of obtaining the outflow flow rate from the nozzle under the analysis conditions (described in FIG. 14) used for obtaining the graph of the flapper displacement characteristics. The flow rate characteristics were obtained when in the servo valve in FIG. 1, the exhaust side flow path 20 was blocked and the control side flow path was opened to the air. The analysis conditions are a supply pressure of $P_s$=0.6 MPa (abs), an air pressure of $P_a$=0.1 MPa (abs), and a supply side nozzle 29 diameter of $\Phi$=1.2 mm. When comparing FIGS. 14 and 15, it turns out that the curve profiles of the flapper displacement characteristics and corresponding ones of the curve profiles of the nozzle flow rate characteristics are almost the same.

In short, by forming the flapper (disc) as a thin elastic structure, the synergetic effect between the following a and b can be obtained:

a. To decrease the effective mass of the movable part to increase the resonance frequency (see Table 1); and b. To utilize the magnetic saturation phenomenon to improve the linearity of the flow rate characteristics with respect to the current.

2. Linearization Effect Index and Evaluation Based on Actual Measurement

Figure 16:
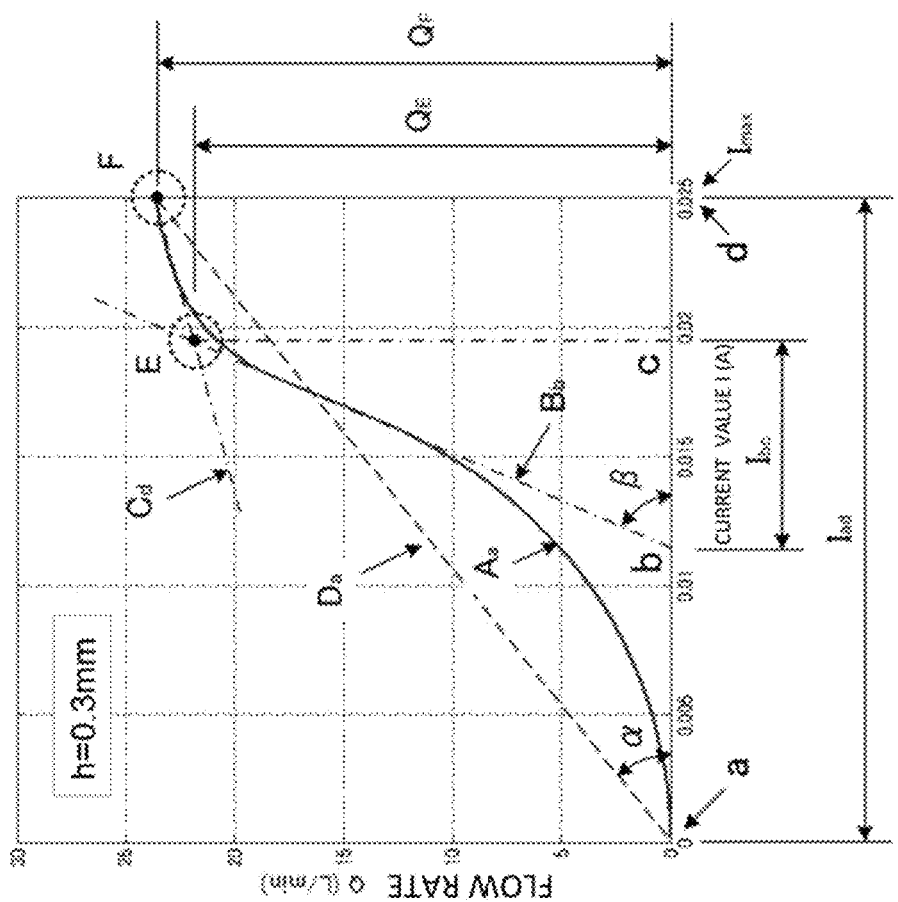
FIG. 16 is a graph illustrating a method for obtaining a linearization effect index on the basis of flow rate measured values with respect to the current value.

Now, the "linearization effect index" in the flapper displacement (flow rate) characteristics with respect to the valve driving current will be defined. FIG. 16 is a model diagram illustrating a method for obtaining the "linearization effect index" on the basis of actual measured values of the flow rate with respect to the current value. It is assumed that the valve is driven within the current value range of 0 (Point a)<I<$I_{max}$ (Point d). In the case of the valve according to the present embodiment, the magnetic attractive force with respect to the current value exhibits nonlinearity, and therefore in a range where the current value is small, the attractive force gently increases with respect to the current value, and as the current value increases, the attractive force steeply increases. However, when the current value further increases and enters the magnetic saturation region, the increase in magnetic flux Φ (and attractive force F) is suppressed. As a result, the profile of the flow rate characteristics (flapper displacement characteristics) with respect to the current exhibits a curve that is downward convex in the range where the current value is small and upward convex in the range where the current value is large. The inflection point E between the "downward convex curve" and the "upward convex curve" is obtained from the intersection point between two envelope curves Bb and Cd. Given that the curve of the flow rate characteristics with respect to the current is denoted by Aa, Bb (dashed-dotted line) denotes an envelope curve in the range where the curve Aa is downward convex. Also, Cd (dashed-dotted line) denotes an envelope curve in the range where the curve Aa is upward convex. The intersection point between the envelope curves Bb and Cd is the inflection point E. An X axial coordinate at the deflection point E is denoted by c, and an X-axial coordinate at which the envelope curve Bb intersects with an X axis is denoted by b. Also, an intersection point at which the curve Aa intersects with a Y axis at $I=I_{max}$ (Point d) is denoted by F. Further, a straight line (chained line) connecting between the intersection point F and the origin (0, 0) is denoted by Da. The gradient of the envelope curve Bb ($QE/I_{bc}$) (angle β) corresponds to the maximum value of a flow rate gain (the ratio of the flow rate to the current) of this valve. The gradient of the straight line Da ($QF/I_{ad}$) (angle α) is defined as the reference value of the flow rate gain. Note that the ratio of "the reference value of the flow rate gain" to "the maximum value of the flow rate gain" is defined as the linearization effect index η as follows.

$$\eta = \frac{\alpha}{\beta} = \frac{Q_F/I_{ad}}{Q_E/I_{bc}} = \frac{I_{bc}}{I_{ad}}$$ [Expression 10]

At η=1, the curve Aa and the straight line Da are coincident with each other, and the flow rate has a direct proportional relationship with the current, which is evaluated as the best in terms of linearity.

Meanwhile, the reason why the flow rate characteristics of a servo valve with respect to current require linearity is as follows. The servo valve is one component constituting the control system of a fluid servo apparatus (active vibration isolation table), and therefore the ratio of a change in flow rate to a change in current, i.e., $K_Q = \delta Q/\delta I$ is incorporated in an open loop gain $K_L$ as a flow rate gain. That is, when coupling respective components with a gain of a control component other than the servo valve as $K_X$, $K_L = K_X \cdot K_Q$. For example, as an example of setting a stability margin using a frequency response method, adjustment conditions such as (1) A gain margin of 10 dB or more, and
(2) A phase margin of 45 degrees or more are applied in a production site. In the case where the maximum value of the flow rate gain of the servo valve is $K_{QMAX}$ at near the current value $I=I_{max}$, the open loop gain $K_L$ for taking into account the stability margin of the whole of the active vibration isolation table must be determined by the maximum value $K_{QMAX}$. However, in many cases, the operating point of the servo valve is near the intermediate position ($I \approx I_{max}/2$) in the driving current range. For this reason, as the degree of nonlinearity of the flow rate characteristics with respect to the current increases, a higher-than-necessary gain margin is set at the operating point. In this case, the active vibration isolation table cannot sufficiently fulfill its intrinsic performance at the operating point at which an operating time is the longest. Accordingly, as the flow rate characteristics of the servo valve with respect to the current become more linear, the control system can more appropriately set stability (gain and phase margins).

In addition, the characteristics of generated pressure (generated force) of the servo valve with respect to the current preferably have linearity. This is a condition required when the servo valve is applied to an active control apparatus. As described above, feedforward control becomes effective only when disturbance is known. In order to perform the FF control of the stage, a known stage behavior signal (e.g., from a sensor) is used. Feedback control can reduce a time for the free vibration of the surface plate to converge, but cannot easily reduce the instantaneous response time of stage acceleration/deceleration. In order to effectively cancel out linear disturbance using the stage FF control, it is necessary to produce a highly accurate generated force waveform, which reproduces a stage acceleration signal in an opposite phase. For this purpose, it is necessary to make a valve driving current waveform and the generated pressure waveform similar to each other, i.e., the characteristics of the generated pressure (generated force) with respect to the valve driving current are required to have linearity in a wide range around the operating point.

TABLE 3

| Linearization effect index Applicable range | Evaluation in embodiment | Reference (active vibration isolation table case) |
|---|---|---|
| 0.4 < η < 1.0 | ◎ | Satisfactory performance was obtained both in vibration isolation characteristics and vibration suppression characteristics. The versatility of the valve is high, and independent of any application object. |
| 0.2 < η < 0.4 | ○ | Practically trouble-free performance was obtained both in vibration isolation characteristics and vibration suppression characteristics. A deficiency in performance depending on an application object can be compensated for by the synthesis (integrated design) of the whole of the control system. |
| 0.1 < η < 0.2 | △ | An application object is greatly limited. Depending on a frequency band, sufficient vibration isolation performance cannot be obtained and FF control of a large variable load is not applicable. |
| η < 0.1 | X | Intrinsic performance as an active vibration isolation table cannot be obtained. |

Figure 17:
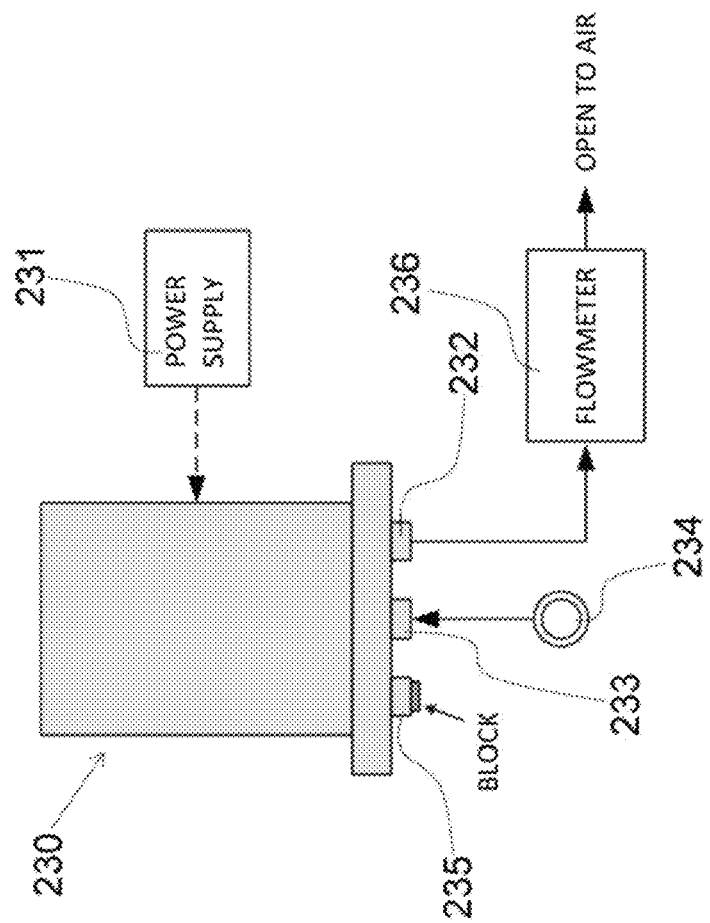
FIG. 17 is a diagram illustrating an example of actually measuring the flow rate characteristics of a valve for obtaining the "linearization effect index"

FIG. 17 illustrates an example of actually measuring the flow rate characteristics of the valve to obtain the "linearization effect index." Assumed as the basic structure of the valve is a structure of a two-nozzle type in which as illustrated in the embodiment of FIG. 1, a forward nozzle and a reverse nozzle are oppositely arranged. Although the "linearization effect index" can also be obtained from the displacement characteristics of a flapper with respect to current, flapper displacement measurement is often not easy in terms of valve structure. However, the flow rate characteristics of a valve, which are almost the same in profile as flapper displacement characteristics with respect to a current value, can be obtained in accordance with a method illustrated in FIG. 17 without decomposing the valve main body.

In FIG. 17, reference character 230 denotes a valve as a measurement target, 231 a power supply for driving the valve, 232 a control port, 233 a supply port connecting to a supply pressure source 234, 235 an exhaust port, and 236 a flowmeter. By measuring a flow rate from the control port 232 at the time of opening to the air in a state where the exhaust port 235 is blocked, the flow rate characteristics of the valve with respect to a current value necessary to evaluate the "linearization effect index" can be obtained. In the case of the embodiment in FIG. 1, the flow rate corresponds to a flow rate between one nozzle (in this case, the forward nozzle) arranged facing toward the flapper and the flapper. This method can obtain the "linearization effect index" regardless of the detailed structure of the valve.

3. Method for Evaluating Use of Magnetic Saturation Phenomenon

The present embodiment utilizes the fact that characteristics superior in linearity (controllability) can be obtained by utilizing the magnetic saturation phenomenon in a range where the displacement (flow rate) characteristics of a flapper is supposed to steeply rise along with an increase in current value. Accordingly, a precondition for applying the present embodiment is that any component constituting a closed loop magnetic circuit is magnetically saturated within a valve operating range. Even in the case of setting the upper limit of the valve current before the flapper displacement steeply rises with respect to the current without utilizing the magnetic saturation phenomenon, the present embodiment is applicable as a servo valve. However, a large flapper displacement (flow rate) cannot be obtained.

In addition, by configuring the flow rate characteristics with respect to the current to exhibit an upward convex curve at near the maximum value of the current applied to the electromagnet, i.e., to have an inflection point (Point E in the model diagram of FIG. 16) utilizing the magnetic saturation phenomenon, the following effect can be obtained. Referring to FIG. 4 for description, the gap between the flapper 24 and the magnetic pole 31 (initial gap) can be set having a margin. Unless the magnetic saturation phenomenon is used, the region where the flapper displacement (flow rate) steeply rises with respect to the current is entered due to a slight variation in member fabrication/assembling accuracy, electromagnet attractive force characteristics, magnetic characteristics of a magnetic material, or the like, thus easily resulting in unstable valve characteristics.

Assumed here is the structure of a servo valve configured to include components such as an electromagnet, a nozzle, and a flapper. It is also assumed that the shapes of the respective components, the overall valve configuration, and the like are arbitrary. In order to actualize a servo valve utilizing the magnetic saturation phenomenon, it is evaluated in accordance with the following method whether or not the embodiment according to the present invention is applicable.

i. Calculate Total Magnetic Resistance of Closed Loop Magnetic Circuit

The magnetic resistance $R_a$ between the nozzle and the flapper is minimized when the current takes the maximum value $I=I_{max}$. Given that the distance between the nozzle and the flapper at $I=I_{max}$ is denoted by $\delta_n$ (see FIG. 4) and a magnetic pole area by S, $R_a=\delta_n/(\mu_0 S)$. Also, given that the sum of linear magnetic resistances other than the magnetic resistance $R_a$ is denoted by $R_X$, the total magnetic resistance of the closed loop magnetic circuit is $R_S=R_a+R_X$. Linear magnetic resistance refers to magnetic resistance based on the assumption that permeability $\mu$ is constant, and the relationship between magnetizing force H and magnetic flux density B is a direct proportional relationship ($B=\mu H$).

ii. Calculate Maximum Value of Magnetic Flux Generated in Closed Loop Magnetic Circuit Given that the number of turns of the magnetic coil is denoted by N, the maximum value of magnetomotive force is $E_{max}=N \times I_{max}$, and the maximum value of magnetic flux is $\Phi_{max}=N \times I_{max}/R_S$.

iii. Calculate Magnetic Flux Density $B_{max}$ at a Site where Magnetic Saturation is Likely to Occur Given that in the closed loop magnetic circuit, the magnetic path area of (1) a focusing site where the magnetic path area is the smallest or (2) a focusing site where a magnetic material having the smallest saturated magnetic flux density is used is denoted by Sc, the magnetic flux density $B_{max}=\Phi_{max}/S_c$.

iv. Evaluate Occurrence of Magnetic Saturation Phenomenon

The "magnetic flux density characteristics with respect to the magnetizing force (B-H characteristics) of a magnetic material used for the site (1) above or the magnetic material used for the site (2) above are used as evaluation data (see FIG. 11). The magnetic flux density boundary value at the boundary (magnetizing force boundary value $H_c$) between the linear region and the magnetic saturation region and the magnitude of $B_{max}$ above are compared with each other. If $B_{max}$ is smaller, the magnetic saturation phenomenon does not occur, and the magnetic circuit is used within the linear region. If $B_{max}$ is larger, the magnetic saturation phenomenon occurs at the above site (1) or (2), and therefore it turns out that the precondition for applying the embodiment according to the present invention is satisfied.

Third Embodiment

Figure 18:
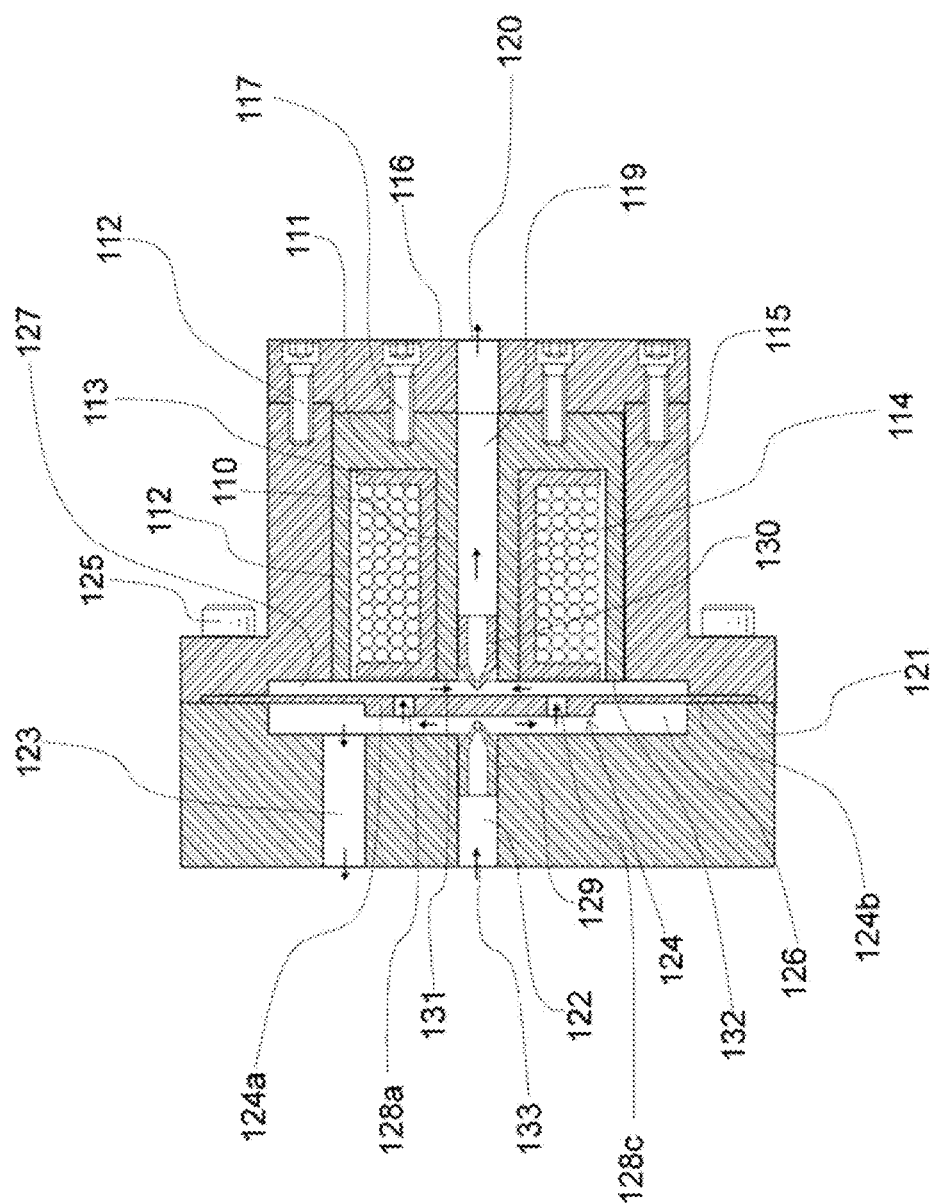
FIG. 18 is a front cross-sectional view of a fluid servo valve using a convex-shaped disc according to a third embodiment of the present invention.

FIG. 18 is a front cross-sectional view of a pneumatic servo valve according to a third embodiment of the present invention, and illustrates the configuration of the valve in which by forming a disc corresponding to a flapper in a convex disc shape, a part where a magnetic saturation phenomenon of magnetic flux flowing through the disc is utilized, and a part where the spring stiffness of the disc is set are separated from each other.

The flapper 124 is configured to include a thick convex part 124a (magnetic path part) and a thin outer peripheral part (elastically supporting part) 124b. Reference character 126 denotes a supply side gap part formed between a supply side bottom plate 121 and the flapper 124, 127 an exhaust side gap part formed between the flapper 124 and a housing side, 128a, 128b, 128c, and 128d circulation holes formed in the flapper (128b and 128d are not illustrated in FIG. 18), 129 a supply side nozzle (forward nozzle), and 130 an exhaust side nozzle (reverse nozzle). Reference character 131 denotes a flapper side end surface of a central shaft 110 (a central shaft end surface and a first magnetic pole), 132 a flapper side end surface of an outer frame part (an outer frame part end surface and a second magnetic pole), and 133 an intake port.

Figure 19:
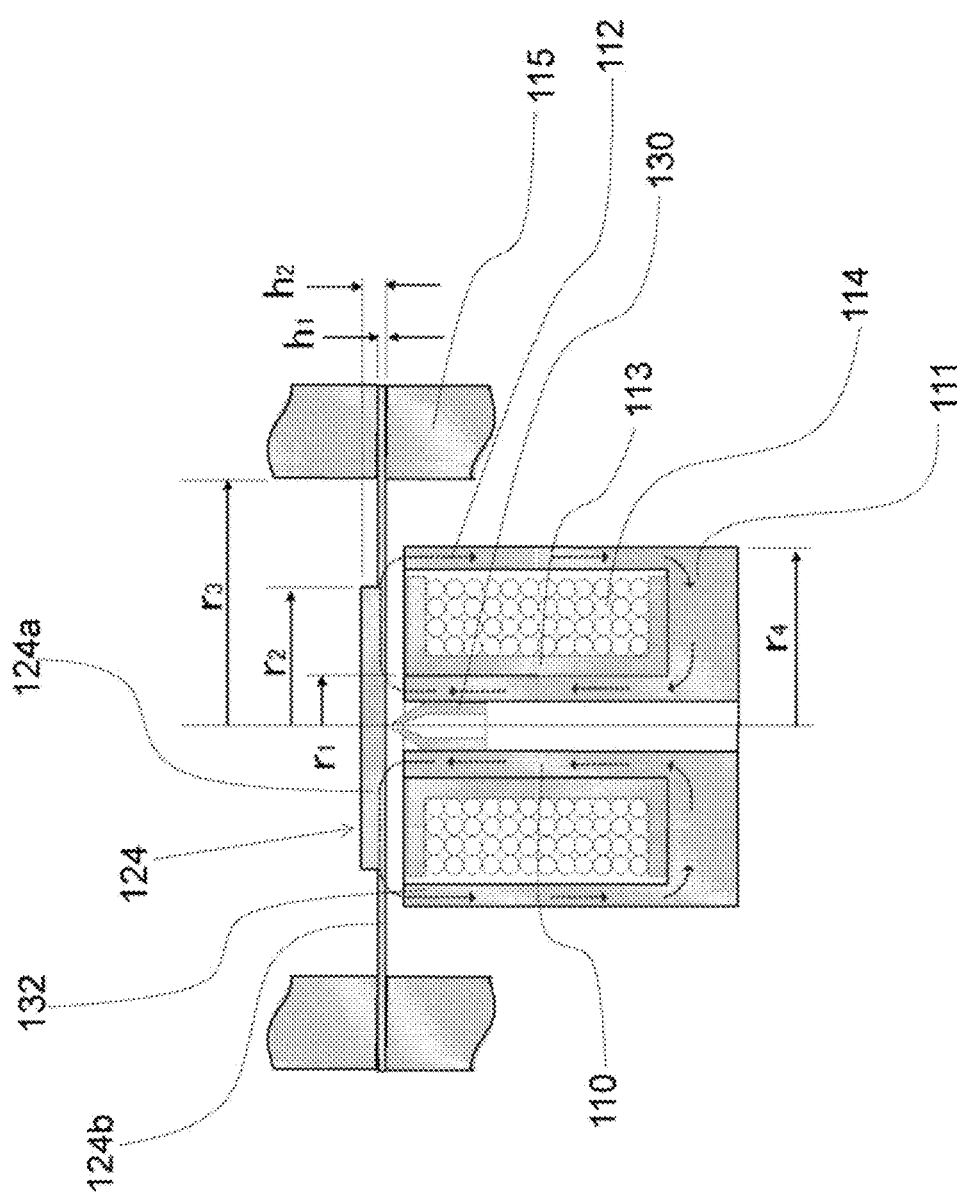
FIG. 19 is an enlarged view of the vicinity of a flapper and an electromagnet in the third embodiment.

FIG. 19 is a model diagram of a closed loop magnetic circuit formed by components such as the central shaft 110, the flapper 124, and a coil 114 in FIG. 18. Note that in the model diagram, the supply side bottom plate 121, the supply side nozzle 129, and the like are omitted. The flapper of the valve according to the present embodiment has the convex part having a radius of $r_2$ and a thickness of $h_2$, of which a part having a radius $r=r_1$ (magnetic path area $S_{1=2\pi r_1 h_2}$) serves as an outflow source of the magnetic flux radially flowing through the disc and also serves as the above-described maximum magnetic flux control surface adapted to adjust magnetic saturation. The thickness $h_1$ of the outer peripheral part ($r_2 < r < r_3$) of the flapper is sufficiently smaller than $h_2$, and easily elastically deformed. Also, as compared with the outer radius $r_4$ of the outer frame part end surface 132 (second magnetic pole), the outer radius $r_2$ of the convex part may satisfy $r_2 < r_4$. The reason for this is because in the case of setting the part corresponding to the radius $r=r_1$ as the magnetic saturation adjustment part, between two magnetic path areas $S_1$ ($2\pi r_1 h_2$) and $S_2$ ($2\pi r_2 h_1$), satisfying $S_1 < S_2$ is only required. In this case the interval of the elastic deformation part ($r_2 < r < r_3$) can be secured sufficiently long, and therefore it is not necessary to set the thickness $h_1$ to an extremely small value.

Figure 20:
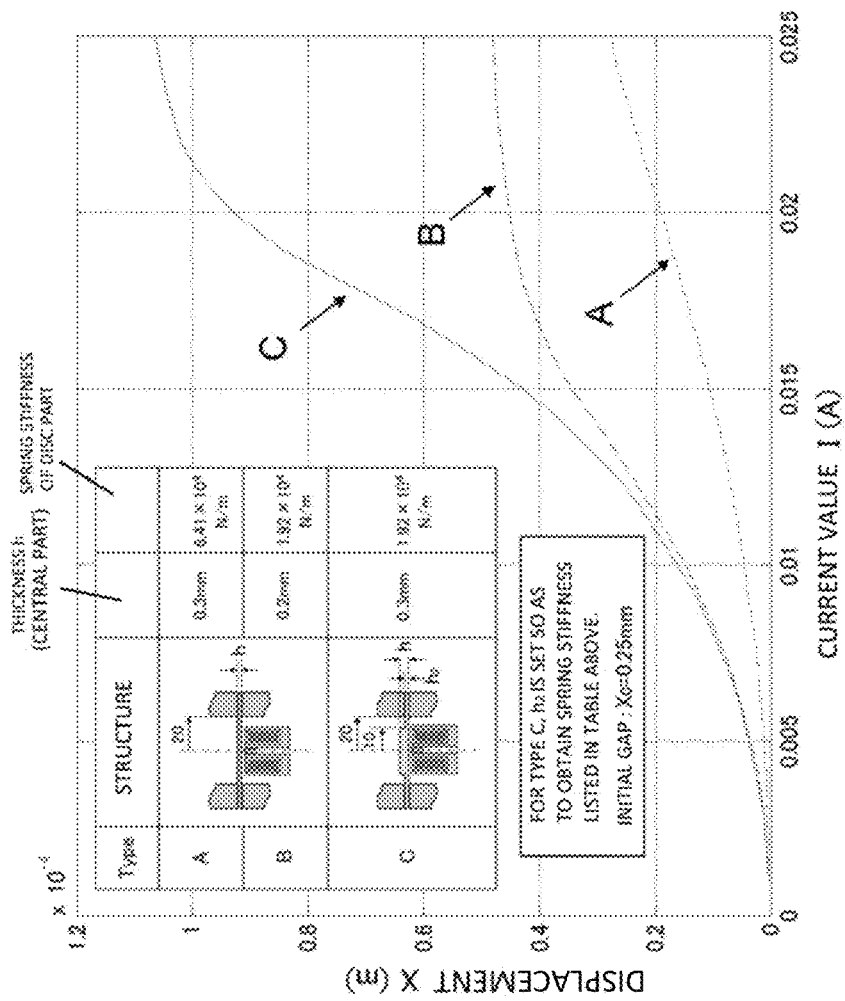
FIG. 20 is a graph illustrating an analysis result of flapper displacement characteristics with respect to current.
Figure 21:
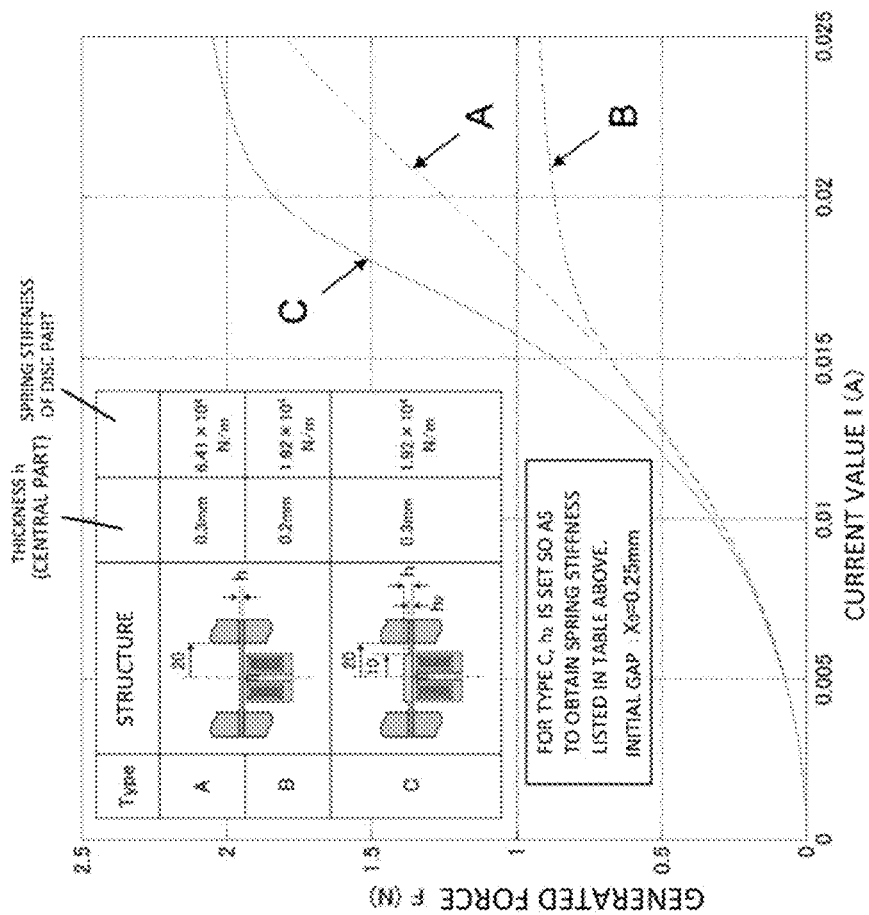
FIG. 21 is a graph illustrating an analysis result of generated force with respect to the current.

FIG. 20 is a diagram that under the assumption of three types of flapper shapes having different thickness shapes and spring stiffnesses, compares flapper displacements with respect to a current value. FIG. 21 is a diagram comparing generated forces of electromagnets with respect to the current value. From FIGS. 20 and 21, at the same current value, the following results are found.

i. The magnitude of displacement: C>B>A
ii. The magnitude of generated force: C>A>B
iii. The reason why A and B are opposite between the displacement and the generated force is as follows. The reason for A>B in the generated force result is because as compared with B, in the case of A having a larger thickness, the magnetic saturation is reduced. However, the reason for A<B in the displacement result is because the spring stiffness of a disc is proportional to the cube of a thickness, and in terms of spring stiffness, A>B. The reason for C>A in the generated force result when comparing C and A having the same disc central part thickness is because C is easily deformed as compared with A, and at the same current value, the gap between the disc and the magnetic pole of C is small as compared with A. From the above results, as compared with a disc having a uniform thickness, a convex-shaped disc can obtain a larger displacement at the same current value while keeping sufficient linearity.

Figure 22:
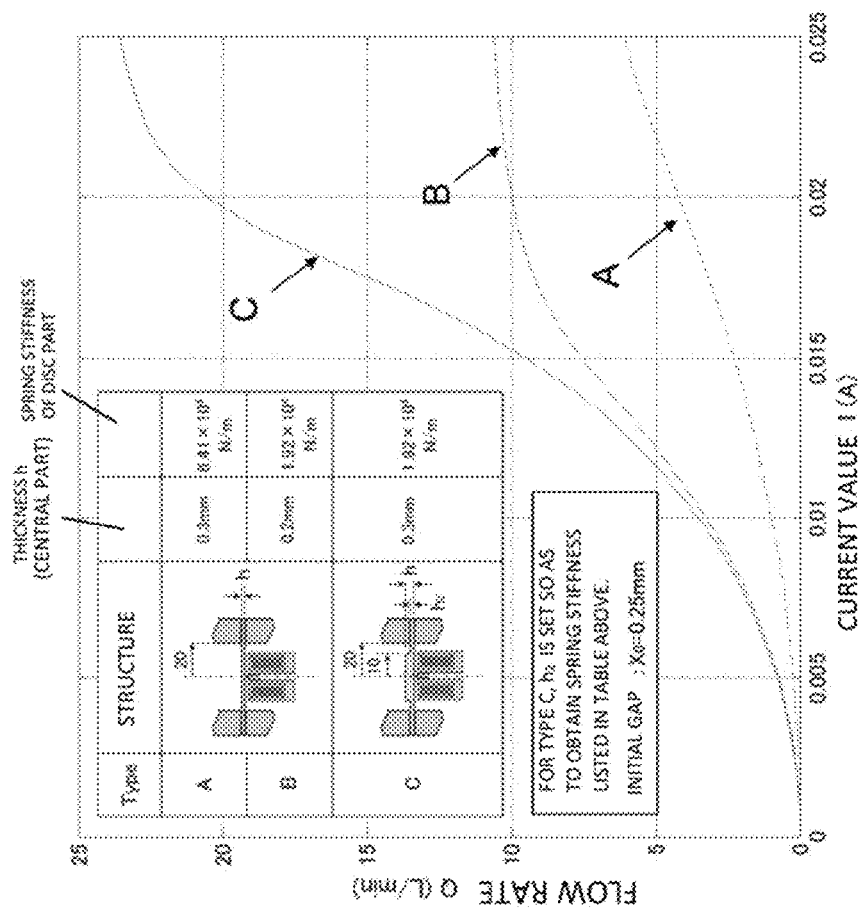
FIG. 22 is a graph illustrating an analysis result of control flow rate characteristics with respect to the current in a state where an exhaust port is blocked.

FIG. 22 is a diagram that among the valves having the above-described three-types of flapper shapes (FIG. 18 structure), compares a control flow rate with respect to the current value in a state where an exhaust port 120 is blocked. Analysis conditions are: a supply pressure $P_s$=0.6 MPa (abs); atmospheric pressure $P_0$=0.1 MPa (abs); and the nozzle diameters of the supply side nozzle 129 and the exhaust side nozzle 130 are both $\Phi$1.2 mm. It is assumed that in any of the valves having the three types of flapper shapes, the supply side nozzle 129 is blocked by the flapper 124 at a current value I=0. In order to block the exhaust side nozzle 130 at the maximum current value I=0.025 A, it is only necessary to set the protrusion amount $\delta_n$ (see FIG. 4A) of the tip part of the exhaust side nozzle 130 as follows. Given that $\delta_a$ denotes a flapper displacement at I=0.025 A, for Type A, $\delta_n = X_0 - \delta_a = 0.222$ mm, for Type B, $\delta_n = 0.207$ mm, and for Type C, $\delta_n = 0.135$ mm Fourth Embodiment FIG. 23 is a front cross-sectional view of a pneumatic servo valve according to a fourth embodiment of the present invention. FIG. 23 illustrates the configuration of the valve that can obtain a large flapper displacement (flow rate) at a small current value by forming radial circulation paths between a nozzle opening part and a central shaft outer peripheral part on a flapper side end surface (first magnetic pole) of a central shaft. Reference characters 66a, 66b, 66c, and 66d denote circulation holes (66b and 66d are not illustrated in FIG. 23) formed in a disc-shaped flapper, 67 an opening part of a supply side nozzle (forward nozzle), and 68 an opening part of an exhaust side nozzle (reverse nozzle). Reference character 69 denotes a flapper side end surface of a central shaft 50 (a central shaft end surface and a first magnetic pole), and 70 a flapper side end surface of an outer frame part (an outer frame end surface and a second magnetic pole).

Figures 24A, 24B, 24C:
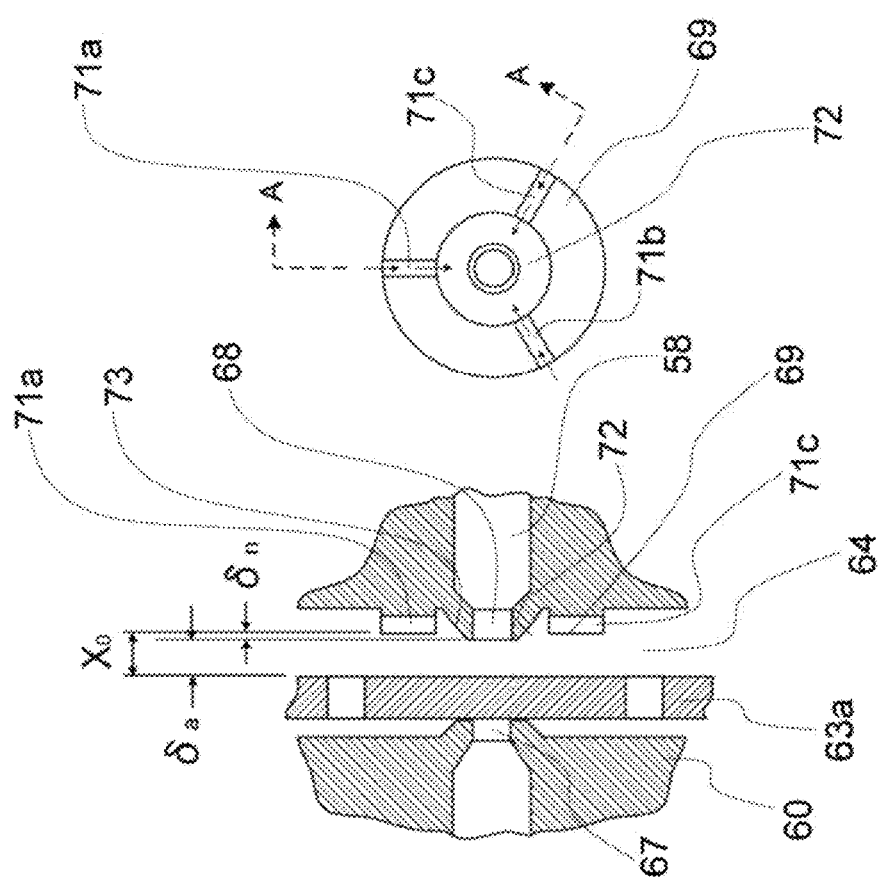

FIG. 24 is a partial enlarged view of the vicinity of the exhaust and supply side nozzles, in which FIG. 24A is an AA arrow view of FIG. 24B and illustrates a state where the flapper blocks the supply side nozzle, FIG. 24B is a BB arrow view of FIG. 24C, and FIG. 24C illustrates a state where current is applied to a coil. In the present embodiment, the exhaust and supply side nozzles are not attached as separate components as in the embodiment of FIG. 1, but integrally formed using the central shaft 50 and a supply side housing 60. Reference characters 71a, 71b, and 71c denote circulation grooves formed in the flapper side end surface of the first magnetic pole 69, 72 a depressed part formed between the exhaust side nozzle opening part 68 and the first magnetic pole 69, and 73 a taper part formed on the outer circumferential side of the exhaust side nozzle opening part 68. The depth of the circulation grooves is sufficiently deep, and the circulation grooves are formed to have a depth of 0.3 to 0.5 mm In the present embodiment, the exhaust side nozzle opening part 68 is formed slightly protruded from the first magnetic pole 69 end surface by $\delta_n$=0.046 mm (see FIG. 4A for $\delta_n$). Accordingly, when the flapper 63 blocks the exhaust side nozzle opening part 68, the gap between the first magnetic pole 69 end surface and the flapper 63 has a small value of $\delta_n$. However, even in this case, the outer circumferential side (depressed part 72) of the exhaust side nozzle opening part 68 and an exhaust side gap part 65 are connected to the circulation grooves having the sufficiently deep depth, and therefore the outer circumferential side of the exhaust side nozzle opening part 68 can keep the same pressure as those of the exhaust side gap part 65 and an intake side gap part 64.

Figure 25:
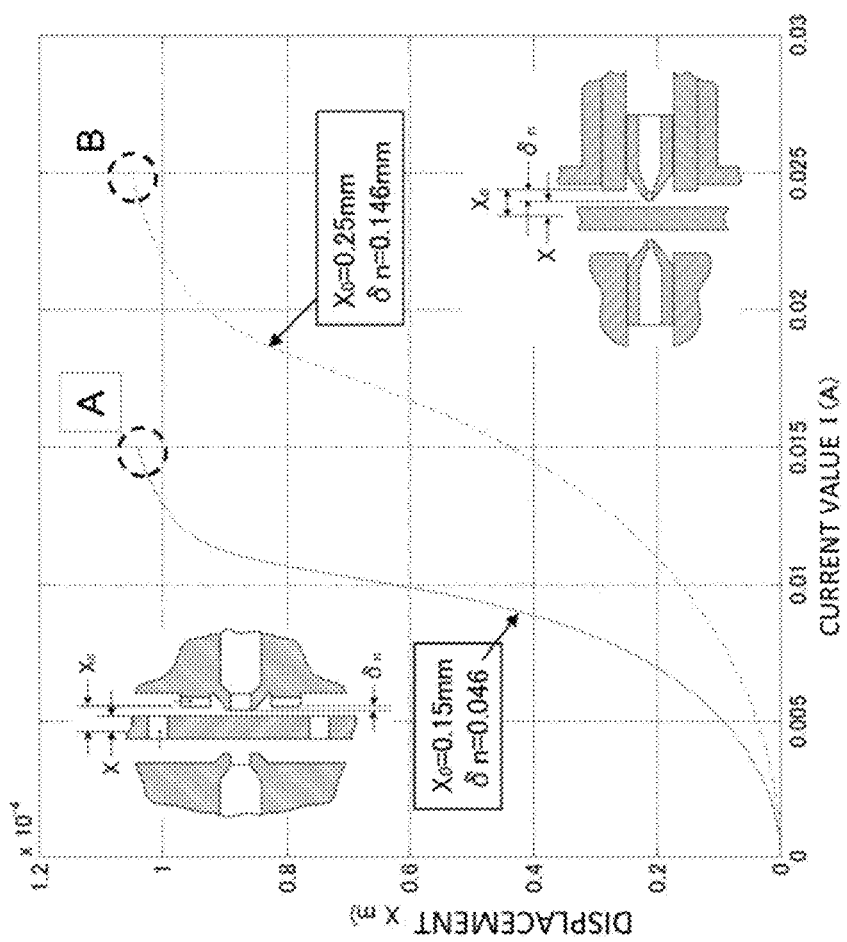
FIG. 25 is a graph illustrating an analysis result of flapper displacement characteristics with respect to current.

FIG. 25 is a diagram illustrating flapper displacement characteristics with respect to a current value, and comparing the following two cases.

i. The exhaust side nozzle opening part 68 is formed slightly protruded from the first magnetic pole 69 end surface by $\delta_n$ (in the present embodiment, an initial gap $X_0$=0.15 mm and a nozzle protrusion amount $\delta_n$=0.046 mm)

ii. The exhaust side nozzle opening part is protruded keeping a sufficient distance from the first magnetic pole (the case of the structure in the third embodiment, in which the initial gap and the nozzle protrusion amount are respectively set as $X_0$=0.25 mm and $\delta_n$=0.135 mm)

The reason why the nozzle protrusion amount is set as $\delta_n$=0.135 mm is as follows. As the nozzle protrusion amount $\delta_n$ is decreased, the air resistance of a radial flow path increases, and consequently the pressure of the entire gap part corresponding to the total area S based on the outside diameter of the first magnetic pole 131 (FIG. 18) may come close to the atmospheric pressure ($P_s$=0.1 MPa). In this case, a force proportional to the difference in pressure between the left and right of the flapper, $f=(P_a-P_s)S$, is applied to the flapper. As a result of experiment, it has turned out that the flapper comes into a state of being in close contact with the first magnetic pole end surface to prevent the flapper from being displaced by current control. Accordingly, it is preferable to set the value of the protrusion amount $\delta_n$ keeping a sufficient distance. Under the above conditions ii, in order to reach a displacement X=0.102 mm (Point B, a control pressure at this time is $P_a$=0.6 MPa), a current value I=0.025

A is required. In the present embodiment under the above conditions i, even in the case of sufficiently decreasing $\delta_n$, the flapper can be stably displaced by current control, and a current value necessary to reach the same displacement (Point A, same control pressure) is I=0.015 A.

Fifth Embodiment

Figure 26:
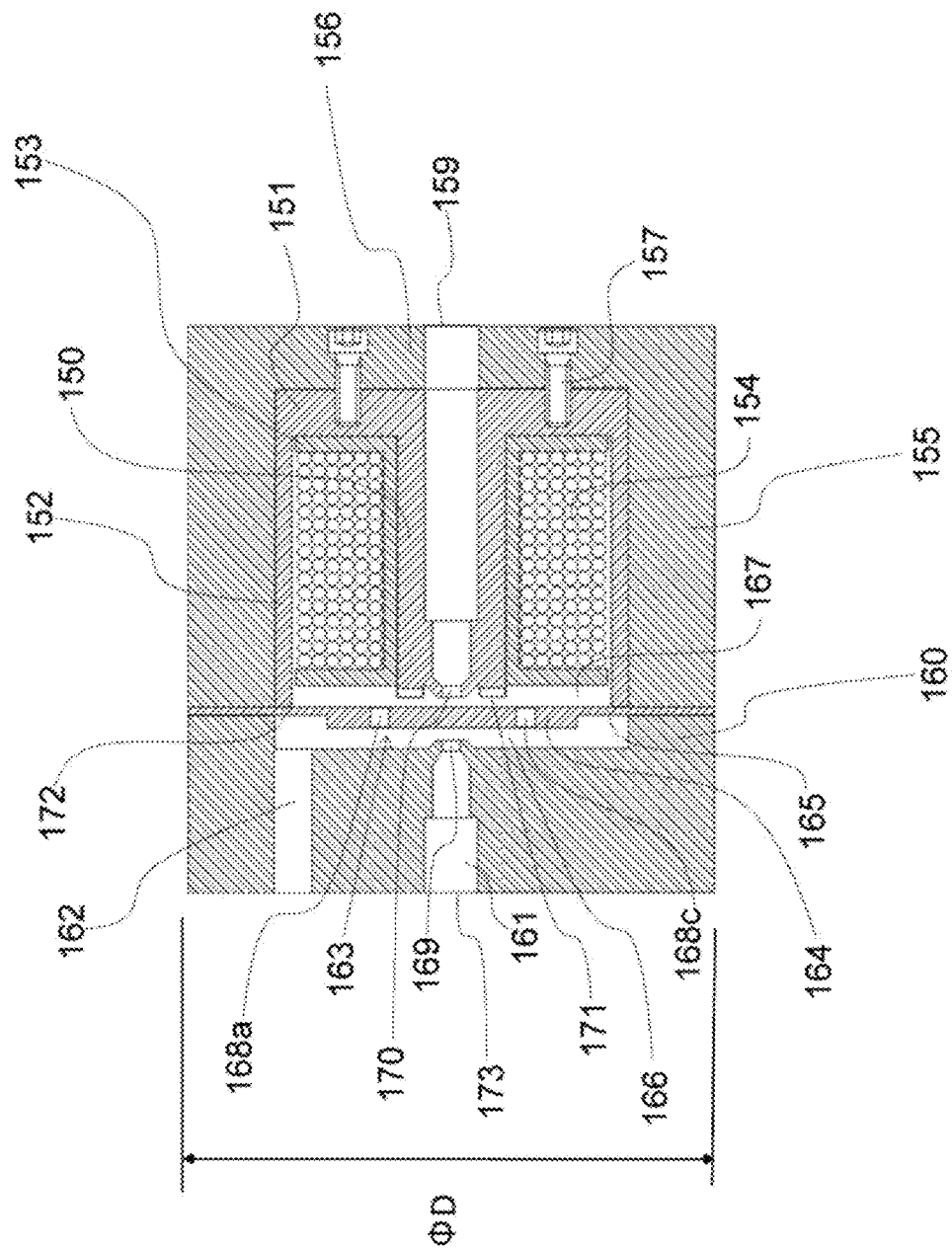
FIG. 26 is a front cross-sectional view of a fluid servo valve according to a fifth embodiment of the present invention.

FIG. 26 is a front cross-sectional view of a pneumatic servo valve according to a fifth embodiment of the present invention, in which a magnetic circuit is formed so as to obtain an attraction action on a flapper only with a first magnetic pole without a second magnetic pole by bringing a flapper valve side end surface of an outer frame part into close contact with a flapper surface. Such a configuration makes it possible to decrease the outside diameter of an elastically supporting part for the flapper of a convex-shape, and therefore the outside diameter ($\Phi_D$) of the servo valve main body can be decreased. For example, in the case of an active vibration isolation table, each of pneumatic units for supporting the four corners of a stage is attached with a multiaxis pneumatic actuator. The pneumatic actuator and a control port of a servo valve are required to be closely arranged, and therefore the outside diameter ($\Phi_D$) of the servo valve main body is preferably made as small as possible. Reference character 152 denotes the outer frame part of a central shaft, and 172 the flapper side end surface of the outer frame part 152 of the central shaft and is configured to be in close contact with the flapper 124 without any gap.

Sixth Embodiment

Figure 27:
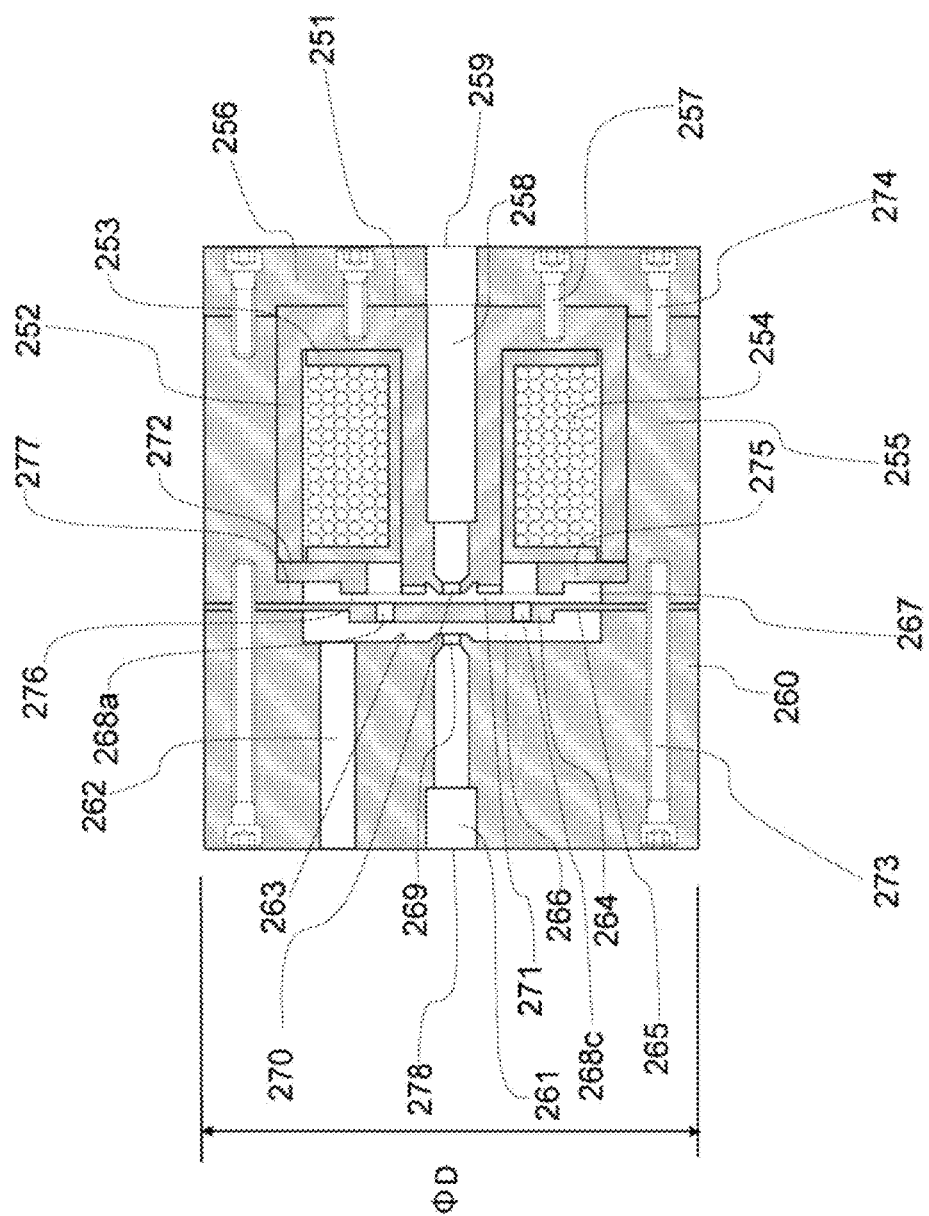
FIG. 27 is a front cross-sectional view of a fluid servo valve according to a sixth embodiment of the present invention.

FIG. 27 is a front cross-sectional view of a pneumatic servo valve according to a sixth embodiment of the present invention, in which the outside diameter ($\Phi_D$) of the servo valve main body is miniaturized while keeping a magnetic attractive force by providing a ring-shaped second magnetic pole having a diameter smaller than the outside diameter of a coil within a closed loop magnetic circuit. That is, the present embodiment intends to eliminate the effect of magnetic saturation (a reduction in attractive force) in an elastic deformation part due to the miniaturization of the valve main body. Reference character 263 denotes a convex disc-shaped flapper, and is configured to include a thick convex part (magnetic path part) 264 and a thin outer peripheral part (elastic deformation part) 265. Reference character 266 denotes a supply side gap part, and 267 an exhaust side gap part. Reference characters 268a, 268b, 268c, and 268d denote circulation holes (268b and 268d are not illustrated) formed in the flapper 263, 269 a supply side nozzle (forward nozzle) opening part, 270 an exhaust side nozzle (reverse nozzle) opening part, 271 a first magnetic pole of an electromagnet, 272 a flapper side end surface of the outer frame part 252 of a central shaft, 273 a fastening bolt, and 274 a bolt for fastening a housing bottom part 256 and a housing 255 to each other. Reference character 275 denotes a magnetic pole ring held between the flapper side end surface 272 of the outer frame part 252 and the housing 255, and 276 a second magnetic pole formed on a flapper 263 side end surface of the magnetic pole ring. Reference character 277 denotes a part of the housing 255 intervening between the magnetic pole ring 275 and the flapper 265, and the housing 255 is made of a nonmagnetic material. Reference character 278 denotes an intake port.

Figure 28:
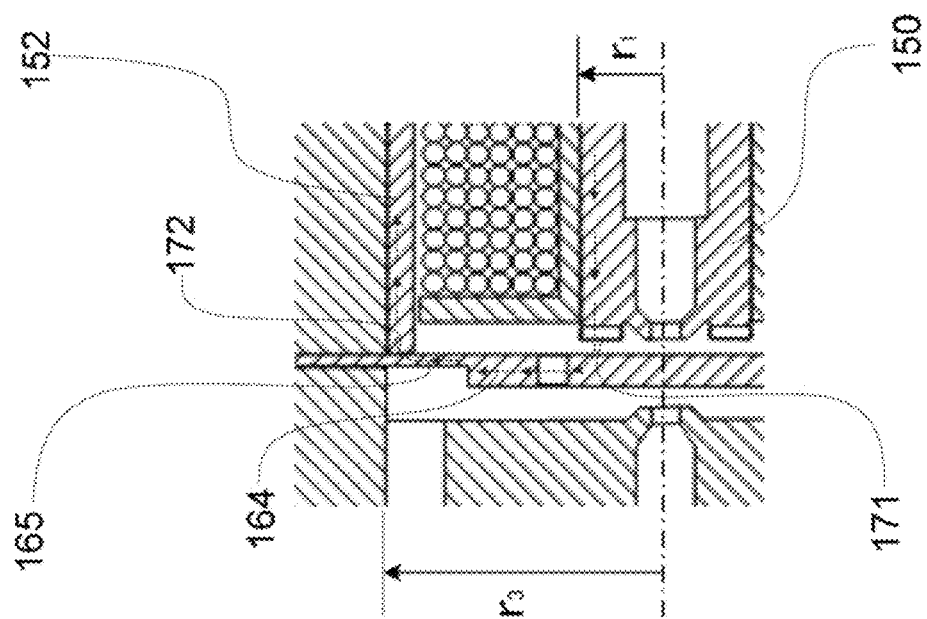
FIG. 28 is an enlarged view of a closed loop magnetic circuit in the above-described fifth embodiment, in which only one magnetic pole is provided.
Figure 29:
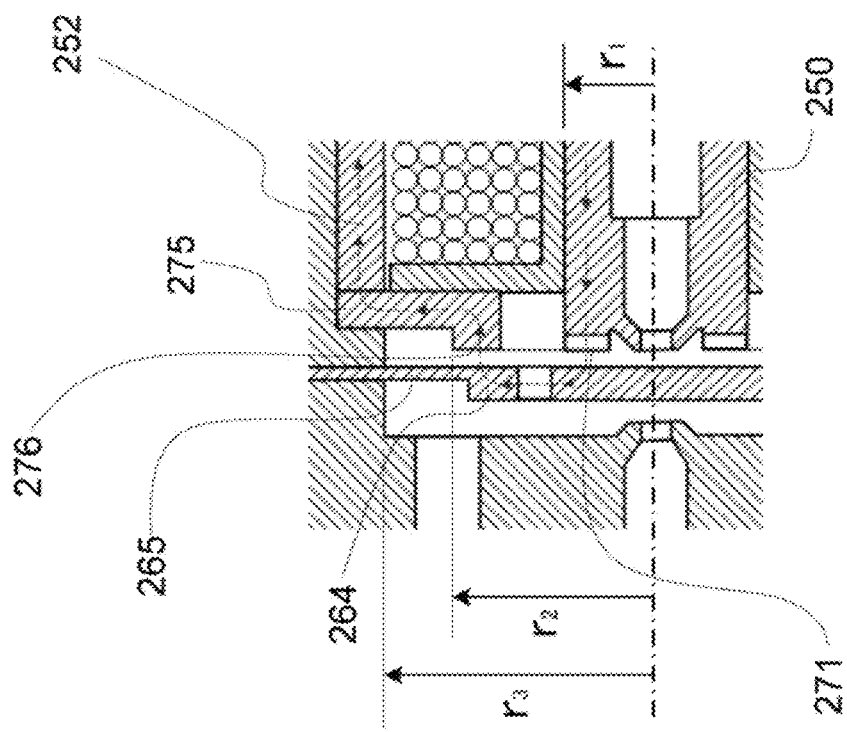
FIG. 29 is an enlarged view of a closed loop magnetic circuit in the present embodiment, in which in addition to a first magnetic pole, a second magnetic pole is secondarily provided.

FIG. 28 is an enlarged view of the closed loop magnetic circuit in the above-described fifth embodiment, in which only the one magnetic pole is provided, and FIG. 29 is an enlarged view of the closed loop magnetic circuit in the present embodiment, in which in addition to the first magnetic pole, the second magnetic pole is secondarily provided. In the case of FIG. 28, the closed loop magnetic circuit is via the path "central shaft 150→magnetic pole 171→magnetic path part 164→elastic deformation part 165→outer frame part 152".

In the case of the present embodiment illustrated in FIG. 29, the closed loop magnetic circuit is via the path "central shaft 250→first magnetic pole 271→magnetic path part 264→second magnetic pole 276→magnetic pole ring 275→outer frame part 252". The difference between the above two closed loop magnetic circuits is that the magnetic circuit in FIG. 28 includes the elastic deformation part 165, whereas the magnetic circuit in FIG. 29 skips the elastic deformation part 265 to draw the closed loop.

Figure 30:
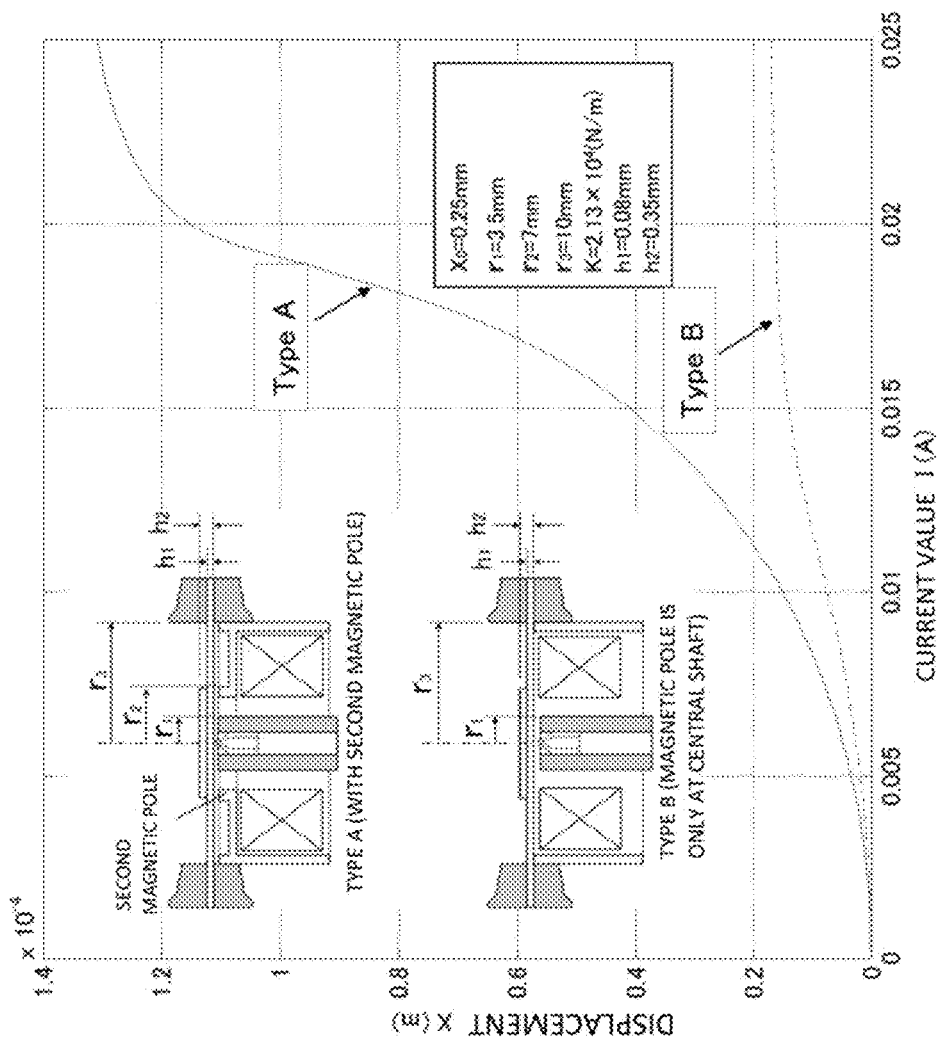
FIG. 30 is a graph illustrating an analysis result of flapper displacement characteristics with respect to current.

FIG. 30 is a diagram that under the assumption of the above two magnetic circuits, compares "flapper displacement characteristics with respect to a current value." As illustrated in the diagram, a shape and stiffness are the same between the respective discs.

Type A corresponds to the present embodiment (FIG. 29 structure), and Type B corresponds to the FIG. 28 structure. In the case of decreasing a disc outside diameter in order to miniaturize a valve, the radial length of an elastic deformation part must also be decreased. For this reason, in order to keep low stiffness, the thickness of the elastic deformation part is thinned to $h_1$=0.08 mm FIG. 30 illustrates analysis results under such a condition.

At a current value I=0.025 A, the maximum displacement of the Type A flapper is $X_{max}$=0.13 mm, whereas the maximum displacement of the Type B flapper only takes a value of $X_{max}$=0.018 mm. The reason for this includes:

i. In the case of Type B, the magnetic circuit is via the site having the small thickness $h_1$. As a result, magnetic flux passes through a path having a narrow magnetic path area and is affected by magnetic saturation, and therefore the maximum magnetic flux is significantly suppressed; and ii. In the case of Type A, magnetic flux skips the site having the small thickness $h_1$ corresponding to the elastic deformation part 265 and draws the path "magnetic path part 264→second magnetic pole 276→outer frame part 252." For this reason, the magnitude of the magnetic flux flowing through the closed loop magnetic circuit is not affected by the thin elastic deformation part 265.

That is, in the present embodiment, structural design for determining the spring stiffness of the disc part and magnetic circuit design for determining attractive force characteristics with respect to a current value can be mutually independently performed.

In each of the above-described fifth and sixth embodiments, by changing the thickness $h_1$ of the elastic deformation part, the stiffness is adjusted. However, by forming an appropriate gap part in the flapper, the stiffness can also be adjusted.

Alternatively, as means adapted to adjust the stiffness of the flapper, for example, multiple small holes may be formed in the flapper axisymmetrically in a circumferential direction (not illustrated).

Seventh Embodiment

Figure 31:
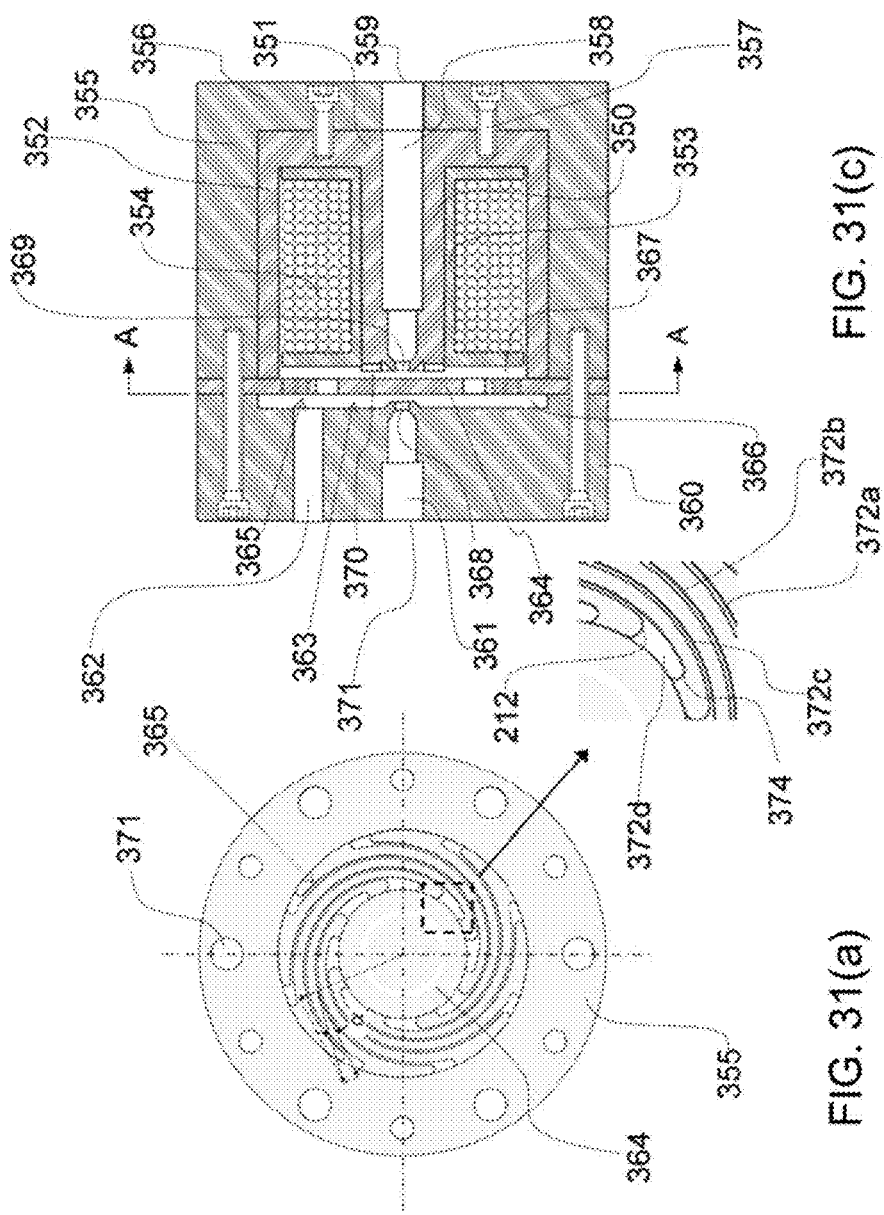
Figure 32:
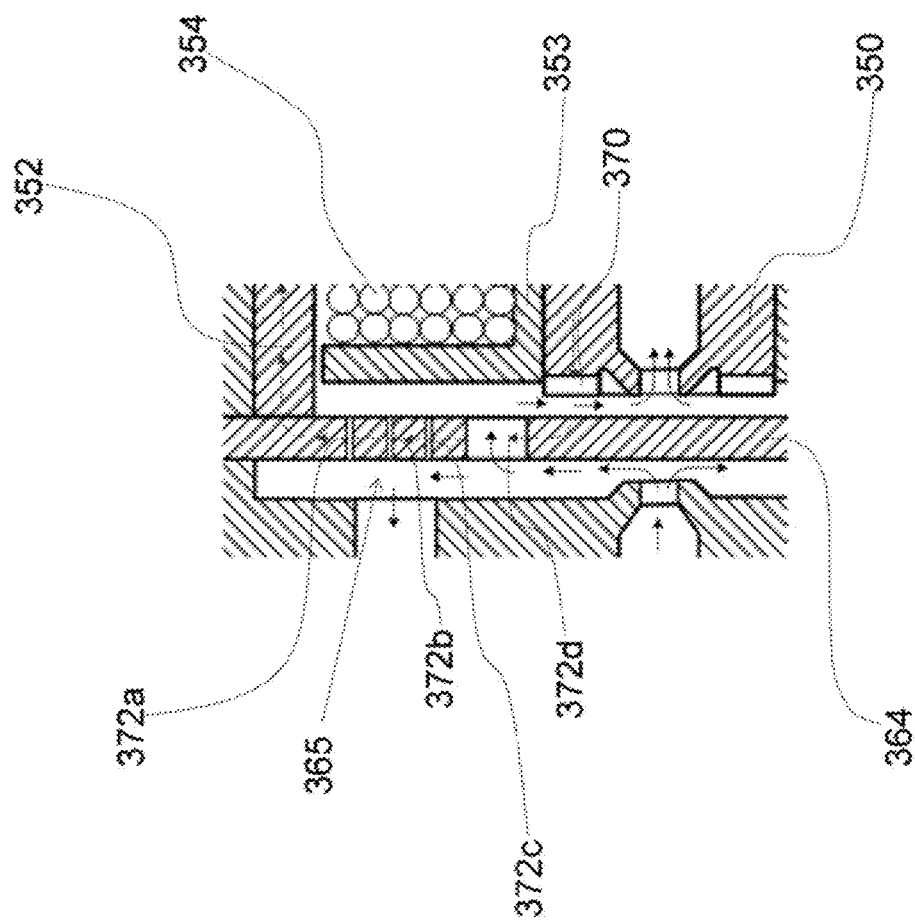
FIG. 32 is a partial enlarged view of the spiral disc spring part in FIG. 31C.

FIG. 31 is a diagram illustrating a pneumatic servo valve according to a seventh embodiment of the present invention, in which FIG. 31A is an AA arrow view of FIG. 31C, FIG. 31b a partial enlarged view of FIG. 31A, and FIG. 31C a front cross-sectional view. Also, FIG. 32 is a partial enlarged view of a spiral disc spring part in FIG. 31C. In the present embodiment, the stiffness of an elastic deformation part of a flapper is determined not by a thickness but by the shape of a spiral formed in the flapper. Reference character 363 denotes the spiral of a disc shape, which is configured to include a central magnetic path part 364 and the elastic deformation part 365 in which the spiral disc spring is formed (described later).

The spiral disc spring as the elastic deformation part 365 is configured to include eight ridges (ridge parts) and eight grooves (cavity parts). In the partial enlarged view of the spiral disc spring part in FIG. 32, reference characters 372a, 372b, 372c, and 372d denote the cavity parts of the spiral disc spring (elastic deformation part 365), among which 372d denotes the cavity part formed near a magnetic pole 370 and having the largest opening area. Meanwhile, the spiral disc spring (elastic deformation part 365) in the present embodiment simultaneously plays the following roles i to iii.

i. To reduce generated stress to obtain appropriate flapper supporting stiffness.
    ii. To utilize the grooves (cavity parts) as circulation paths connecting a supply side gap part 366 and an exhaust side gap part 367 to each other.
    iii. To serve as a magnetic path of a closed loop magnetic circuit.

The effect of the above i is as follows. The method (in the sixth embodiment) that in order to reduce the outside diameter ($\Phi_D$) of the servo valve main body, forms the flapper in the convex shape, and makes the thickness of the elastic supporting part as thin as possible to reduce the stiffness, as well as providing the second magnetic pole is compared. In this case, there is a problem that as the thickness is decreased, stress generated in the elastic supporting part increases to exceed the allowable stress (elastic limit) of the disc-shaped flapper member. By replacing the convex-shaped member with the spiral disc spring, the maximum generated stress can be significantly reduced. The stiffness of the spiral disc spring and generated stress can be determined by in addition to the thickness, several parameters such as a spiral angle $\alpha$ (FIG. 31A), the number of grooves (ridges), and the width ratio between the groove and the ridge. However, at the boundary between the magnetic path part 364 and each of the ridges, the starting point of a spiral curve has an acute angle, causing stress concentration. In order to reduce the stress concentration, as illustrated in FIG. 31B, curved surface parts 373 and 374 different from the original spiral curves are formed. It has turned out that the formation of the curved surface parts can significantly reduce the stress concentration.

In the case of the above ii, the cavity parts 372a, 372b, 372c, and 372d can also be utilized as the circulation paths connecting the supply side gap part 366 and the exhaust side gap part 367 to each other. The cavity part 372d formed from the curved surface parts 373 and 374 playing a role in reducing the stress concentration as well can secure the largest opening area. In FIG. 32, airflows are indicated by arrows (solid line).

Figure 33:
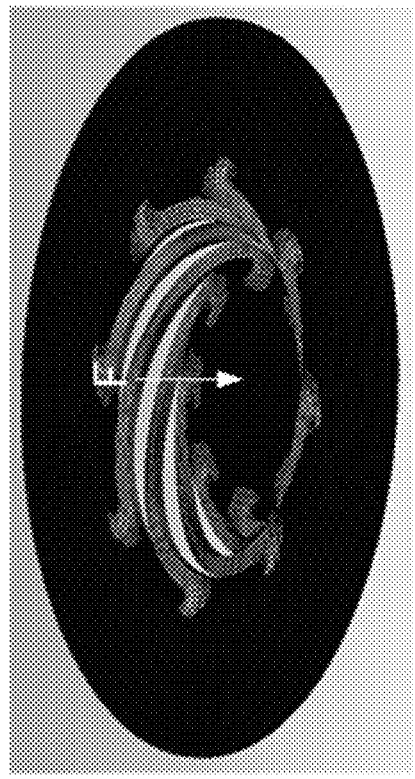
FIG. 33 is a diagram illustrating a structural analysis result of the deformation of the spiral disc spring occurring when applying a load on the central part of a magnetic path part.

The above iii utilizes the fact that even in the case of sufficiently increasing the thickness of the spiral disc spring, the stiffness can be determined by the shape of the spiral disc spring. Since a magnetic path area can be increased because of the large thickness, magnetic saturation does not occurs in the elastic deformation part 365, and therefore a second magnetic pole as described in the sixth embodiment is not required to be formed. As a result, the structure of the valve itself can be simplified. The flow of magnetic flux is, as indicated by arrows (chained lines) in FIG. 32, "magnetic pole 370→ridges (ridge parts) of spiral disc spring→outer frame part 352 of central shaft". In the embodiment, the thickness of the elastic deformation part 365 (spiral disc sprint) is set to be the same as that of the magnetic path part 364, but may be set to be larger than that of the magnetic path part 364. In this case, the profile of the entire flapper is of a concave shape. FIG. 33 illustrates a structural analysis result of the deformation of the spiral disc spring occurring when applying a load F on the central part of the magnetic path part 364.

As a disc spring usable as the elastic deformation part, for example, a curved spring may be used.

Eighth Embodiment

In each of the above-described embodiments of the present invention, a valve structure mainly consists of axisymmetric components. The servo valve according to the present invention can also be achieved even in the case of combining any of various types of iron cores such as prismatic, columnar, horseshoe and annular iron cores, a rectangular-shaped sheet material, a prismatic block, and the like other than the axisymmetric components to form a magnetic circuit and a fluid circuit.

Figure 34:
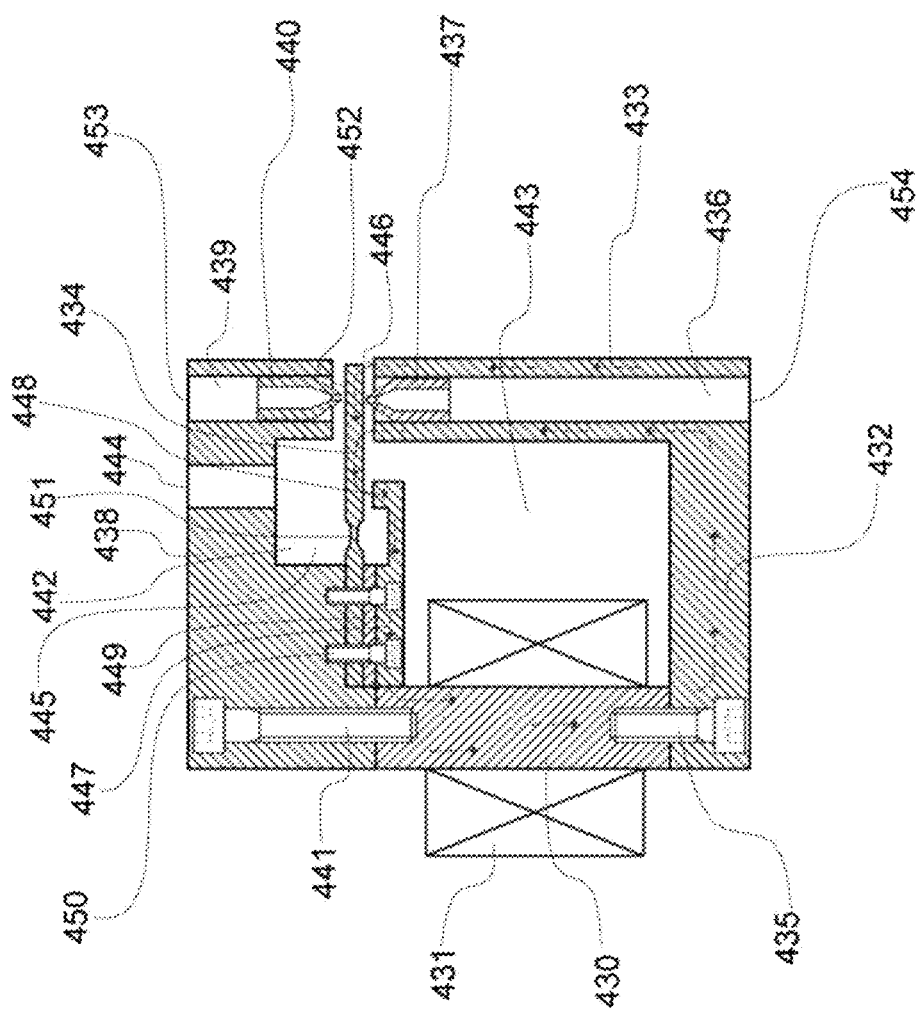
FIG. 34 is a front cross-sectional view of a fluid servo valve according to an eighth embodiment of the present invention.

FIG. 34 is a front cross-sectional view of a pneumatic servo valve according to an eighth embodiment of the present invention. Reference character 430 denotes a supporting shaft, 431 an electromagnetic coil, 432 an L-shaped member bottom part, 433 an L-shaped member upright part, 434 a flapper, 435 a fastening bolt, 436 an exhaust side circulation path, and 437 an exhaust side nozzle (reverse nozzle). Reference character 438 denotes a supply side block, 439 a supply side flow path, 440 a supply side nozzle (forward nozzle), 441 a fastening bolt, 442 a supply side gap part, 443 an exhaust side gap part, 444 a control port, 445 a control chamber, and 446 a first magnetic pole of an electromagnet. A configuration in which the control chamber connects to a pneumatic actuator (not illustrated) via the control port 444 is the same as that in each of the above-described embodiments. Reference character 447 denotes a magnetic pole yoke material, 448 a second magnetic pole formed on a flapper side end surface of the magnetic pole yoke material, 449 a spacer made of a nonmagnetic material, 450 a bolt for fastening the magnetic pole yoke material and the flapper to the supply side block 438 via the spacer, and 451 an elastic deformation part formed in the flapper between the second magnetic pole and a fixation side of the flapper. That is, the elastic deformation part is configured by forming concave parts on the front and back sides of the flapper. Also, in the flapper, a magnetic path part 452 is formed between the supply side nozzle and the second magnetic pole. Reference character 453 denotes an intake port and 454 an ejection port. "Supporting shaft 430→L-shaped member bottom part 432→L-shaped member upright part 433→first magnetic pole 446→magnetic path part 452 of flapper→second magnetic pole 448→magnetic pole yoke material 447→supporting shaft 430" forms a closed loop magnetic circuit.

In the present embodiment, a flow path is formed within the closed loop magnetic circuit; however, a flow path may be separately configured by extending the flapper from the first magnetic pole and oppositely providing nozzles interposing the extended flapper. Alternatively, in the above embodiment, the flapper 434 is of a single end support structure, but may be of a double end support structure. In this case, the supporting shaft 430 may be bilaterally symmetrically configured to attach the electromagnetic coil 321 to the L-shaped member upright part.

Ninth Embodiment

The present embodiment proposes a valve structure that eliminates a problem associated with the driving principle of a conventional "nozzle flapper valve using a bidirectional flapper," i.e., the disadvantage that an air consumption flow rate is maximized at the operating point of the valve in a steady state.

Figure 35:
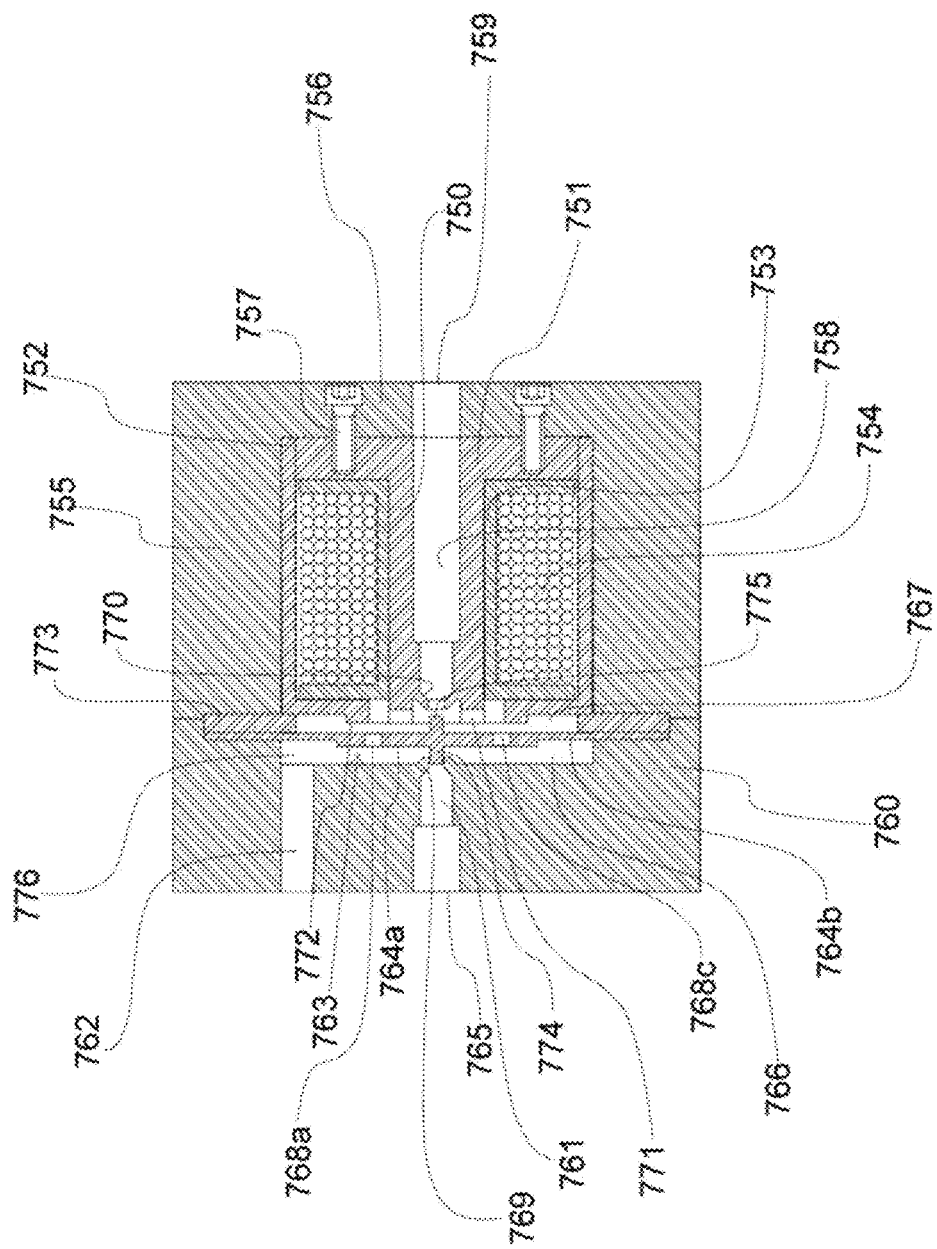
FIG. 35 is a front cross-sectional view of a fluid servo valve according to a ninth embodiment of the present invention.

FIG. 35 is a front cross-sectional view of a pneumatic servo valve according to a ninth embodiment of the present invention, in which reference character 763 denotes a convex disc-shaped flapper, which is configured to include a thick convex part (magnetic path part) 764a and a thin outer peripheral part (elastic deformation part) 764b. Reference character 769 denotes a supply side nozzle (forward nozzle), and 770 an exhaust side nozzle (reverse nozzle). Reference character 771 denotes a flapper valve side end surface of a central shaft 750 (central shaft end surface) and also a first magnetic pole of an electromagnet. Reference character 772 denotes a second magnetic pole formed on a flapper side end surface of an outer frame part 752, and 773 a nonmagnetic ring held between the flapper 763 and a housing 755. A supply side housing 760 and the housing 755 sandwich the flapper and the nonmagnetic ring, and are fastened by bolts (not illustrated). Reference character 774 denotes a supply side convex part formed in the supply side central part of the flapper, and 775 an exhaust side convex part formed in the exhaust side central part of the flapper. Also, a supply side gap part and an exhaust side gap part form a control chamber 776 of this valve.

Figures 36A, 36B, 36C:
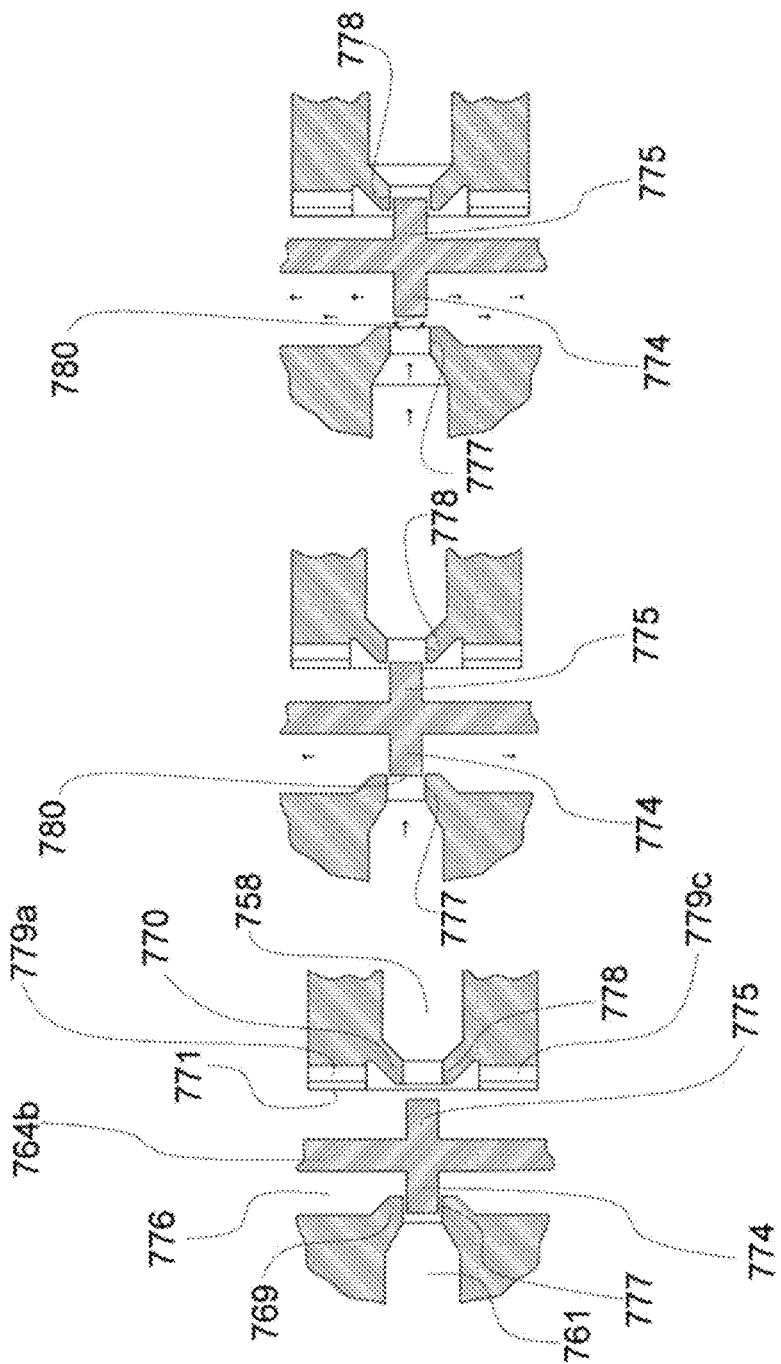

The valve according to the present embodiment can sufficiently reduce an air consumption flow rate at the operating point of the valve in a steady state. This is because annular flow path forming structures respectively forming flow paths having substantially annular cross sections are provided between the supply side nozzle 769 and the flapper 763 and between the exhaust side nozzle 770 and the flapper 763. More specifically, each of the annular flow path forming structures includes: a tubular inner circumferential surface of the tip part of corresponding one of the respective nozzles 769 and 770; and an insertion body that is inserted separated radially from the inner circumferential surface. That is, convex parts perpendicularly protruded from a face plate part of the flapper 763 serve as the insertion bodies, and depending on the degree of insertion of each of the insertion bodies into corresponding one of the nozzles 769 and 770, the axial length of corresponding one of the annular flow paths can be changed to change flow rate characteristics. FIGS. 36A to 36C illustrate combination states between the set of nozzles and the flapper, and FIGS. 37A and 37B focus on one of the nozzles, and illustrate the model of the relationship between a valve flow rate and the gap between the nozzle and the flapper. In the following, the operating principle of this valve will be described using FIGS. 36A to 43C while comparing the two diagrams (FIGS. 37A and 37B), FIG. 36A illustrates a state where a valve input current is I=0 (initial value), FIG. 36B a state where the input current is I≈$I_{max}$/2 (operating point), and FIG. 36C a state where the input current is I=$I_{max}$ (maximum value). In the diagrams, reference character 777 denotes a supply side nozzle orifice, and 778 an exhaust side nozzle orifice. Reference characters 779a, 779b (not illustrated), and 779c denote circulation grooves formed in a flapper side end surface of the first magnetic pole 771, which have the same function as that in the fourth embodiment (FIG. 24b).

At the valve input current I=0 in FIG. 36A, the supply side convex part 774 of the flapper deeply penetrates into the supply side nozzle orifice 777. This corresponds to an A state in FIG. 37A, and flow in the narrow annular gap formed between the supply side convex part 774 and the supply side nozzle orifice 777 is viscous flow. Accordingly, the amount of air flowing from an air pressure supply source (not illustrated) into the control chamber of this valve is tiny.

At the input current I≈$I_{max}$/2 (operating point) in FIG. 36B, a nozzle side end surface 780 of the supply side convex part 774 is in close contact with an opening end of the supply side nozzle orifice 777. This corresponds to B in FIG. 37A, and the flow of the fluid flowing from the supply side nozzle into the control chamber is in a transition region where a viscous flow region transitions to a potential flow region. Also, the flow of the fluid flowing from the control chamber into the exhaust side nozzle is also in the transition region.

At the input current I=$I_{max}$ in FIG. 36C, the nozzle side end surface 780 of the supply side convex part 774 is sufficiently separated from the opening end of the supply side nozzle orifice 777. This corresponds to C in FIG. 37A, and the flow of the fluid flowing from the supply side nozzle into the control chamber is in the potential flow region. Also, the exhaust side convex part 775 of the flapper deeply penetrates into the exhaust side nozzle orifice 778, and flow in the narrow annular gap formed between the both members is viscous flow. Accordingly, the amount of air flowing from the control chamber 776 into the air is tiny.

Figures 37A, 37B:
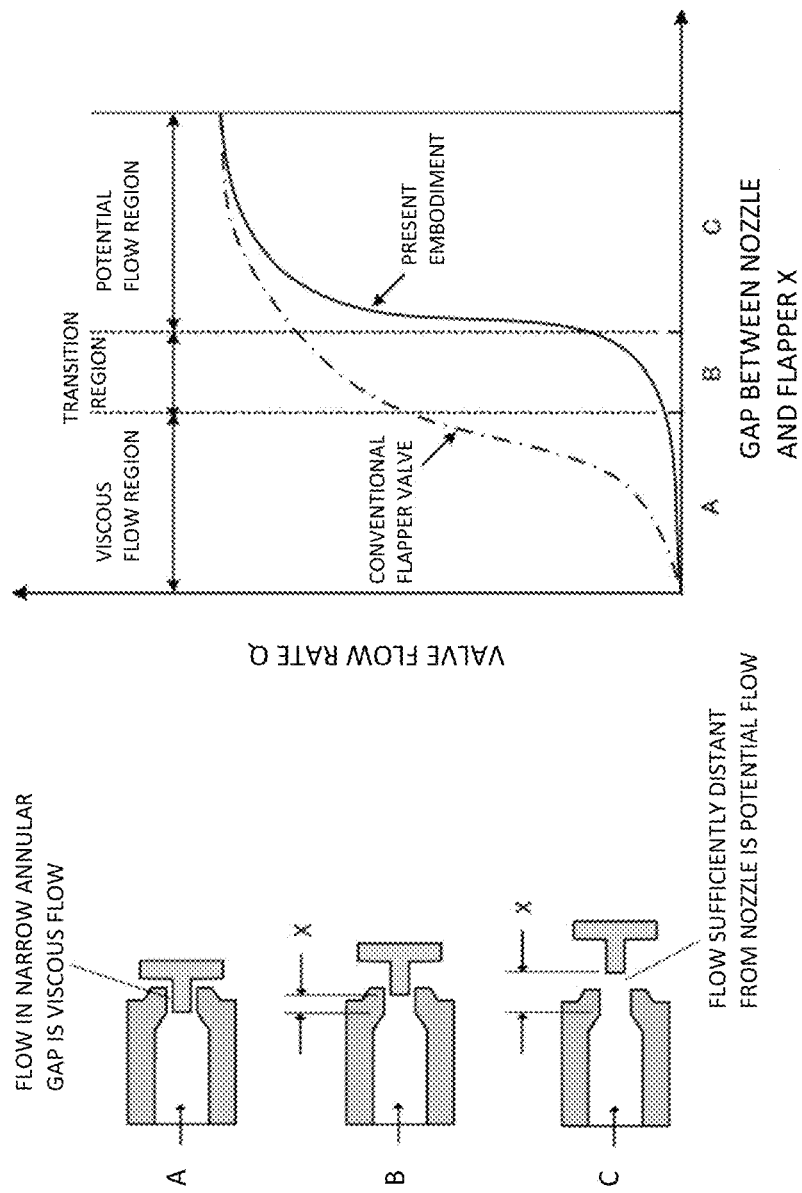

FIG. 37B illustrates the characteristics (solid line) of "a valve flow rate Q with respect to the gap X between the nozzle and the flapper (valve input current)" compared with conventional valve characteristics (dashed-dotted line). In the case of the valve according to the present embodiment, the flow rate is sufficiently small from the viscous flow region A to the transition region B, and when entering the potential flow region C, steeply increases. In the case of the conventional valve, the entire region (A→B→C) is the potential flow region, and therefore at a stage where the gap X is small, the flow rate is already large. Such difference in flow rate characteristics results in the difference in air consumption flow rate at an operating point between the both.

Figure 38B:
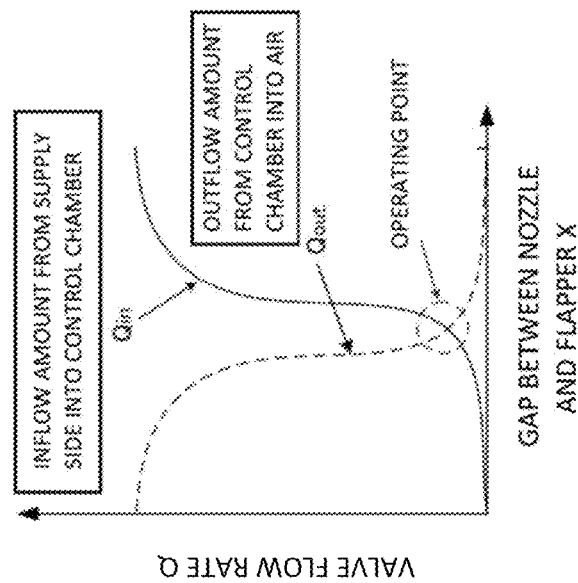
Figure 38A:
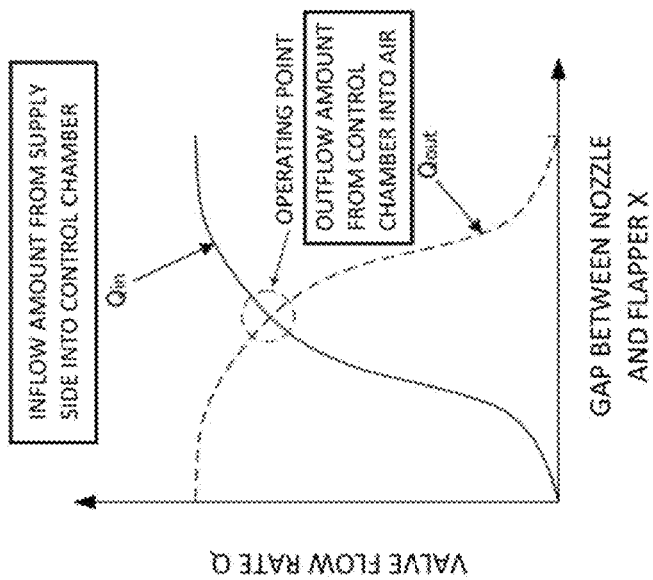

FIGS. 38A and 38B are diagrams schematically illustrating that as compared with the conventional valve, the valve according to the present embodiment can significantly reduce the air consumption flow rate at the operating point. As the characteristics of the flow rate Q with respect to the gap X, i. an inflow amount from the supply side into the control chamber (solid line), and ii. an outflow amount from the control chamber into the air are illustrated under the assumption that the pressure of the control chamber is constant. FIG. 38A corresponds to the conventional valve, and FIG. 38B corresponds to the valve according to the present embodiment. Given that the intersection point between the inflow amount and the outflow amount is the operating point, it turns out that the air consumption flow rate at the operating point of the valve according to the present embodiment is significantly small as compared with the conventional valve. Near the operating point, the curves i and ii of the conventional valve are both upward convex curves, whereas the curves i and ii of the valve according to the present embodiment are both downward convex curves. That is, the key to reducing the air consumption flow rate is that regardless of detailed nozzle-flapper structure, or in any of the viscous flow region and the potential flow region, the characteristics of the flow rate Q with respect to the gap X (or a current value) include valve characteristics exhibiting downward convex curves near an operating point.

Meanwhile, as described above, the reason why the valve according to the present embodiment can significantly reduce the air consumption flow rate is because the fitting state between the set of the convex parts on the both surfaces of the bidirectional flapper and the set of the respective nozzle side orifices can be adjusted by the flapper axial movement. For this purpose, it is preferable in terms of structure and member machining that the flapper is driven using the largest possible stroke. However, for example, in the case of an actuator using Maxwell stress as described in the first embodiment, the maximum value of the magnetic gap between a magnetic pole of which a magnetic attraction action can be effectively utilized and a flapper is of the order of 0.05 to 0.20 mm. The characteristics of a magnetic attractive force with respect to an air gap are nonlinear, and when exceeding the above maximum value, the magnetic attractive force normally significantly reduces. However, as described in the second embodiment, it has been found in the process of this study that in the case of using an appropriate magnetic material and a thin disc for a movable part corresponding to a flapper, as the displacement characteristics of the flapper with respect to current, characteristics superior in linearity can be obtained.

By further actively utilizing such a magnetic saturation phenomenon, the stroke of the flapper can be significantly increased without losing the linearity in the displacement characteristics of the flapper with respect to the current.

Figure 39:
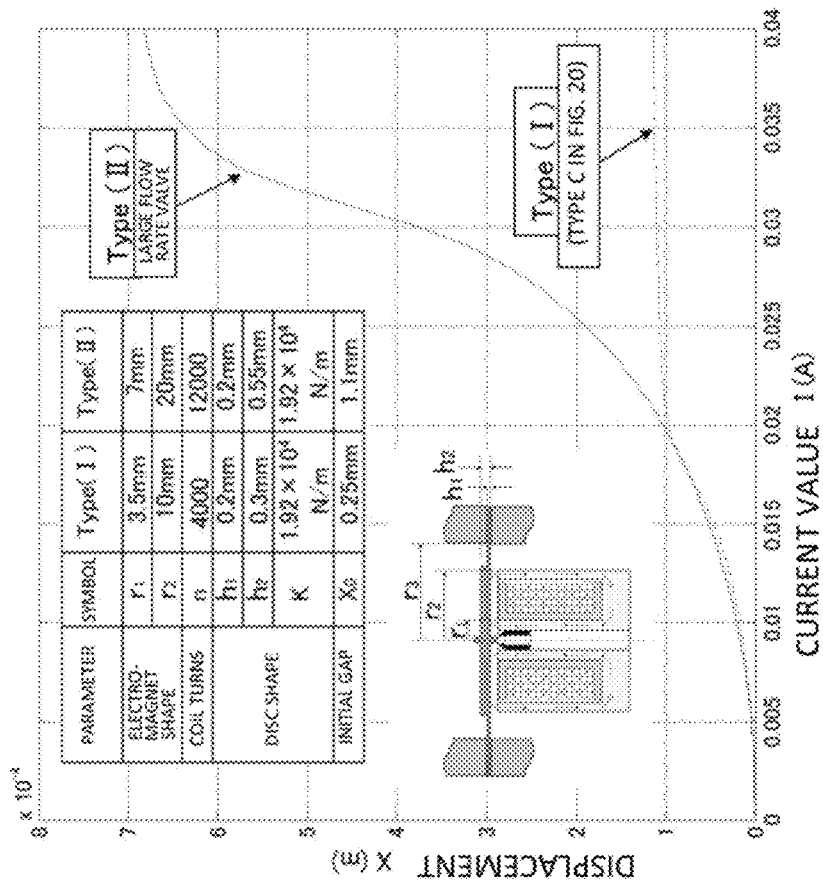
FIG. 39 is a graph illustrating an analysis result of flapper displacement characteristics with respect to current in the ninth embodiment.

In a graph of FIG. 39, the specifications of the electromagnet and disc shape used in the present embodiment [Type (II)] are listed compared with the specifications in the above-described second embodiment [Type (I)]. The outside diameter of the electromagnet in Type (II) is twice as compared with that in Type (I), and the number of turns of the coil is triple. At a current value I=40 mA, a flapper displacement in Type (I) is approximately X=0.12 mm, whereas a flapper displacement in the present embodiment Type (II) is X=0.68 mm. As a result of examination in terms of structure/performance as well as component precision machining during the development of the valve according to the present embodiment, it has turned out that by utilizing the magnetic saturation characteristics of the closed loop magnetic circuit to set the maximum stroke between the nozzle and the electromagnet to 0.5 mm or more, sufficient performance can be obtained.

Figure 40:
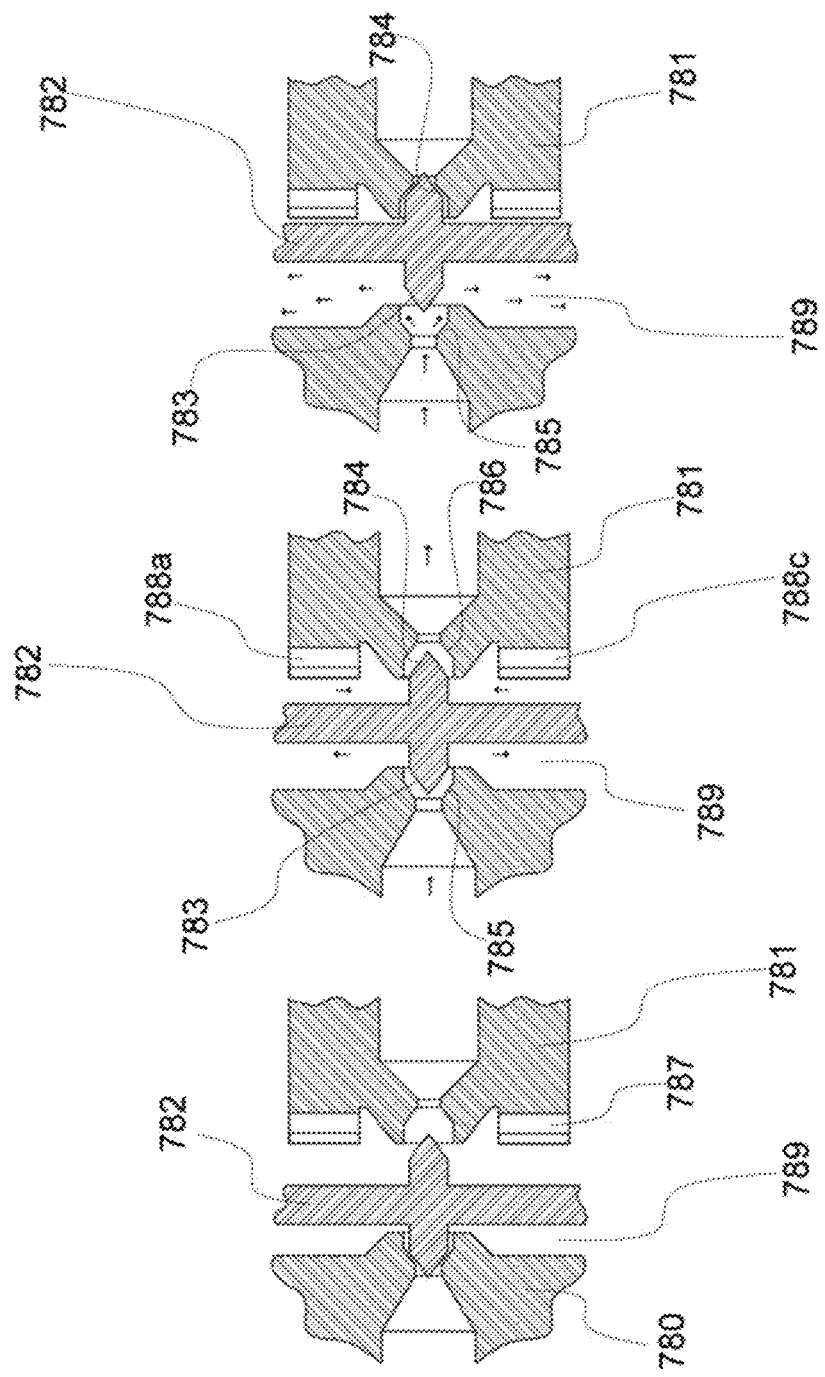

FIG. 40 is a diagram in which in order to make flow rate characteristics with respect to a current value more superior in linearity using the structure in the above-described embodiment, a fitting state between a set of nozzles and a flapper is devised. That is, in order to make the flow path area between the set of nozzles and the flapper more smoothly change with respect to the current value, flapper side convex parts to be fitted into the nozzles are formed in a tapered shape. FIG. 40A illustrates a state where a valve input current is I=0 (initial value), FIG. 40B illustrates a state where the input current is I≈$I_{max}$/2 (operating point), and FIG. 40C illustrates a state where the input current is I=$I_{max}$ (maximum value). Reference character 780 denotes a supply side housing, 781 denotes a central shaft, 782 denotes the flapper, 783 denotes a supply side taper part formed in the central part of the flapper, 784 denotes an exhaust side taper part, 785 denotes a supply side nozzle (forward nozzle) orifice formed so as to be fitted with the supply side taper part, and 786 denotes an exhaust side nozzle (reverse nozzle) orifice formed so as to be fitted with the exhaust side taper part. Reference character 787 denotes a first magnetic pole, and 788a, 788b (not illustrated), and 788c denotes circulation grooves formed in a flapper side end surface of the first magnetic pole 787 and have the same function as that in the fourth embodiment (FIG. 24). Reference character 789 denotes a control chamber.

"The relationship between a valve flow rate and a gap" associated with the state transition FIG. 40A→FIG. 40B→FIG. 40C is substantially the same as that illustrated in FIG. 37A and FIG. 37B. However, the valve flow rate further moderately changes with respect to a change in the gap.

At the input current I=$I_{max}$ in FIG. 40C, the exhaust side taper part 784 of the flapper deeply penetrates into the exhaust side nozzle orifice 786, and the amount of air flowing from the control chamber 789 into the air is tiny.

The present embodiment uses the convex disc-shaped flapper. However, by applying a spiral disc spring as used by the seventh embodiment, generated stress can be reduced and appropriate axial stiffness can be set regardless of a large axial displacement of the flapper. Alternatively, for example, even a curved spring can also be applied.

Likewise in the below-described tenth or eleventh embodiment, without bilaterally symmetrically forming convex parts and orifices for containing the convex parts, a convex part and an orifice may be formed on any one of an intake side and an exhaust side. As long as a convex part and an orifice for containing the convex part are provided only on one side, an outflow amount can be blocked by deep penetration of the convex part into the orifice, and also a flow rate can be controlled by the degree of the penetration (valve current value). For example, it is also possible to combine a set of a convex part and an orifice for containing the convex part provided on one side and a general nozzle flapper valve (see, for example, FIG. 1) provided on the other side (not illustrated).

In the present embodiment, the convex parts are formed on the flapper side and the orifices for containing the convex parts are provided on the nozzle sides, but this positional relationship may be reversed. Likewise in the below-described embodiment, it may be configured that a cylindrical part formed with an opening hole connecting to a supply source is formed on a nozzle side, and a concave part for containing the cylindrical part keeping a narrow gap is formed on a flapper side. Alternatively, it may be configured that as an insertion body, the tip itself of a taper part (convex part) of a nozzle is contained in a reverse taper part (convex part) formed on a flapper side without contacting with the inner circumferential surface of the reverse taper part. In short, it is only necessary to provide an annular flow path forming structure in which the axial length of a flow path is changed by the relative movement between a nozzle and a flapper (not illustrated).

Tenth Embodiment

Figure 41:
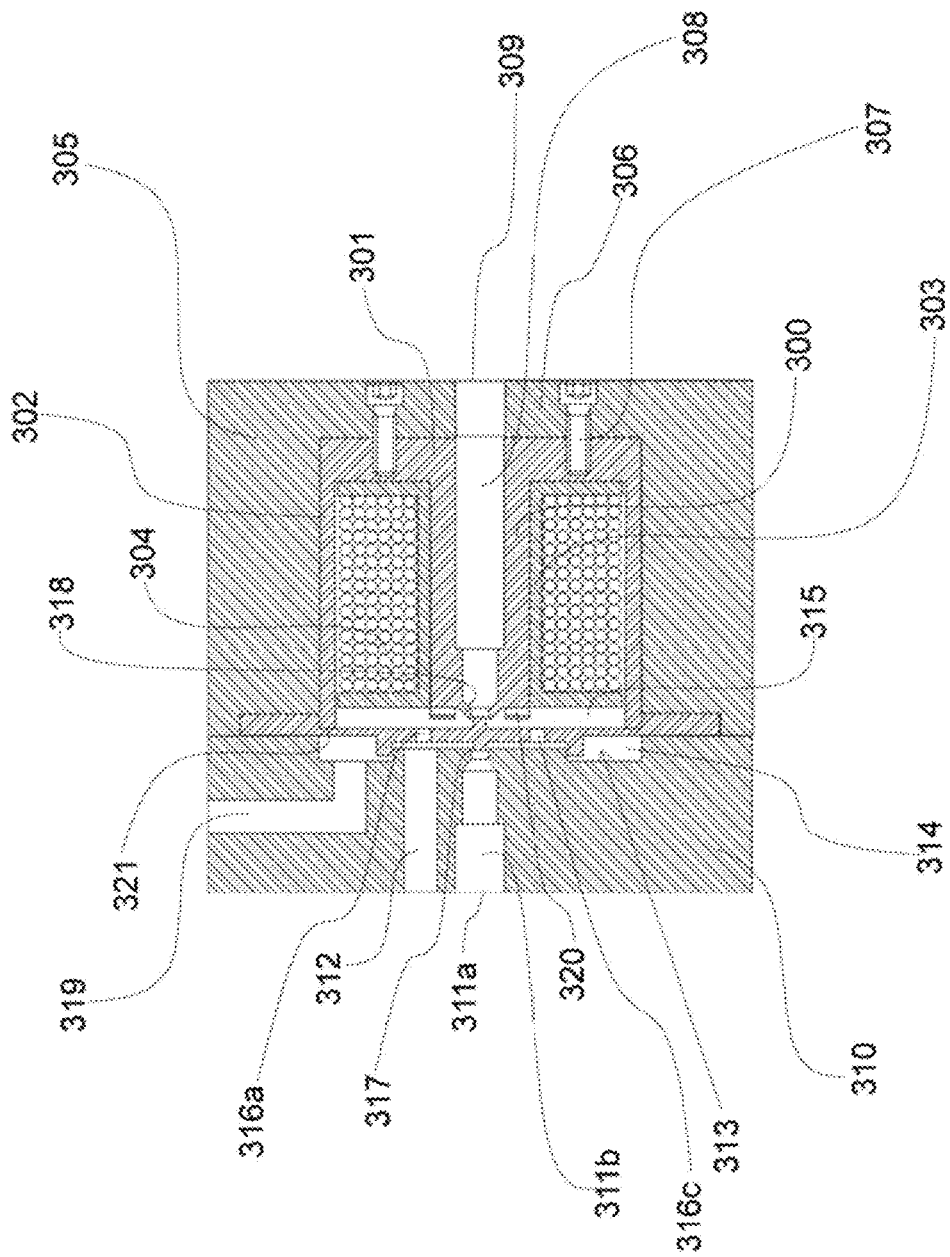
FIG. 41 is a front cross-sectional view of a fluid servo valve according to a tenth embodiment of the present invention.
Figure 42:
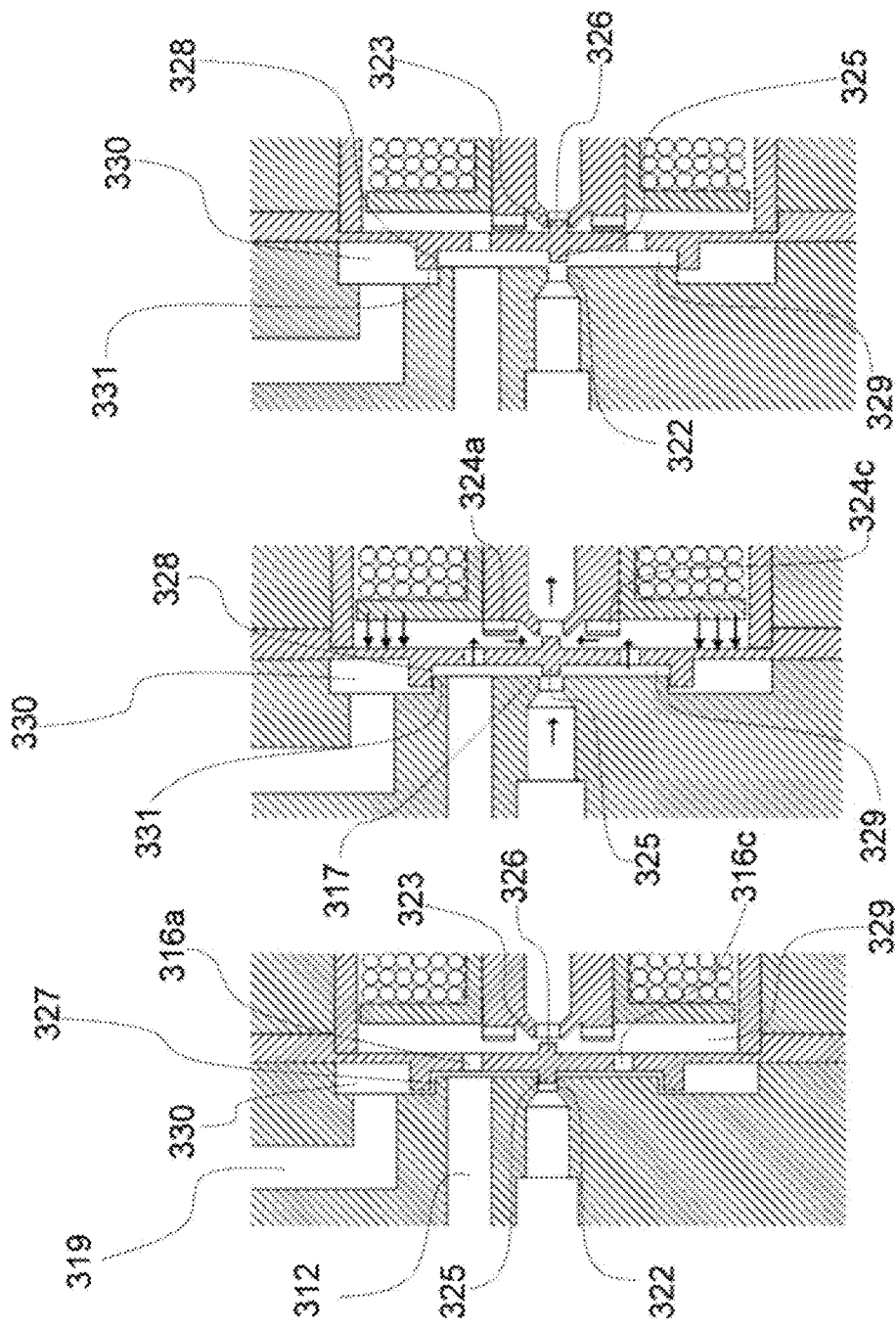
FIGS. 42(a)-42(c) are diagrams illustrating the fitting states between a set of nozzles and a flapper of the fluid servo valve according to the tenth embodiment.

FIG. 41 is a front cross-sectional view of a pneumatic servo valve according to a tenth embodiment of the present invention, in which the valve structure is devised while keeping the feature of a low air consumption flow rate so as to make the control pressure have a proportional relationship with the input current.

Reference character 300 denotes a central shaft, 301 the bottom part of the central shaft, 302 the outer frame part of the central shaft, 303 a coil bobbin, and 304 a coil. Reference character 305 denotes a tubular-shaped housing, 306 the bottom part of the housing, 307 a fastening bolt, 308 an exhaust side circulation path, 309 an ejection port, 310 a supply side housing, 311*a* an intake port, 311*b* a supply side flow path, and 312 a control side flow path connecting to a pneumatic actuator (not illustrated). Reference character 313 denotes a flapper, which is fixed sandwiched between the supply side housing 310 and the housing 305 by bolts (not illustrated) for fastening the both members 305 and 310 to each other.

Reference character 314 denotes a supply side gap part formed between the supply side housing and the flapper, and 315 an exhaust side gap part formed between the flapper and the housing.

Reference characters 316*a*, 316*b*, 316*c*, and 316*d* denote circulation holes formed in the flapper (316*b* and 136*d* are not illustrated), 317 a supply side nozzle (forward nozzle) opening part, and 318 an exhaust side nozzle (reverse nozzle) opening part. Reference character 319 denotes a constant pressure source port connecting to the air, 320 a magnetic pole of an electromagnet, and 321 a flapper side end surface of the outer frame part, which is in close contact with the flapper.

FIG. 42A illustrates a state where a valve input current is I=0 (initial value), FIG. 42B a state where the input current is I≈$I_{max}$/2 (operating point), and FIG. 42C a state where the input current is I=$I_{max}$ (maximum value). In the diagrams, reference character 322 denotes a supply side nozzle orifice, and 323 an exhaust side nozzle orifice. Reference characters 324*a*, 324*b* (not illustrated), and 324*c* denote circulation grooves formed in a flapper side end surface of the magnetic pole 320, which have the same function as that in the fourth embodiment (FIG. 24). Reference character 325 denotes a flapper supply side convex part formed on the supply side of the flapper, 326 denotes a flapper exhaust side convex part formed on the exhaust side of the flapper, 327 denotes a supply housing side convex part formed on the flapper side of the supply side housing, 328 denotes a flapper side concave part formed on the supply side of the flapper, 329 denotes a control chamber, and 330 denotes a constant pressure chamber. The constant pressure chamber is connected to the constant pressure source port 319 connecting to the air, and therefore the pressure thereof is always kept constant at P=$P_0$ (atmospheric pressure). The two members of the supply housing side convex part 327 and the flapper side concave part 328 are always slidably fitted together in an axial direction keeping a narrow gap, and form a contactless seal part 331.

In the input current range of 0<I<$I_{max}$, the pressure $P_a$ of the control chamber 329 changes within the range of $P_0$<$P_a$<$P_s$ depending on the position of the flapper. However, the constant pressure chamber 330 is isolated from the control chamber 329 by the seal part 331, and therefore the pressure thereof is P=$P_0$ (constant).

The generated force (attractive force) F of the electromagnet, a load due to the difference in pressure between both sides of the flapper, and a restoring force due to the spring stiffness of the flapper are balanced. Given that an area where the pressure of the constant pressure chamber 330 effectively acts on the flapper is denoted by $S_1$, and an area of the flapper on the supply side covered by the contactless seal part 331 by $S_2$, a total area of the flapper on the exhaust side applied with the control pressure $P_a$ is denoted by $S_1$+$S_2$. Given that the spring stiffness of the flapper (disc) is denoted by K, and the displacement of the flapper by X, the generated force F is given by the following expression.

$$F=P_a(S_1+S_2)-S_1P_0-S_2P_a+kx=(P_a-P_0)S_1+kx \quad \text{[Expression 11]}$$

By setting the flapper area $S_1$ on which the pressure of the constant pressure chamber 330 effectively acts so as to meet $(P_a-P_0)S_1$>>$K_x$, the generated force of the electromagnet and the gauge pressure of the control pressure $P_a$-$P_0$ are made substantially proportional.

$$F≈(P_a-P_0)S_1 \quad \text{[Expression 12]}$$

Utilizing the magnetic saturation phenomenon enables the generated force of an electromagnet to have a proportional relationship with a current value as illustrated in the graph (Type C) of FIG. 21. Accordingly, the present embodiment can obtain the valve characteristics that keep the feature of a low air consumption flow rate and exhibit that the relationship between the input current and the control pressure is proportional.

In the present embodiment, the magnetic pole of the electromagnet is provided only at the end of the central shaft. However, in order to increase attractive force, a second magnetic pole may be provided as in the above-described embodiments (not illustrated).

Eleventh Embodiment

Figure 43:
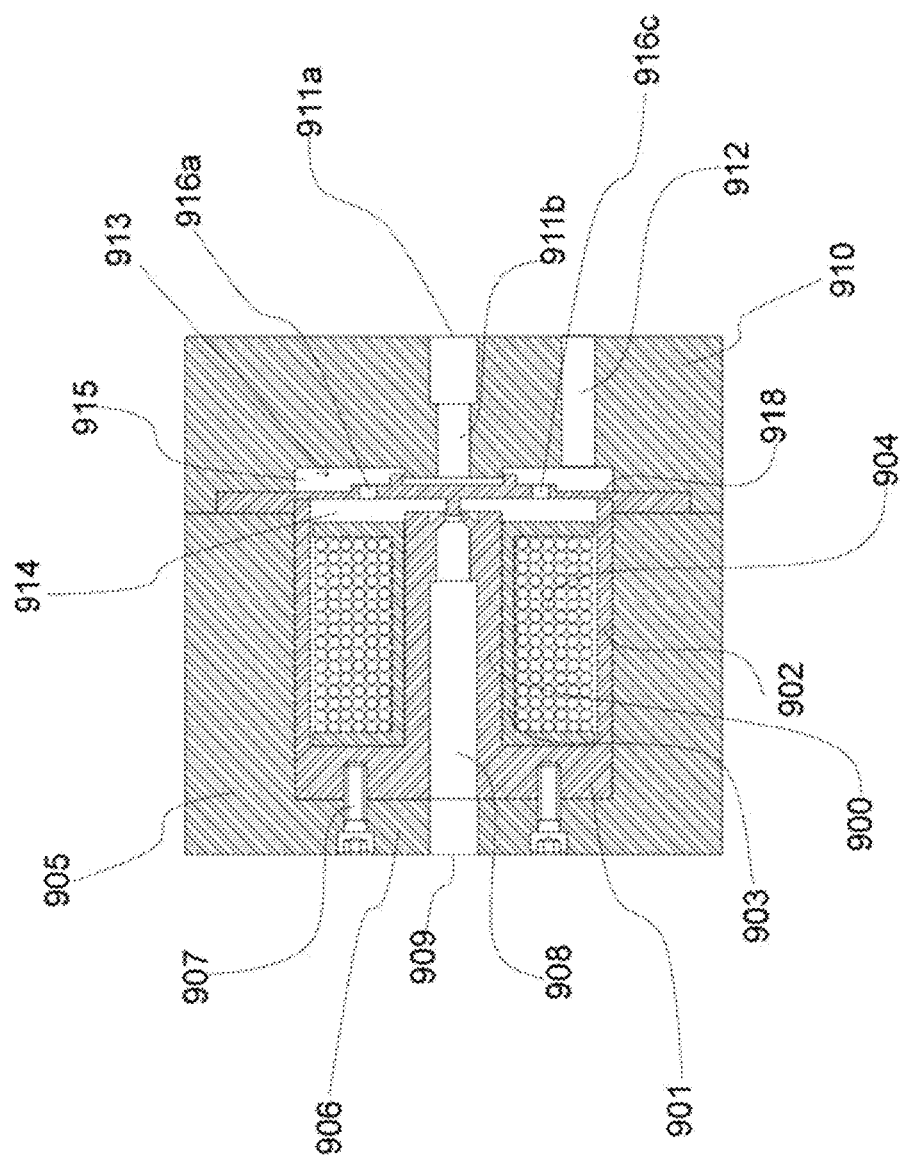
FIG. 43 is a front cross-sectional view of a fluid servo valve according to an eleventh embodiment of the present invention.

FIG. 43 is a front cross-sectional view of a pneumatic servo valve according to the eleventh embodiment of the present invention, in which as in the above-described embodiment, valve structure is devised while keeping the feature of a low air consumption flow rate so as to make control pressure have a proportional relationship with input current. In the above-described embodiment, the constant pressure chamber is provided in the outer circumferential part of the flapper. On the other hand, in the present embodiment, a constant pressure chamber is provided on an exhaust side of the central part of a flapper.

Reference character 900 denotes a central shaft, 901 denotes the bottom part of the central shaft, 902 denotes an outer frame part formed concentrically with the shaft center of the central shaft, 903 denotes a coil bobbin, and 904 denotes a coil. Reference character 905 denotes a tubular-shaped supply side housing, 906 denotes the bottom part of the supply side housing, 907 denotes a fastening bolt, 908 denotes a supply side circulation path, 909 denotes an intake port, 910 denotes an exhaust side housing, 911*a* denotes an ejection port, 911*b* denotes an exhaust side flow path, and 912 denotes a control side flow path connecting to a pneumatic actuator (not illustrated). Reference character 913 denotes the flapper, which is fixed sandwiched between the exhaust side housing 910 and the supply side housing 905 by bolts (not illustrating) for fastening the both members 905 and 910 to each other. Reference character 914 denotes a supply side gap part formed between the supply side housing and the flapper, and 915 denotes an exhaust side gap part formed between the flapper and the exhaust side housing. Reference characters 916*a*, 916*b*, 916*c*, and 916*d* denote circulation holes formed in the flapper (916*b* and 916*d* are not illustrated), 917 denotes a magnetic pole of an electromagnet, and 918 denotes a flapper side end surface of the outer frame part, which is in close contact with the flapper.

Figure 44:
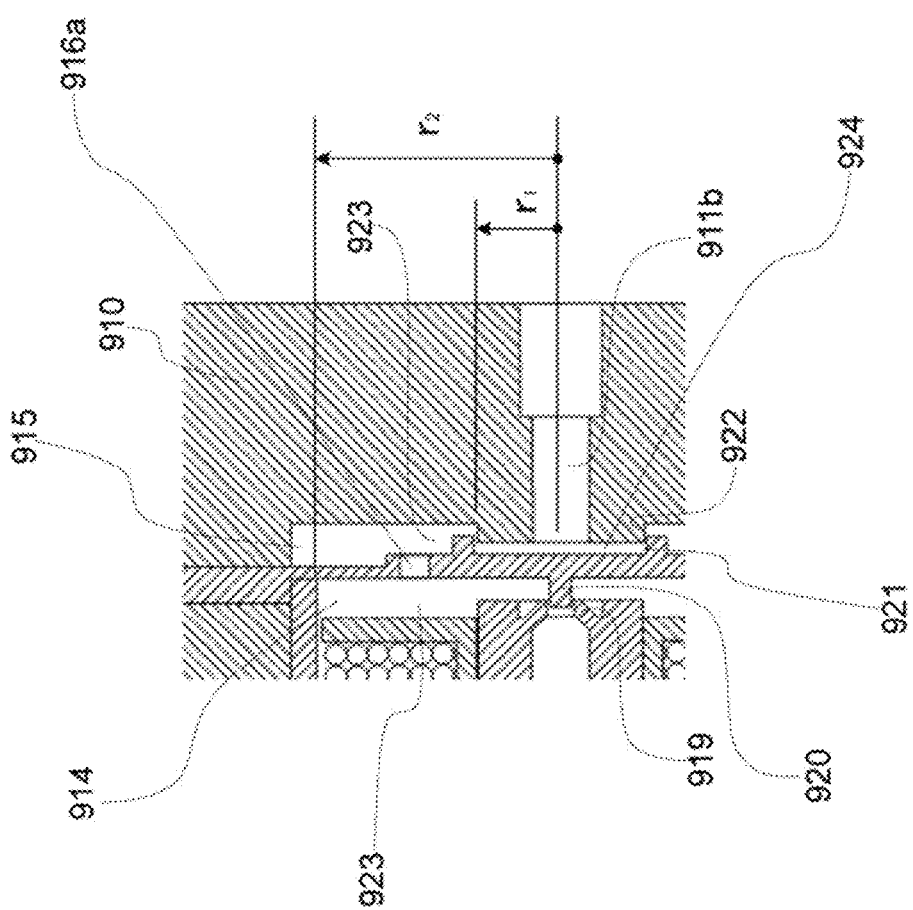
FIG. 44 is an enlarged view of a nozzle-flapper part of the fluid servo valve according to the eleventh embodiment in FIG. 43.

In an enlarged view of FIG. 44, reference character 919 denotes a supply side nozzle orifice, and 920 denotes a flapper supply side convex part formed on the supply side of the flapper. By fitting the flapper supply side convex part and the supply side nozzle orifice 919 together, the fluid resistance $R_1$ of the supply side flow path is adjusted.

Reference character 921 denotes a flapper exhaust side concave part formed on the exhaust side of the flapper, and 922 denotes a housing exhaust side convex part formed on the exhaust side housing. By fitting the housing exhaust side convex part and the flapper exhaust side concave part 921 together, the fluid resistance $R_2$ of the exhaust side flow path is adjusted. The supply side gap part 914 and the exhaust side gap part are connected to each other through the circulation holes, and as in the above-described embodiment, the two gap parts form a control chamber 923. The pressure $P_a$ of the control chamber is determined by a supply side pressure $P_s$, the fluid resistance $R_1$ of the supply side flow path and the fluid resistance $R_2$ of the exhaust side flow path.

Reference character 924 denotes the constant pressure chamber, which is connected to the exhaust side flow path 911b connecting to the air, and therefore the pressure of the constant chamber is always kept constant at $P=P_0$ (atmospheric pressure). As in the above-described embodiment, the generated force (attractive force) F of the electromagnet, a load due to the difference in pressure between both sides of the flapper, and a restoring force due to the spring stiffness of the flapper are balanced. Given that an area determined by the radius $r_1$ of the constant pressure chamber 924 is denoted by $S_1$, and a flapper supply side area that is on the side opposite to the constant pressure chamber and determined by a radius $r_2$ by $S_2$, a total area on which the control pressure $P_a$ is applied on the exhaust side of the flapper is denoted by $S_2-S_1$.

$$F=P_a S_2-(S_2-S_1)P_a-S_1 P_0+kx=(P_a-P_0)S_1+kx \qquad \text{[Expression 13]}$$

By setting the radius $r_1$ of the constant pressure chamber 924 so as to satisfy $(P_a-P_0)S_1 \gg K_x$ in Expression 13, the generated force of the electromagnet and the gauge pressure of the control pressure $P_a-P_0$ are made substantially proportional. Accordingly, as with the above-described embodiment, the present embodiment can obtain valve characteristics that keep the feature of a low air consumption flow rate and exhibit that the control pressure has a proportional relationship with input current.

In the embodiment, in order to keep the pressure of the constant pressure chamber 924 constant, a contactless seal part 921, 922 is formed, but a seal member such as an O-ring may be used.

Twelfth Embodiment

Figure 46:
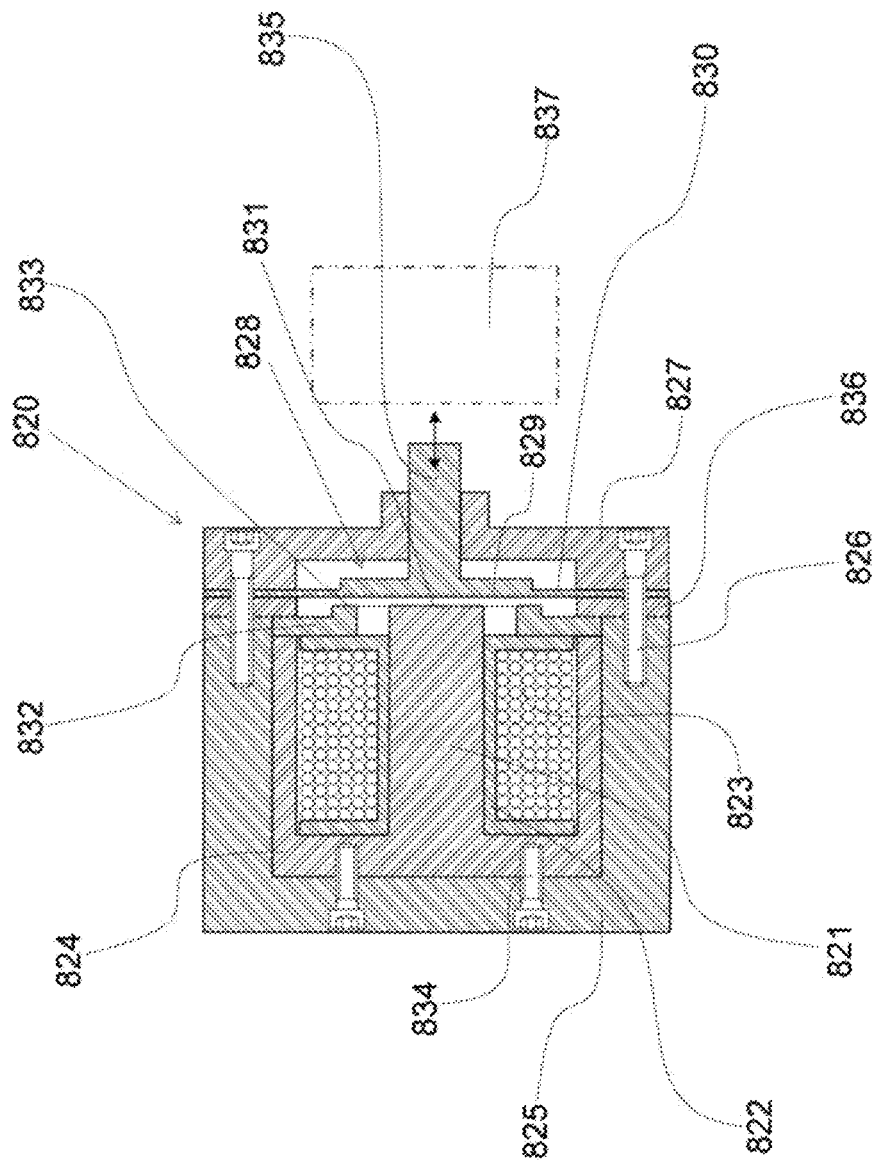
FIG. 46 is a front cross-sectional view of a fluid servo valve according to the twelfth embodiment of the present invention.

FIG. 46 is a front cross-sectional view of a microactuator according to a twelfth embodiment of the present invention, in which with a focus on the fact that actively utilizing a magnetic saturation phenomenon enables a stroke to be significantly increased, an independent unit is configured as the microactuator by separately providing an output shaft on the flapper in the sixth embodiment.

The present invention can be applied as a fluid servo valve by being combined with a valve such as a poppet valve or a four-way pilot valve.

Reference character 820 denotes the whole of the microactuator, 821 denotes a central shaft, 822 denotes a coil bobbin, 823 denotes a coil wound on the coil bobbin, 824 denotes an outer frame part adapted to contain the central shaft and the coil bobbin, 825 denotes a tubular-shaped coil side housing, 826 denotes a fastening bolt, 827 denotes a flapper side housing, and 828 denotes a disc-shaped flapper, which is configured to include a thick convex part (magnetic path part) 829 and a thin outer peripheral part (elastic deformation part) 830.

Reference character 831 denotes a first magnetic pole corresponding to a flapper side end surface of the central shaft 821, 832 a magnetic pole ring provided on a flapper side end surface of the outer frame part, and 833 a second magnetic pole formed on a flapper side end surface of the magnetic pole ring. Reference character 834 denotes a fastening bolt, 835 denotes an output shaft end part of the unit integrated with the flapper, and 836 denotes a spacer made of a nonmagnetic material. Reference character 837 denotes a fluid control part driven by the output shaft of the unit.

Figure 45:
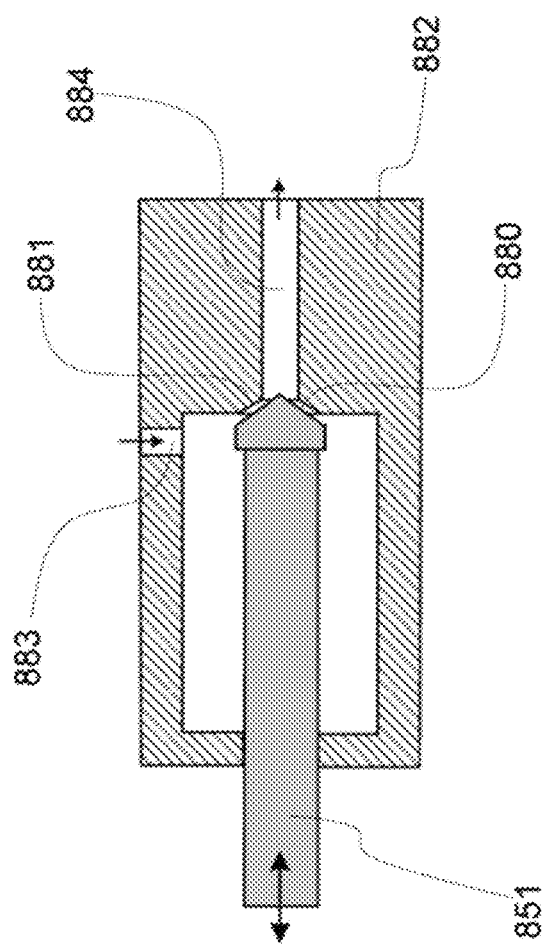
FIG. 45 is a front cross-sectional view of a poppet valve connected to a microactuator part in a twelfth embodiment of the present invention.

It is now assumed that the microactuator according to the present embodiment is directly connected to a poppet valve illustrated in FIG. 45. In FIG. 45, reference character 880 denotes a taper part, 881 a nozzle part to be fitted with the taper part, 882 a housing, 883 a fluid supply port, and 884 a fluid output port.

In the case where when current is not applied, the taper part 880 of the poppet valve is in close contact with the nozzle part 881, the flow of fluid is blocked. By applying current, the taper part is separated from the nozzle part, and the fluid is supplied from the fluid supply port 883 to the fluid output port 884. That is, a fail-safe function that, in case of an emergency where power is suddenly turned off, blocks the flow path, can be provided.

In the case of making a structure adapted to make the output shaft 835 penetrate through the central shaft 821, and protrude the output shaft from the bottom surface of the coil side housing 825 (the left end in FIG. 46), the output shaft acts so as to protrude from the actuator main body in proportion to the magnitude of current applied to the coil. Accordingly, even though this actuator is of a magnetic attraction type, it can be used in the same manner as a conventionally widely used piezoelectric or magnetostrictive type actuator. In this case, by elastically supporting the both ends of the central shaft using a disc-shaped spring, the central shaft can be supported in a contactless manner, which is not affected by Coulomb friction.

Meanwhile, in the case of a conventionally frequently used piezo actuator, a stroke is at most 50 μm, and in the case of a giant magnetostrictive actuator as well, a stroke is at most 100 μm. Accordingly, utilizing the magnetic saturation phenomenon makes it possible to control a displacement of the order of mm, which a conventional piezo or giant magnetostrictive actuator has not been able to obtain. Further, as described above in the first embodiment (see Table 2), even as compared with a voice coil motor (linear motor), the actuator according to the present embodiment has a high resonance frequency and high-speed responsiveness, and can be driven by low power because of a high thrust constant, and therefore the present embodiment can significantly miniaturize an actuator.

Complement 1

The valve according to the present invention can also be used as an electropneumatic converter. For example, in each of the first to seventh embodiments, a supply side nozzle facing toward a flapper is defined as a second nozzle, and a fixed orifice provided on the upstream side of the second nozzle as a first nozzle. Given that the space between the first nozzle and the second nozzle is defined as a control chamber A, the pressure of the control chamber A can be changed by controlling the gap between the flapper and the second nozzle. It is only necessary to use the pressure of the control chamber A as the output pressure of the electropneumatic converter.

Also, a fixed orifice is provided on the downstream side of an exhaust side nozzle, and the space between the fixed orifice and the exhaust side nozzle is defined as a control chamber B. The valve according to the present invention can be used as, for example, a pilot valve (primary control valve) adapted to control a four-way pilot valve on the upstream side using the pressures of the control chambers A and B as pilot pressures.

In each of the above-described embodiments, a thin plate flapper having a small magnetic path area is used to adjust magnetic saturation. However, even in the case of using any of components constituting a closed loop magnetic circuit, the magnetic saturation phenomenon can be utilized. For example, it may be configured to, in the middle of the central shaft (110 in FIG. 19), provide a site where the thickness of the cylindrical part is thin and a magnetic path area is small, and make the site serve as a maximum magnetic flux control surface (see FIG. 10C) adapted to adjust the magnetic saturation phenomenon.

Alternatively, the magnetic saturation phenomenon can also be adjusted using not the size of the magnetic path area but a magnetic material having small permeability. In this case, it is only necessary to locally arrange a component made of the magnetic material having small permeability within the closed loop magnetic circuit.

In each of the above-described embodiments according to the present invention, air is used as working fluid. However, as the working fluid used in the present invention, oil, air, various types of gases can be used. For example, an electromagnetic coil part may be configured to be resistant to liquid by being sealed with resin.

As a material used for a disc (flapper), a material such as Permalloy (B), electromagnetic stainless steel, or pure iron can be used. Also, it may be configured to use magnetic materials for components constituting a closed loop magnetic circuit and use nonmagnetic materials for the other components such as a housing.

Further, even in the case where the magnetic saturation phenomenon is not utilized, the present invention can be applied using a valve structure disclosed in each of the embodiments. For example, in the graph of the displacement characteristics with respect to the current valve in FIG. 14, in the case where the disc thickness is h=0.5 mm, the upper limit of the current is set to be $I_{max}$=0.015 A before the displacement steeply rises. In this case, although the stroke of the displacement (flow rate) decreases, a fluid servo valve can be achieved within the range of $0<I<I_{max}$. Even in this case, the distinctive features intrinsic to the valve according to the present invention, such as a high resonance frequency, high-speed responsiveness, small power driving, and simple structure can be sufficiently utilized.

For example, in the fourth embodiment (FIG. 23), in the case of setting the supply side gap part 64 near the supply side nozzle 67 to be narrow, the flow velocity of fluid flowing out of the supply side nozzle opening part in a radial direction increases, and a force attracting the flapper toward the supply side is generated by the difference in dynamic pressure between the left and right gap parts 64 and 65. As a result, there occurs a problem such as the occurrence of a dead band (the flapper sticks fast to a wall surface) in flapper displacement (flow rate) characteristics at a small current value. Making a structure such as forming the cross-section of the gap between the both gap parts 64 and 65 in a tapered shape of which a taper angle radially proportionally increases is effective in eliminating the above problem associated with the difference in dynamic pressure.

Complement 2

Figure 47:
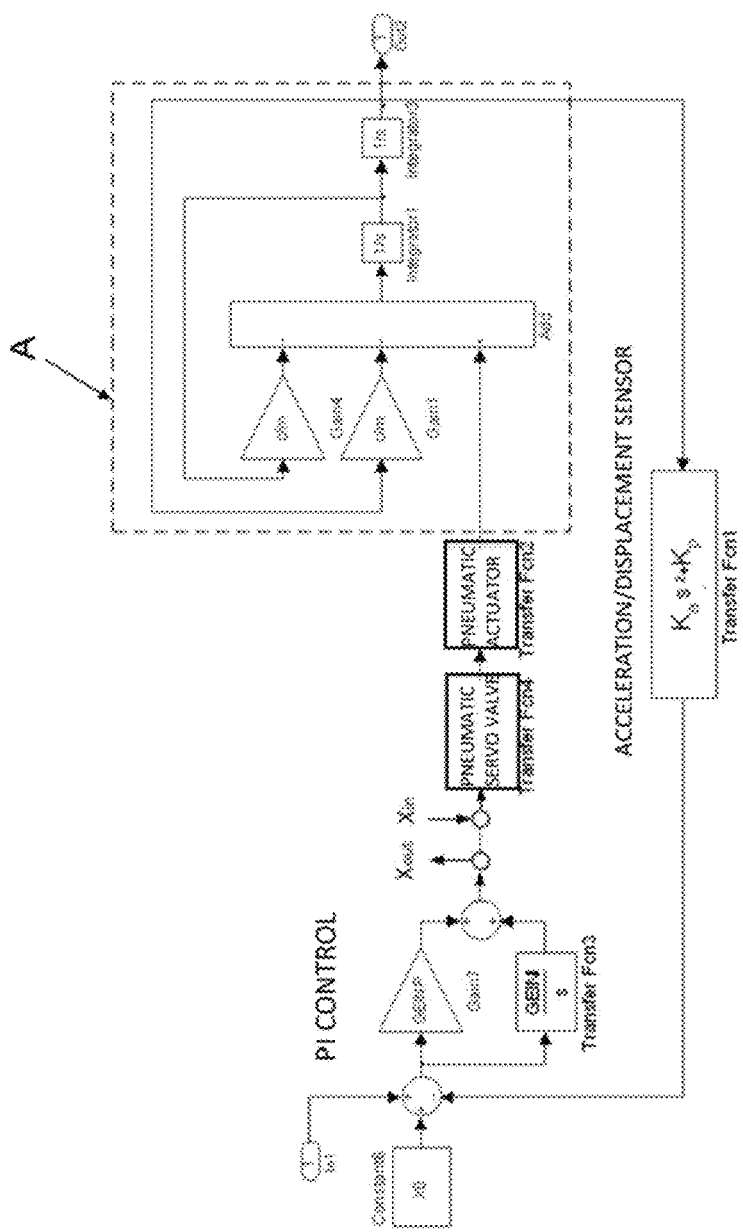
FIG. 47 is a block diagram illustrating an example of an analysis model of an active vibration isolation table.

The responsiveness of the entire system of an active vibration isolation apparatus driven by pneumatic actuators is at most of the order of several to dozens of Hz. Nevertheless, a servo valve requires a high resonance frequency of several hundred Hz. The reason for this will be described. FIG. 47 is a diagram illustrating an example of a control block of an active vibration isolation apparatus, in which a part A indicated by a chained line is a control target including a surface plate. FIG. 48 is a diagram illustrating an example of open loop transfer characteristics (Bode diagram) obtained from the control block diagram in FIG. 47, and illustrates the gain characteristics of an open loop transfer function ($G_L=X_{out}/X_{in}$) with respect to frequency, (FIG. 48A) and the phase characteristics (FIG. 48B). As listed in the tale in FIG. 48, (1) Curve i: Acceleration feedback (hereinafter acceleration FB) is not performed, and the resonance frequency of a pneumatic servo valve is low ($f_0$=100 Hz, Point A in FIG. 48), (2) Curve ii: Acceleration FB is performed, and the resonance frequency of a pneumatic servo valve is low ($f_0$=100 Hz, Point B in FIG. 48), and (3) Curve iii: Acceleration FB is performed, and the pneumatic servo valve according to the present invention is applied. The resonance frequency is high ($f_0$=1000 Hz, Point C in FIG. 48).

The above (1), (2), and (3) will be evaluated in terms of control stability. Incidentally, Point D in FIG. 48 (5.5 Hz) corresponds to an eigenvalue determined by the control target including the surface plate and the spring stiffness of a pneumatic actuator. When satisfying the following two points in the Bode diagram of the open loop transfer function, as is well known, a system is stable.

(i) The presence of a positive gain margin at a phase crossover.

(ii) The presence of a positive phase margin at a gain crossover.

In the case of the above (1), even at the resonance frequency of the pneumatic servo valve $f_0$=100 Hz, the above (i) and (ii) are satisfied, and the system is stable.

In the case of the above (2), the gain is increased by performing the acceleration FB, and the phase is delayed by 180 degrees. Further, at the servo valve resonance point $f_0$=100 Hz (Point B), a gain margin is negative (gain >0), and therefore the system is unstable.

In the case of the above (3), the gain is increased by performing the acceleration FB, and the phase is delayed by 180 degrees, which is the same as the above (2). However, at the resonance point of the servo valve according to the present invention $f_0$=1000 Hz, the gain of the system is sufficiently reduced to obtain a sufficiently large gain margin (gain <0), and therefore the system is stable.

As a result of many experiments, it has turned out that by setting the resonance frequency of a pneumatic servo valve to 200 Hz or more, the gain of acceleration FB can be set at a minimum necessary level. Desirably, it is 300 Hz or more. The valve according to the present invention adapted to control nozzle opening levels using the elastic deformation of a thin disc enables the effective mass of a movable part to be made smaller than that of a conventional valve as listed in Table 1. Since a resonance frequency is high and high-speed responsiveness is obtained, an active vibration isolation table or a pneumatic servo apparatus more superior in performance than that using a conventional valve can be achieved.

In the above, the application of the valve according to the present invention to an industrial active vibration isolation apparatus has been described. However, the present invention can be applied to various pneumatic servo apparatus.

A pneumatic servo system has various distinctive features such as (i) clean, (ii) high maintainability, (iii) high output/weight ratio as compared with an electrical type, (iv) smooth movement due to compressibility, and (v) force controllable, which are not available to other types. It is no exaggeration to say that what most dominates the performance and cost of a pneumatic servo system is a servo valve as the core of the system. Also, it is expected that the valve according to the present invention, which sufficiently eliminates the disadvantages of a conventional valve, will accelerate the wide spread of a pneumatic servo system in the future.

Another embodiment will be described. A flapper supporting member described above intends to fix part of a flapper to deform the flapper itself by the attractive force of an electromagnet. However, for example, the flapper supporting member may swingably support the flapper to change the attitude of the flapper. That is, the present invention may be configured to arrange an electromagnet so as to allow magnetic field lines to pass through a flapper itself swingably provided by a flapper supporting member, and thereby change the separation distance between a nozzle and the flapper. In this case, by forming the flapper using a magnetic material, as well as applying current to the electromagnet until magnetic force applied to the flapper enters a magnetic saturation region, flow rate control characteristics close to that described in each of the embodiments can be achieved.

The invention claimed is:

1. A fluid servo valve comprising:
    a nozzle of which a flow path is connected to a fluid supply source;
    a flapper that is provided so as to face toward a tip part of the nozzle;
    a flapper supporting member that fixes a part of the flapper; and
    an electromagnet that is provided so as to generate an attractive force on the flapper, wherein
    the fluid servo valve is configured to deform the flapper by the attractive force of the electromagnet to change a separation distance between the tip part of the nozzle and the flapper,
    an annular flow path forming structure, forming a flow path having a substantially annular cross section, is formed between the nozzle and the flapper; and
    the annular flow path forming structure includes:
        a tubular inner circumferential surface that forms an outer boundary of the flow path having the substantially annular cross section, and
        an insertion body that is surrounded by the tubular inner circumferential surface with a radial separation from the tubular inner circumferential surface.

2. The fluid servo valve according to claim 1, configured such that:
    the fluid supply source is adapted to supply air;
    the electromagnet, the flapper, and the flapper supporting member constitute an actuator part; and
    fluid passing through the nozzle passes through a space formed by respective wall surfaces of the respective members constituting the actuator part.

3. The fluid servo valve according to claim 1, wherein the flapper is formed of a substantially flat-plate-shaped member, and elasticity of the flapper itself is used to give the flapper a restoring force proportional to a size of a gap between the nozzle and the flapper.

4. The fluid servo valve according to claim 3, wherein:
    the electromagnet comprises
    a first magnetic pole that is formed on an inner end surface facing toward the flapper, and
    a second magnetic pole that is formed on an outer end surface facing toward the flapper;
    the flapper comprises
    a magnetic path part where a part between the first magnetic pole and the second magnetic pole is formed in the closed loop magnetic circuit formed by the electromagnet, and
    an elastically supporting part that is supported by the flapper supporting member and elastically supports the magnetic path part; and
    the magnetic path part and the elastically supporting part are different in flexural stiffness.

5. The fluid servo valve according to claim 1, wherein nozzles are provided in two positions, one of the nozzles is provided on a fluid supply side and configured as a forward nozzle, the other nozzle is provided on a fluid exhaust side and configured as a reverse nozzle, and the forward nozzle, the reverse nozzle, and the flapper constitute a bidirectional nozzle flapper valve,
    the fluid servo valve being configured such that working fluid supplied from the fluid supply source passes through the forward nozzle from a supply source side, flows into a control chamber as a space containing the flapper, passes through the reverse nozzle from the control chamber, and flows out to the fluid exhaust side, wherein
    the reverse nozzle is arranged substantially coaxially with the forward nozzle and on a side opposite to the flapper.

6. The fluid servo valve according to claim 1, wherein an intake port is connected to the fluid supply source, a flowmeter is attached to a flow path connecting from a control chamber to atmospheric air, and when a linearization effect index $\eta=\alpha/\beta$ is defined, given that a flow rate measured by the flowmeter at a maximum value $I_{max}$ (A) of current applied to the electromagnet is denoted by $Q_{max}$ (L/min), a gradient $Q_{max}/I_{max}$ is defined as a reference flow rate gain $\alpha$, and a maximum value of the gradient is defined as a maximum flow rate gain $\beta$ in a profile of a flow rate characteristic with respect to the input current, $\eta>0.2$.

7. The fluid servo valve according to claim 1, wherein:
    the electromagnet is configured to include a supporting shaft made of a magnetic material, a coil wound with the supporting shaft as a shaft center, and a tubular part that is arranged so as to contain the coil and made of a magnetic material; and
    the supporting shaft, the flapper, and the tubular part constitute a closed loop magnetic circuit.

8. The fluid servo valve according to claim 7, wherein a circulation path that penetrates through the supporting shaft and is connected to a fluid supply side or a fluid exhaust side is formed, and the nozzle is provided at a flapper side opening end of the circulation path.

9. The fluid servo valve according to claim 7, wherein:
    the electromagnet comprises a magnetic pole that is formed on an end surface facing toward the flapper; and
    the flapper is formed in a plate shape and faces toward the magnetic pole in a central part, and the elastic deformation part is defined by a through-hole that is formed between the central part of the flapper and the flapper supporting member and penetrates in a thickness direction in the flapper.

10. The fluid servo valve according to claim 1, wherein:

between a forward nozzle and the flapper and between a reverse nozzle and the flapper, annular flow path forming structures are respectively formed; and the fluid servo valve being configured such that fluid passes through the forward nozzle from a supply source side, flows into a control chamber as a space containing the flapper, passes through the reverse nozzle from the control chamber, and flows out to a fluid exhaust side.

11. The fluid servo valve according to claim 1, wherein:

the tubular inner circumferential surface is an inner circumferential surface of the tip part of the nozzle; and the insertion body is a substantially conical-shaped convex part formed on a face plate part of the flapper.

12. A fluid servo apparatus comprising:

the fluid servo valve according to claim 1;

a sensor adapted to detect a vibration state of a control target; and control means adapted to give gas pressure for controlling the vibration state of the control object to a pneumatic actuator by adjusting the fluid servo valve on a basis of information from the sensor.

13. The fluid servo apparatus according to claim 12, comprising:

a gas spring that fixes a primary natural vibration frequency of the flapper to 200 Hz or more and supports a vibration isolation target with respect to a base, wherein the fluid servo valve supplies gas from a supply side to the gas spring, and exhausts the gas to an exhaust side;

the sensor is adapted to detect a vibration state of the vibration isolation target; and the control means is adapted to give gas pressure for reducing vibration of the vibration isolation target to the gas spring by adjusting the fluid servo valve on a basis of information from the sensor.

* * * * *